US012743358B2

(12) United States Patent
Bhat et al.

(10) Patent No.: US 12,743,358 B2
(45) Date of Patent: Sep. 22, 2026

(54) HIERARCHICAL CASCADE ARCHITECTURE OF LANGUAGE MODELS FOR MULTI-STAGE QUERY CLASSIFICATION AND AGENT ROUTING

(71) Applicant: Citibank, N.A., New York, NY (US)

(72) Inventors: Ganesh Prasad Bhat, New Jersey, NJ (US); James Myers, New York, NY (US); Sourabh Deb, Tampa, FL (US); Jason Engelbrecht, London (GB); Zheyu Wang, Shanghai (CN); Haolin Jin, Shanghai (CN)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/325,306

(22) Filed: Sep. 10, 2025

(65) Prior Publication Data

US 2025/0383970 A1 Dec. 18, 2025

Related U.S. Application Data

(63) Continuation-in-part of application No. 19/279,103, filed on Jul. 24, 2025, now Pat. No. 12,536,406, (Continued)

(51) Int. Cl.
*G06F 11/34* (2006.01)
*G06F 9/50* (2006.01)

(52) U.S. Cl.
CPC ........ *G06F 11/3419* (2013.01); *G06F 9/5055* (2013.01)

(58) Field of Classification Search
CPC ........................... G06F 11/3419; G06F 9/5055
See application file for complete search history.

(56) References Cited

U.S. PATENT DOCUMENTS 12,135,740 B1 11/2024 Yu et al.
12,345,713 B2 7/2025 Gaylord et al.
(Continued)

FOREIGN PATENT DOCUMENTS

CN 115811401 A * 3/2023
CN 115905471 A * 4/2023

OTHER PUBLICATIONS

Hu, Q., J., et al., "Routerbench: A Benchmark for Multi-LLM Routing System," arXiv:2403.12031v2 [cs.LG] Mar. 28, 2024, 16 pages.
(Continued)

*Primary Examiner* — Shelby A Turner
*Assistant Examiner* — Xiuqin Sun
(74) *Attorney, Agent, or Firm* — Ashurst Perkins Coie US LLP

(57) ABSTRACT

The systems and methods disclosed herein orchestrate task execution among autonomous (or semi-autonomous) AI agentic models ("agents") responsive to a received query by using a hierarchical model cascade to classify queries into agent domains. Queries are processed iteratively by a series of hierarchical levels containing one or more AI models, where each layer is more complex and imposes fewer resource constraints. Each level generates a classification and a confidence score pertaining to the classification. A dynamic bypass mechanism analyzes the classifications and confidence scores at each level to dynamically determine if one or more levels of the hierarchy can be bypassed while resulting in an accurate classification. The final classifications are matched to one or more agents that process the query. Responses from the candidate agents are aggregated into an output that is responsive to the input.

20 Claims, 23 Drawing Sheets

Related U.S. Application Data which is a continuation-in-part of application No. 18/812,913, filed on Aug. 22, 2024, which is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, and a continuation-in-part of application No. 18/633,293, filed on Apr. 11, 2024, now Pat. No. 12,147,513.

(56) References Cited

U.S. PATENT DOCUMENTS

| | | | | |
|---|---|---|---|---|
| 2022/0300716 | A1* | 9/2022 | Sabharwal ........ | G06F 16/24578 |
| 2022/0377107 | A1* | 11/2022 | Lee ..................... | H04L 63/1483 |
| 2024/0282296 | A1* | 8/2024 | Bhathena ................ | G06F 40/58 |
| 2024/0320251 | A1 | 9/2024 | Hemington et al. | |
| 2024/0330579 | A1 | 10/2024 | Saxena | |
| 2024/0420012 | A1 | 12/2024 | Austin et al. | |

OTHER PUBLICATIONS

Sun et al, “Efficient Rule Engine for Smart Building Systems”, IEEE, pp. 1658-1669 (Year: 2015).
Wang et al, “Design and realization of distributed Rule Engine for scene linkage of Internet of Things”, IEEE, pp. 396-401 (Year: 2024).

* cited by examiner

1800

| Performance Metric 1802 | Usage Value 1804 | Maximum Value 1806 | Threshold Metric Value 1808 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

*FIG. 18*

HIERARCHICAL CASCADE ARCHITECTURE OF LANGUAGE MODELS FOR MULTI-STAGE QUERY CLASSIFICATION AND AGENT ROUTING

CROSS-REFERENCE TO RELATED APPLICATION(S)

This application is a continuation-in-part of U.S. patent application Ser. No. 19/279,103 entitled "DYNAMIC ARTIFICIAL INTELLIGENCE AGENT ORCHESTRATION USING A LARGE LANGUAGE MODEL GATEWAY ROUTER" and filed Jul. 24, 2025, which is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" filed on Apr. 16, 2024. The content of the foregoing applications is incorporated herein by reference in their entirety.

BACKGROUND

An artificial intelligence (AI) agentic model ("agent"), whether autonomous or semi-autonomous, refers to a persistent software entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks.

BRIEF DESCRIPTION OF THE DRAWINGS

FIG. 18 shows a schematic of a data structure illustrating a system state and associated threshold metric values, in accordance with some implementations of the present technology.

Figure 1:
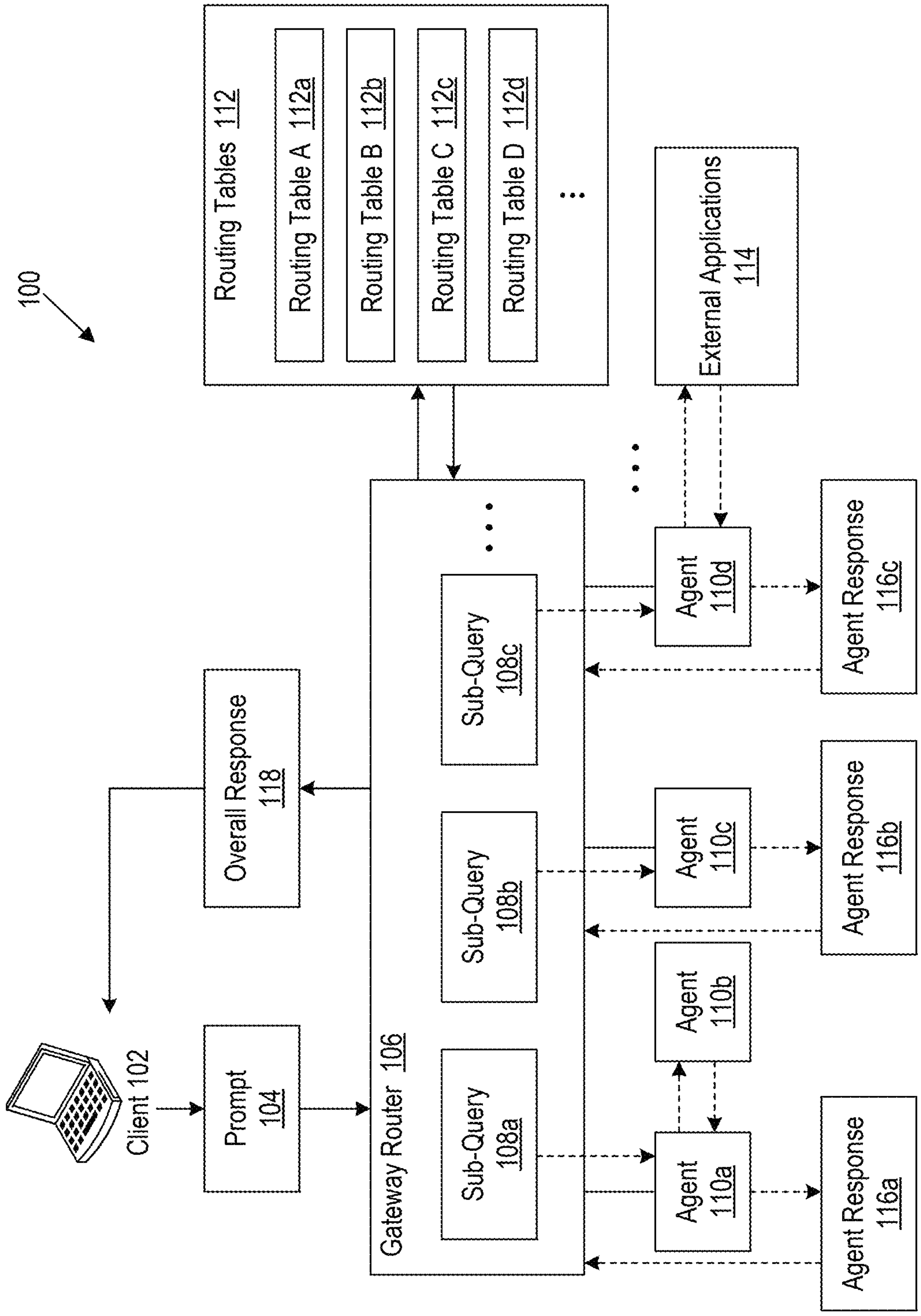
FIG. 1 shows a schematic illustrating an example environment of orchestrating semi-autonomous or autonomous agents, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained. In contrast, AI agents are persistent software entities characterized by objective functions and varying degrees of autonomy. Agents can perceive environments, make decisions, execute actions, and optimize their behavior with respect to defined objective functions. Autonomous or semi-autonomous agents can independently process incoming data, determine action plans, and dynamically invoke APIs, databases, other agents, or external services to execute tasks.

In systems implementing multiple specialized AI agents, received queries can be routed to one or more agents (and/or other AI models) based on the nature, context, or requirements of the query. Individual agents can operate according to distinct objective functions, domain-specific training data, or access privileges. A system can classify a received query based on the content and/or context of a query in light of the task and/or privileges available to the specialized AI agents.

Conventional approaches of query classification include keyword-based matching or intent classification models that rely on predefined domain categories or rule sets. The routing of queries to sub-models or agents is typically based on static mappings, routing tables, or gating functions that are configured in advance and do not dynamically adjust to changes in the operational environment. For example, mixture-of-experts (MoE) architectures-which route an input to specialized embedded sub-models, also known as "experts"-employ a gating network to select among a set of experts, with the gating decision determined by features extracted from the input. However, both the gating logic and the experts are trained jointly and share a common context window and parameter space. These static routing mechanisms do not account for changes in data topology, agent availability, user roles, or contextual signals that may arise during system operation. Consequently, conventional systems are unable to dynamically adapt their routing or classification strategies in response to evolving user requirements, agent states, or environmental conditions.

The lack of adaptability and context can partially be remedied by incorporating information retrieval into an architecture. In conventional systems, this can be implemented by retrieval-augmented generation (RAG) architectures, which are designed to enhance the capabilities of LLMs by incorporating external knowledge sources. RAG enables a model to retrieve additional context from external knowledge bases, thereby supplementing generic model capabilities with specialized (e.g., domain-specific) or up-to-date data. However, both RAG and MoE approaches assume the existence of centralized, comprehensive, and accessible data repositories, and rely on the ability to retrieve relevant and authoritative information at inference time. In distributed or access-restricted environments, where data may be fragmented, incomplete, or subject to privacy and security constraints, these conventional retrieval and routing mechanisms are unable to provide accurate, comprehensive, or policy-compliant responses. Additionally, reliance on static retrieval logic and centralized data access further limits the applicability of these approaches in environments characterized by distributed, federated, or regulated data sources. Privacy, security, and regulatory requirements frequently preclude the centralization or unrestricted sharing of sensitive data, thereby constraining the ability of conventional systems to aggregate and process all relevant information.

As datasets increase in scale and become more distributed across heterogeneous and access-restricted repositories, the performance of static routing and retrieval approaches degrades significantly. Existing architectures lack mechanisms for fine-grained, context-aware, and policy-compliant query routing that can operate effectively in regulated, distributed, or privacy-sensitive environments. Consequently, there exists a need for systems and methods that enable efficient, scalable, and policy-compliant query classification and routing in environments characterized by distributed, heterogeneous, and access-controlled data sources.

Attempting to create a system to classify a query and generate a routing path for processing the query by multiple autonomous or semi-autonomous AI agents in view of the available conventional approaches created significant technological uncertainty, especially in environments comprised of large, distributed, and access-restricted datasets (such as those encountered in regulatory, industrial, or IoT deployments). Creating such a system requires addressing several unknowns in conventional query classification, including latency, context-aware decision making, and dynamic engagement of specialized language models.

To overcome the technological uncertainties, the inventors systematically evaluated multiple design alternatives. For example, the inventors evaluated systems that relied on periodic polling, wherein agents scan data sources at fixed intervals, regardless of user intent, current operational needs, or evolving data availability. While this system offered an increased measure of data refresh, the system was inefficient and inflexible due to the increased latency (since the system may wait until the next polling cycle to react), increased network traffic (including a waste of resources by repeatedly querying when no new data is available), and often stale or irrelevant information. Another alternative relied on hard-coded, rule-based routing architectures, in which requests are segmented and routed to designated external agents or datasets according to pre-set rules. Although the segmentation of the request enabled a more focused context window (and thereby reducing the probability of a diluted response), the system was unable to adapt to changes in data topology, user roles, or other access policies, which are prevalent in environments governed by regulatory or organizational controls. For instance, if a user's request requires expertise from a newly added device/agent or if a particular agent becomes overloaded or offline, static routing is unable to adjust dynamically.

As such, the inventors have developed systems (hereinafter "model orchestration platform") and related methods to generate user query classification and routing decisions using a hierarchical model cascade of AI models (e.g., language models arranged into hierarchical levels) to generate an output from a distributed network (e.g., a "constellation") of artificial intelligence (AI) agents. The hierarchical model cascade receives an output generation request from a user interface or API endpoint and processes the input/request through successive levels, with each level evaluating the query according to distinct criteria, such as semantic content, contextual metadata, privacy attributes, and policy constraints. Each level of the hierarchy is more complex than the previous level, and thus can be more accurate (or be more in compliance with regulations, laws, rules, etc.) at the cost of other factors, such as increased latency and/or resource usage. At each level, classification outputs and associated confidence metrics inform whether further analysis is required or whether routing decisions can be finalized. The hierarchical configuration enables dynamic escalation or bypass of levels based on assessments of query complexity, user context, and current system load. The hierarchical model cascade can dynamically decompose the request/input into sub-queries and/or sub-tasks according to downstream AI agent availability. The model orchestration platform routes the input and/or sub-queries to a set of AI agents to produce an output responsive to the input. Each agent can independently retrieve and process only the relevant slices of federated, privacy-controlled data within its authorization scope, thereby producing localized results. The model orchestration platform aggregates/synthesizes the agent-specific responses into an overall, contextually responsive output that is in compliance with access controls, operational boundaries, and regulatory constraints. In some implementations, the model orchestration platform displays a presentation (e.g., on a graphical user interface or command line interface) of the classification process path enacted by the hierarchical model cascade, detailing the models used to generate the routing decisions to create an audit trail that identifies the processing history and/or data lineage.

The agents in the network, of which can be a subject matter expert (SME) trained on specialized data (i.e., data sharing a common domain), can each access respective specialized data repositories or devices. When an input to the hierarchical model cascade spans multiple domains, the hierarchical model cascade can invoke hierarchies of agents, such as starting with generalists and cascading to deeper specialists as needed (e.g., as determined by the generalist agent), and/or enable the agents themselves to flag missing data, recommend delegation to peer experts, or identify additional data sources. Each agent can operate with an independent context window, can maintain its own workflow, and can communicate recommendations or missing points of failure (such as a lack of current sensor data or an unavailable device). The model orchestration platform thus enables a closed feedback loop where agent workflows may themselves evolve, ontologies and routing tables can be dynamically updated, and the agents can participate in voting or consensus workflows for particular tasks. The model orchestration platform does not depend on a single shared model or input pipeline (such as that of MoE architectures), but instead orchestrates a distributed, context-aware, and dynamically adaptable network of specialized agents.

Further, the model orchestration platform disclosed herein enables dynamic evaluation of machine learning prompts for agent selection, as well as validation of the resulting outputs, in order to improve the security, reliability, and modularity of data pipelines (e.g., software development systems). The model orchestration platform can receive a prompt from a user (e.g., a human-readable request relating to software development, such as code generation) and determine whether the user is authenticated based on an associated authentication token (e.g., as provided concurrently with the prompt). Based on the selected model, the model orchestration platform can determine a set of performance metrics (and/or corresponding values) associated with processing the requested prompt via the selected model. By doing so, the model orchestration platform can evaluate the suitability of the selected model (e.g., agent) for generating an output based on the received input or prompt. The model orchestration platform can validate and/or modify the user's prompt according to a prompt validation model. Based on the results of the prompt validation model, the model orchestration platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The inventors have also developed a system for dynamically selecting models (e.g., agents) for processing user prompts in a resource-sensitive manner. The system state can include a current CPU usage associated with processors of the model orchestration platform. Based on the system state, the model orchestration platform can calculate a threshold metric value that indicates an allotment of system resources available for generating an output based on the prompt. The model orchestration platform can determine the estimated performance metric value associated with generating the output using the user's selected machine learning model (e.g., agent). In response to determining that the estimated performance metric value satisfies the threshold metric value, the data generation platform can provide the prompt to the selected model (e.g., agent) for generation of the requested output and subsequent transmission to a system that enables the user to view the output. When the estimated performance metric value does not satisfy the threshold metric value, the data generation platform can determine another model (e.g., a second agent) for generation of the output.

To evaluate the model (e.g., agent) outputs, the inventors have developed a system that operates in an isolated environment to mitigate errors and security breaches. For example, the data generation platform determines whether an output from a machine learning model, such as an agent, includes particular types of data (e.g., including software-related information, such as a code sample, code snippet, or an executable program). In such cases, the data generation platform can provide the generated output to a parameter generation model (e.g., an LLM, another agent) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code. The parameter generation model can generate a virtual machine configuration for testing the behavior of the executable instructions. The data generation platform can generate the virtual environment (e.g., within a virtual machine) according to the virtual machine configuration to enable compilation of the generated code within an isolated environment (e.g., a "sandcastle") for testing the code.

Further, the model orchestration platform can select, in response to an input, AI model(s) to generate an output and the infrastructure to run the one or more AI models. For example, the system receives an output generation request including an input for the generation of an output using one or more models from a plurality of models. The system can generate expected values for a set of output attributes (e.g., a type of the output generated from the input, a threshold response time of the generation of the output) of the output generation request. For each particular model in the plurality of models, the system can determine the capabilities of the particular model (e.g., estimated performance metric values for processing requests, system resource metric values indicating an estimated resource usage), and dynamically select a subset of models from the plurality of models. For the selected subset of models, the system can dynamically select a subset of available system resources to process the input included in the output generation request. The system generates the output by processing the input included in the output generation request using the selected subset of available system resources.

While the current description provides examples related to large language models (LLMs) and agents, one of skill in the art would understand that the disclosed techniques can apply to other forms of machine learning or algorithms, including unsupervised, semi-supervised, supervised, and reinforcement learning techniques. For example, the disclosed model orchestration platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Model Orchestration Platform

FIG. 1 shows a schematic illustrating an example environment 100 of orchestrating semi-autonomous or autonomous agents, in accordance with some implementations of the present technology. The environment 100 is implemented using components of example devices 200 and computing devices 302 illustrated and described in more detail with reference to FIG. 2 and FIG. 3, respectively. Implementations of example environment 100 can include different and/or additional components or can be connected in different ways.

The environment 100 includes a client 102, which may be any electronic device provisioned with digital computation and communication capability, such as a laptop, workstation, server endpoint, mobile processor, or embedded system, capable of generating, encoding, and transmitting semantically structured input data (e.g., prompts, search queries, command tokens) to the gateway router 106. The client 102 can be a personal computer, mobile device, or any other suitable computing device such as those with a user interface.

The gateway router 106 refers to an orchestration endpoint of the environment 100 that receives the prompt 104 from the client 102 and manages the distribution of processing tasks across multiple semi-autonomous or autonomous agents. The gateway router 106 can operate as a routing node and be implemented as a computer program executable on one or more processors of the client 102 or a different computing device. The gateway router 106 may, in some implementations, include a monolithic LLM. In some implementations, the gateway router can include a federated suite of models where each model can be specialized for different tasks (e.g., prompt segmentation, domain inference, agent selection) and the suite can operate under a meta-controller (potentially itself, an LLM, or other system) that arbitrates inter-model decisioning and delegates segmented tasks to the agent network. The gateway router 106 can include an active ensemble configuration, in which diverse models (e.g., transformer-based models, symbolic reasoners, reinforcement learning agents) run in coordinated or competitive execution, with routing decisions produced through model fusion and aggregation methods (e.g., MoE or majority/consensus voting).

In each case, the gateway router 106 partitions, segments, or otherwise decomposes the received prompt 104 into sub-queries 108 (e.g., a first sub-query 108*a*, a second sub-query 108*b*, a third sub-query 108*c*, and so forth). The sub-queries 108 each refer to a computational action unit that includes instructions such as data retrieval requests, each annotated with an output parameter set that can specify a user type (e.g., access-level), temporal context (timestamp), requested output modality (text, vector, file), performance requirements, system resource thresholds, and so forth.

The environment 100 includes multiple semi-autonomous or autonomous agents 110 (a first agent 110*a*, a second agent 110*b*, a third agent 110*c*, a fourth agent 110*d*, and so forth) that process the sub-queries 108 and generate agent responses 116 (e.g., a first agent response 116*a*, a second agent response 116*b*, a third agent response 116*c*, and so forth). The agents 110 refer to a persistent software entity that can be characterized by a digitally encoded objective function (e.g., maximization of task accuracy, minimization of resource usage, compliance with specified policy constraints). The instantiation of the objective function can be static (e.g., assigned at deployment) or dynamic, enabling runtime adaptation of the objective function in response to changes in environmental signals (such as resource state, input task complexity, geopolitical events, market data, user context, and the like). The agents 110 are enabled to receive unstructured, semi-structured, or structured environmental signals (e.g., prompt metadata, resource availability, inter-agent messages, contextual signals received from the gateway router 106), and use the environmental signals to autonomously trigger and manage actions such as application programming interface (API) invocations, outbound network requests, updates to internal or external datastores, and so forth.

The agents 110 can be structured as a network and/or a "constellation" of agents. For example, the agents 110 can be interconnected such that each agent operates as an autonomous or semi-autonomous node enabled to perform direct peer-to-peer interactions and/or hierarchical delegation. For example, a general agent can perform query parsing and context recognition, but subsequently route specialized sub-tasks to sub-agents with subject matter expertise (SMEs) (e.g., trained on a domain-specific dataset) in specific domains such as legal compliance, financial analysis, and so forth. Therefore, either the orchestrator agent can initially invoke only the general agent, which then further delegates sub-tasks, or the orchestrator agent can choose to directly identify and route work to the specialized sub-agent. For instance, in a financial services context, the gateway router can divide a trading query into segments for agents handling treasuries, equities, and derivatives, and then aggregate the results to produce an overall response.

The actions autonomously executed by the agents 110 can be responsive to a respective objective function of the agent. For example, an agent's objective function may direct it to maximize retrieval accuracy from a specific database, minimize task completion latency, or balance multiple criteria based on predefined weights. During autonomous execution, the agent 110 can determine a degree of expected utility of candidate actions by evaluating them against the agent's objective function and select executable actions that align with the agent's assigned objectives within any imposed operational constraints or boundaries set by the gateway router 106.

The agents 110 can vary in architecture. For example, the first agent 110*a* refers to a primary agent that receives sub-queries directly from the gateway router 106, and is enabled to autonomously communicate with the second agent 110*b* (e.g., spawn secondary sub-tasks or transfer execution context to other agents), which is not directly connected to the gateway router 106. The inter-agent communication enables collaborative problem-solving and knowledge sharing between different agents without direct orchestration from the gateway router 106. In another example, the third agent 110*c* refers to a directly connected agent that interfaces directly with the gateway router 106 for processing sub-queries. In yet another example, the fourth agent 110*d* refers to an agent enabled to autonomously connect to external applications 114, for example, via application programming interfaces (APIs) or other integration methods, to gather additional information or perform specific tasks to generate the third agent response 116*c*.

In some implementations, the gateway router 106 uses routing tables 112 to determine a candidate agent or combination of candidate agents to route the sub-query to. The routing tables 112 refer to data structures that store information associated with one or more respective agents 110, such as agent capabilities, knowledge bases connected to the agent, compliance status with certain guidelines (e.g., compliance with the EU AI Act, compliance with organizational guidelines), resources used by the agent, current workload, historical performance metrics, and so forth. The routing tables 112 can include multiple individual routing tables (such as a first routing table 112*a*, a second routing table 112*b*, a third routing table 112*c*, a fourth routing table 112*d*, and so forth) corresponding to different agents or agent types. Each routing table can include or otherwise indicate mappings between sub-query characteristics and agent capabilities, thereby enabling the gateway router 106 to use the information within the routing table when routing the sub-queries.

The fourth agent 110*d* in FIG. 1 communicatively connects with one or more external applications 114. The external applications 114 refer to third-party software systems, databases, or services that can be accessed by the agents 110 to supplement their knowledge base or operations. These external applications 114 can include data sources, computational tools, domain-specific APIs, and so forth.

Each agent generates an agent response 116 (e.g., the first agent response 116*a*, the second agent response 116*b*, the third agent response 116*c*, and so forth) based on the assigned sub-query 108. The agent responses 116 refer to unstructured, semi-structured, or structured output data that includes or otherwise indicates the results of a respective agent responsive to the assigned sub-query 108. The agent responses 116 can include text, structured data, or references to external resources. For instance, the agent responses 116 may include natural language text (such as summaries or explanations), structured outputs like JSON or XML objects, tabular data, executable scripts, or uniform resource identifiers (URIs) referencing files or computational results stored elsewhere. The agent responses 116 can include pointers to large datasets or content retrieved via external APIs (e.g., the external applications 114).

The gateway router 106 is enabled to receive or otherwise obtain these individual agent responses 116 and synthesize the agent responses 116 into an overall response 118. The gateway router 106 can, for example, concatenate or merge the agent responses 116. In some implementations, the gateway router 106 combines overlapping results, filters redundancies, resolves conflicts based on agent confidence scores or reliability metrics, and so forth. The gateway router 106, in some implementations, uses majority voting to aggregate the agent responses 116 when multiple agents provide alternative answers to the same logical sub-task. The gateway router 106, in some implementations, weighs or re-prioritizes agent responses in response to known user preferences, system policies, or observed trustworthiness (e.g., via an assigned reputation score) of specific agent/application pairs. Further methods of aggregating the agent responses 116 are discussed in detail with reference to FIG. 12. The overall response 118 can be transmitted back to the client 102 (e.g., via the gateway router 106) for presentation to the user.

Suitable Computing Environments for the Model Orchestration Platform

Figure 2:
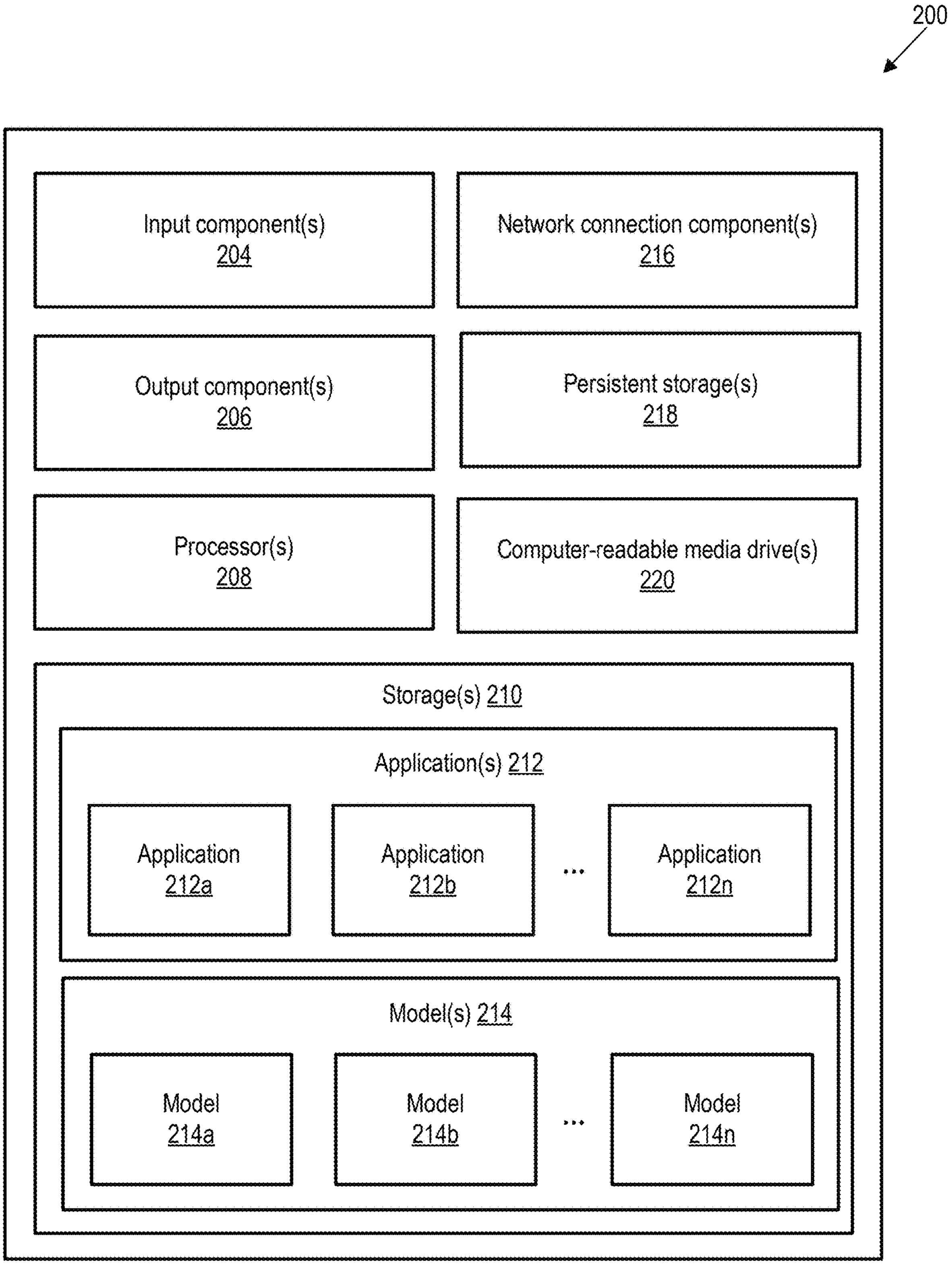
FIG. 2 shows a block diagram showing some of the components typically incorporated in at least some of the computer systems and other devices on which the disclosed system operates, in accordance with some implementations of the present technology.

FIG. 2 shows a block diagram showing some of the components typically incorporated in at least some of the computer systems and other devices 200 on which the disclosed system (e.g., the model orchestration platform) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
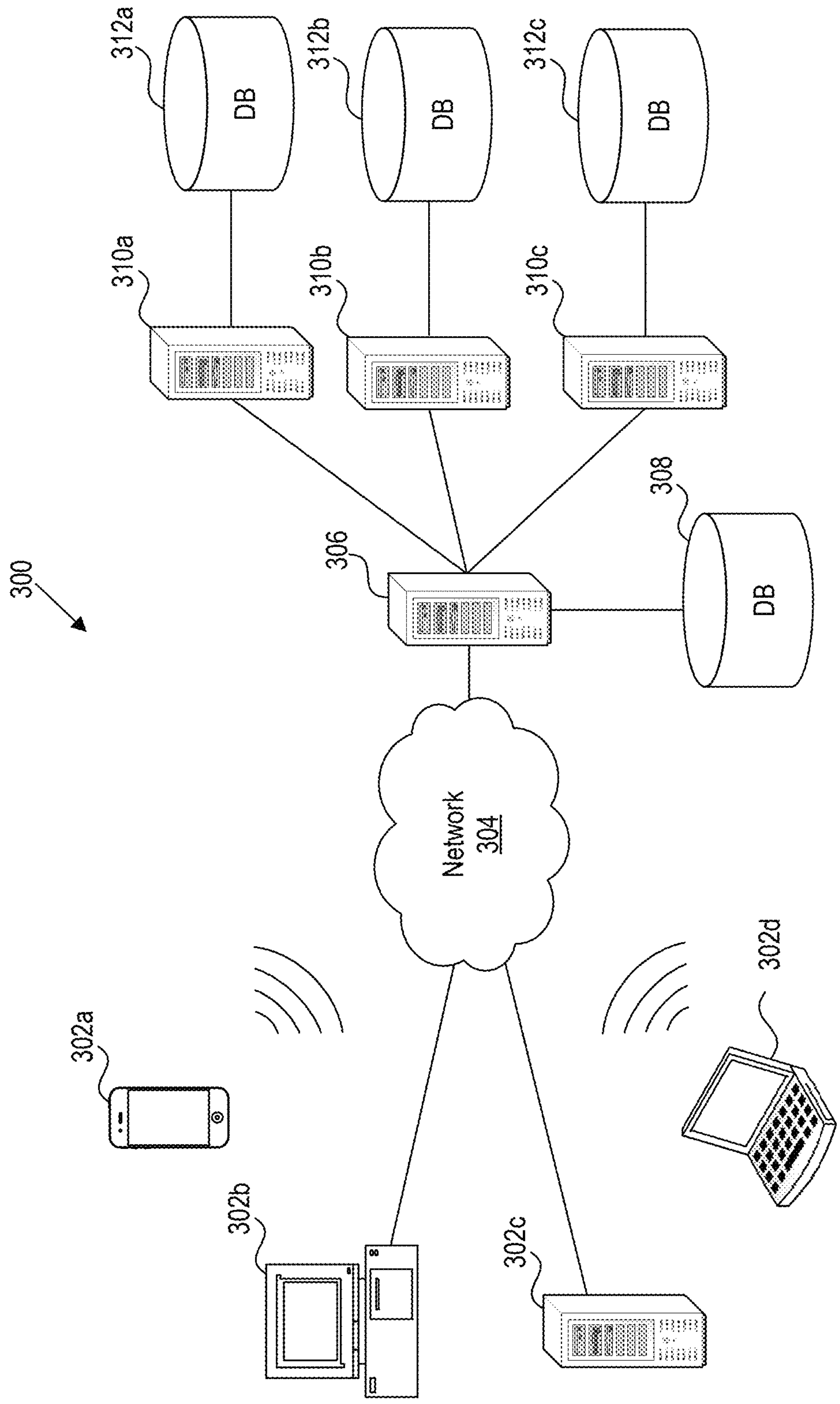
FIG. 3 is a system diagram illustrating an example of a computing environment in which the disclosed system operates, in accordance with some implementations of the present technology.

FIG. 3 is a system diagram illustrating an example of a computing environment 300 in which the disclosed system operates in some implementations of the present technology. In some implementations, environment 300 includes one or more client computing devices 302*a*-302*d*, examples of which can host graphical user interfaces associated with client devices. For example, one or more of the client computing devices 302*a*-302*d* includes user devices and/or devices associated with services requesting responses to queries from LLMs. Client computing devices 302 operate in a networked environment using logical connections through network 304 (e.g., the network 1350) to one or more remote computers, such as a server computing device (e.g., a server system housing the model orchestration platform). In some implementations, client computing devices 302 can correspond to device 200 (FIG. 2).

In some implementations, server computing device 306 is an edge server that receives client requests and coordinates fulfillment of those requests through other servers, such as server computing devices 310*a*-310*c*. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-310*c*) connect to a corresponding database (308, 312*a*-312*c*). For example, the corresponding database includes a database stored within the data node 1304 (e.g., a sensitive token database, an event database, or another suitable database). As discussed above, each server computing device 310 can correspond to a group of servers, and each of these servers can share a database or can have its own database (and/or interface with external databases, such as third-party databases 1308*a*-1308*n*). In addition to information described concerning the data node 1304 of FIG. 13, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 1350) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Overview of the Hierarchical Model Cascade

Figure 4:
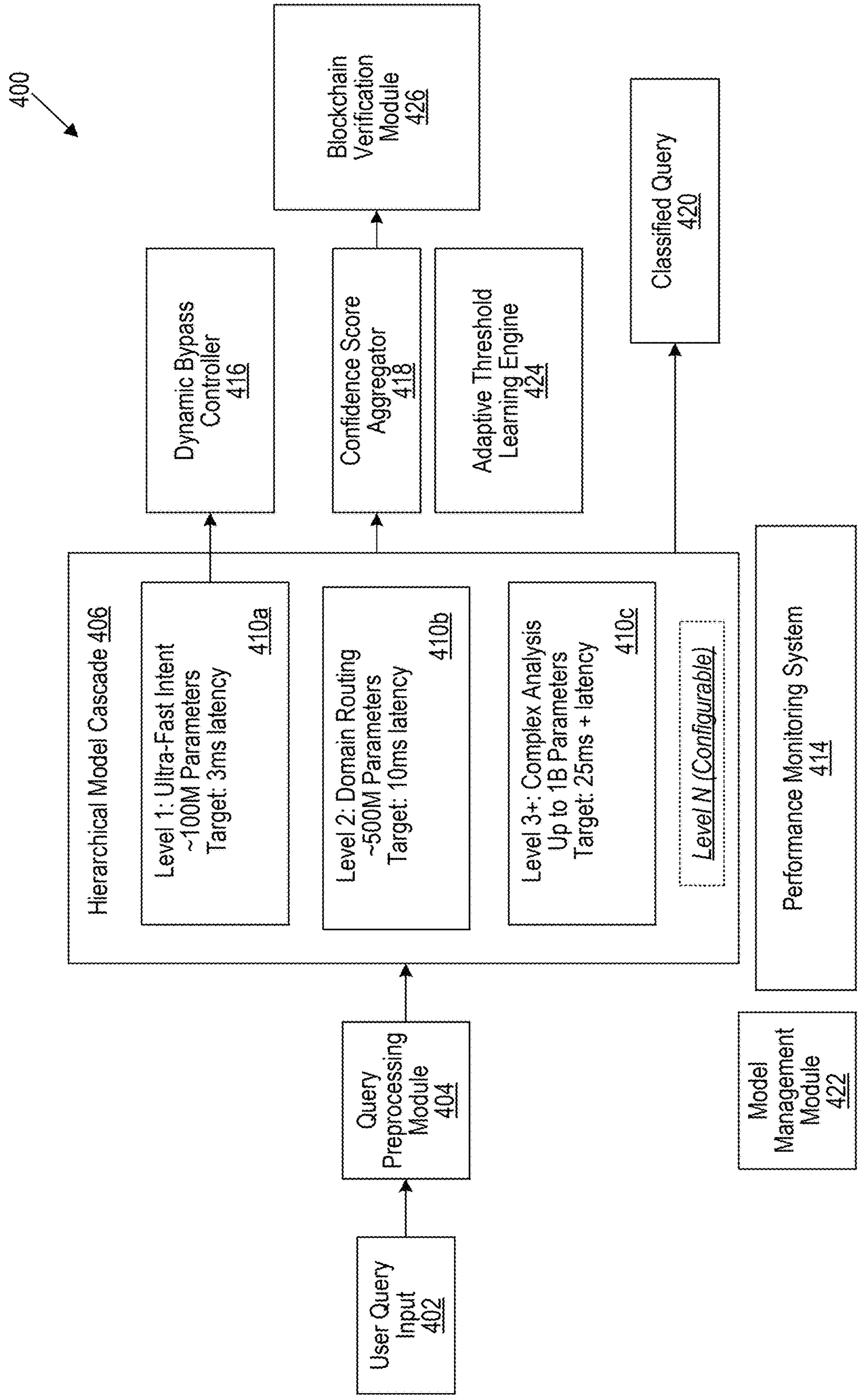
FIG. 4 shows a schematic illustrating an example architecture implementing a hierarchical model cascade for agent routing, in accordance with some implementations of the present technology.

FIG. 4 shows a schematic illustrating an example architecture 400 implementing a hierarchical model cascade for agent routing, in accordance with some implementations of the present technology. The architecture 400 is implemented using one or more computing systems, such as example device 200 and computing device 302 illustrated and described in more detail with respect to FIG. 2 and FIG. 3, respectively. Implementations of example architecture 400 can be carried out on multiple such devices (e.g., connected through a network) connected in various ways. The components included in the architecture 400 (e.g., the levels 410 and/or the models implemented thereby) can be configured based on deployment requirements for a specific deployment and/or system implementing the architecture 400.

The architecture 400 receives a query 402. The query 402 can be received by a user interface, which can be implemented on the client 102 of FIG. 1, and can be received through API endpoints (e.g., for message queues). The client 102 can maintain metadata associated with a user, such as access permissions for databases connected the system. The query 402 can be a natural language query (or request, command) requesting generation of an output using one or more AI agents. The architecture 400 can be connected to multiple downstream AI agents (e.g., via a network connection, API interface), such as the AI agents 110 in FIG. 1. Each AI agent can have a specific task or focus, such as managing inventory, making purchases, or providing customer service. The architecture 400 can be configured to route the query 402 to a set of one or more downstream AI agents that are chosen from multiple AI agents. The AI agents can be chosen such that the agents are capable of addressing the query (e.g., generating a response and/or performing an action according to a request of the query) and generating an output.

The architecture 400 includes a query preprocessing module 404. The query preprocessing module can perform an initial analysis on the query 402 and generate a query representation for use by the hierarchical model cascade 406, such as by transforming the query 402 into one or more representations used by models of the hierarchical model cascade 406. For example, the query preprocessing module 404 can perform tokenization on the query 402 (e.g., using a subword algorithm), language detection, normalization, and/or generate feature vectors for the query 402 (e.g., using a language model). In some implementations, the architecture 400 does not implement a query preprocessing module 404, and the query representation is the query 402. The query representation (e.g., the query 402, the set of tokens, and/or a vector representation including one or more feature vectors) can be transmitted to the components of the architecture 400 (e.g., the levels 410) for processing and classification. The query preprocessing module 404 can additionally generate estimates for the length and/or complexity of the query 402, which can determine models and/or dynamic bypass paths for the hierarchical model cascade 406, as described in more detail with respect to FIG. 5.

The architecture 400 includes a hierarchical model cascade 406. The hierarchical model cascade 406 can include one or more levels (such as a first level 410*a*, a second level 410*b*, a third level 410*c*, and so forth). Each level 410 is configured to process intermediate classification data, including the query representation (e.g., the query 402 and/or output from the query preprocessing module 404) and/or output from one or more other levels 410. Each level 410 can be configured to perform a certain task or characterize a certain aspect of the query 402, and can produce a classification and a confidence score. The classification can correspond to one or more AI agents. For example, the classification can indicate that the query 402 has an intent to generate travel recommendations, and one or more AI agents can specialize in generating travel recommendations. The confidence score can be a number (e.g., between 0 and 1) that predicts the likelihood that the generated classification accurately and/or fully characterizes the query. In some implementations, a level 410 (e.g., the first level 410*a*) classifies a query into one of multiple topics (e.g., travel, finance, health). The confidence score for the level 410 can be high when the query is simple (e.g., containing a single request, a small number of tokens, containing keyword tokens that are related to each other) and the classification accurately characterizes the entire query. The confidence score can be lower when the query has multiple parts (e.g., includes multiple and diverse questions) and requires a more nuanced classification description (e.g., a classification of a topic and/or an intent). The confidence score can be low when the query is ambiguous, includes keywords from multiple domains, and/or does not correspond directly to an AI agent (e.g., when no available AI agents are specialized to address the query in terms of required information retrieval and/or actions to be executed).

Each level 410 can include one or more AI models, such as language models, and can include a combination of general-purpose models and specialized and/or fine-tuned models. The models implemented at each level 410 can be chosen to balance computational complexity (which can lead to more accurate results) with computational efficiency (which can lead to faster results and less latency for the end user). In some implementations, one or more models are small language models (SLMs), which can be models with less than 1 billion parameters. In some implementations, a model is created using knowledge distillation. For example, a model can be created by using a larger (e.g., more complex) model to train a smaller (e.g., more efficient) model for a particular task (e.g., intent classification) without loss of validity. Each model can receive the intermediate classification data, which can include natural language prompts and/or structured data, such as text in a JSON or XML format. The models used in a particular level 410 can be activated in sequence and/or in parallel. In some implementations, a particular level 410 includes two or more models that are given an input and operated in parallel, and the particular level 410 further aggregates and/or concatenates the outputs of the models (potentially by using another model, such as a language model). In some implementations, a particular level 410 includes two or more models, wherein an output from a first model is used to conditionally determine if a second model will be engaged to process input data. In some implementations, a particular level 410 includes a first model that processes input data and makes a determination of one or more subsequent models to engage in processing input data. In some implementations, and as described in more detail below, one or more models of one or more levels 410 are determined and/or controlled by a model management module 422. The model management module 422 can determine types of models and/or model versions used by the levels 410.

The levels 410 are arranged in an ordered hierarchy of levels. Higher levels of the hierarchy may be more complex (e.g., include language models with more parameters), perform more advanced analysis, and/or have less strict latency requirements compared to lower levels. For example, and as explained in more detail below, subsequent levels 410 of the hierarchy can be configured to perform a more complex analysis and classification of the query 402, at the expense of requiring more computational resources (e.g., implementing models with higher parameter counts) and more compute time. Furthermore, the architecture 400 can implement dynamic engagement of each level 410. For example, and as described in more detail with respect to FIGS. 5 and 6, one or more levels 410 of the hierarchical model cascade 406 can be dynamically bypassed to reduce latency and spare computational resources. For example, if the first level 410*a* generates a classification with a high confidence score, the architecture 400 can bypass the second level 410*b* and/or the third level 410*c* and route the query 402 (e.g., the intermediate classification data) to one or more downstream agents and/or systems based on the classification.

The first level 410*a* can be configured for recognition and/or classification of an intent of the query 402. For example, the first level 410*a* can classify the query into a subject class (e.g., travel, health, finance) and/or an intent (e.g., information search, purchase request, availability request). The first level 410*a* can contain language models with strict complexity and/or latency constraints. For example, the first level 410*a* can have a target latency of 3 ms and/or can include one or more small language models with a total of approximately 100 million parameters. The first level 410*a* can include one or more language models that are fine-tuned for intent recognition, such as small language models derived from larger language models via knowledge distillation. The models can be further optimized by performing quantization on a model (e.g., reducing memory size by reducing numerical precision, such as by replacing 64-bit numbers with 32-bit numbers or 16-bit numbers). The language models in the first level 410*a* can be activated in series and/or in parallel to produce one or more outputs, and the outputs can be aggregated (possibly by another language model) to produce classifications and/or confidence scores.

The second level 410*b* can be configured for classifying the query 402 into specific domains of AI agent categories. The second level 410*b* can contain language models with less strict complexity and/or latency constraints. For example, the second level 410*b* can have a target latency of 10 ms and/or can include one or more language models with a total of approximately 500 million parameters. The second level 410*b* can include one or more language models that are fine-tuned for generating domain-specific routing and/or classifications of queries. For example, if the query 402 is classified under "travel," the domain can include itinerary optimization, cost-efficient travel recommendation, or flight purchase request. The domain can correspond to a category or type of one or more AI agents. For example, if the domain or agent category is flight purchase request, the query can be routed to an AI that is enabled to make purchases (e.g., on behalf of the user submitting the query 402).

The third level 410*c* can be configured for a complex or nuanced analysis of the query 402. For example, the third level 410*c* can perform query decomposition (e.g., into multiple sub-queries, such as sub-queries 108 of FIG. 1, and/or multiple sub-tasks, each directed to particular downstream agents), ambiguity resolution, routing path determination, and/or detection of multiple query intents. The third level 410*c* can have more relaxed complexity and/or latency constraints (e.g., when compared to levels 410*a* and 410*b*). For example, the third level 410*c* can have a target latency of 25 ms or more and/or can include one or more language models with a total of up to 1 billion total parameters.

The hierarchical model cascade 406 can include additional levels 410 for processing and/or classifying the query 402 (e.g., the intermediate classification data). In some implementations, the hierarchical model cascade 406 includes additional levels (e.g., a fourth level) configured to perform more complex or nuanced analysis than the third level 410*c*, with more relaxed complexity and/or latency constraints than the third level 410*c*. In some implementations, the levels 410 have a different focus or intent than presented in FIG. 4 and/or have different complexity and/or latency constraints.

The architecture 400 can include a model management module 422. The model management module 422 can determine and/or implement the types and/or versions of models used in the levels 410 of the hierarchical model cascade 406. The model management module store or otherwise access a model repository that stores model weights and configurations for multiple models. In some implementations, the model management module 422 can store multiple versions of a model (e.g., different values for the model weights and/or parameters) and manages model version control and/or rollback. The model management module 422 can be used to instantiate models of the architecture 400, such as by performing model loading and caching. The model repository can include updated versions of existing models, where the updated versions have been trained and/or fine-tuned based in part on feedback of classifications generated by the architecture 400, as described in more detail with respect to FIG. 8. In some implementations, the model management module 422 can enable hot-swapping of models (e.g., modifying a model's weights while the architecture 400 is online and actively generating classifications of queries 402). The model management module 422 can retrieve model reputations for each model and determine which models are to be implemented in each level 410. As described in more detail with respect to FIG. 10, model reputations can quantify model performance metrics, such as accuracy. In some implementations, a performance metric, such as accuracy, can be separately recorded for individual classifications and/or sets of classifications. For example, the model management module 422 can determine a shift in input queries 402 towards certain categories (e.g., a trend in which queries 402 are more frequently addressed to certain actions or topics) and load models that have a higher recorded accuracy for classifying (e.g., classifying multiple intents and/or generating routing decisions) the more frequent categories. The model management module 422 can receive feedback from a level to record historical classification trends, and subsequently implement optimized models for use in subsequent levels.

The architecture 400 can include a dynamic bypass controller 416. As described in more detail with respect to FIG. 5, The dynamic bypass controller 416 can receive confidence scores generated by a level 410 and determine how the intermediate classification data should be processed by additional levels 410 of the hierarchical model cascade 406. In some implementations, the bypass controller 416 maintains a threshold data structure containing one or more threshold confidence values (e.g., one for each level 410). If a confidence score generated by a first level 410 received by the bypass controller 416 is below a threshold confidence value, then the subsequent level 410 is engaged to process the data. If the confidence score is above the threshold confidence value, then the subsequent level 410 can be bypassed. For example, the data can be processed by a subsequent level 410 and/or used to directly generate classification results and/or the classified query 420.

In some implementations, the dynamic bypass controller 416 uses output from a confidence score aggregator 418 to determine bypass decisions. The confidence score aggregator 418 can create composite confidence metrics by combining confidence scores from multiple models and/or levels 410 based on relative weights. That is, the confidence score aggregator 418 can generate a single confidence score for a particular level 410 by calculating a weighted average of confidence scores generated by models of the particular level 410. In some implementations, the confidence score aggregator 418 calculates a weighted average in which each confidence score is weighted by a reputation of the corresponding model. In some implementations, the confidence score aggregator 418 normalizes the confidence scores based on model architecture. For example, if a first model outputs a first confidence score between 0 and 1 and a second model outputs a second confidence score between 0 and 10, the confidence score aggregator 418 can scale the second confidence score by 0.1 so that the first and second confidence scores are between 0 and 1.

In some implementations, the dynamic bypass controller 416 uses data in addition to, or alternatively to, confidence scores. For example, the dynamic bypass controller 416 can receive query metadata, such as a complexity, a length, a number of intents, and/or a domain of the query 402, which can be used to determine whether a level 410 should be bypassed. Additionally, or alternatively, dynamic bypass controller 416 can receive or retrieve metadata associated with the architecture 400, such as characteristics of the models used in the levels 410 (e.g., speed/latency, computational complexity, expected outputs), characteristics of the downstream agents and/or systems, and/or a current computational load of a system implementing the architecture 400, and use this metadata to determine whether a level 410 should be bypassed. For example, the dynamic bypass controller 416 can receive information from a performance monitoring system 414 that measures and records system metrics and model performance for the hierarchical model cascade 406 (e.g., the levels 410 and/or models included therein). The performance characteristics for a model and/or level can include latency, accuracy, throughput, queue depth, resource utilization (e.g., CPU, GPU, memory/RAM).

In some implementations, bypass parameters that determine the decision of the dynamic bypass controller 416 are dynamic, and can be updated and/or fine-tuned. For example, threshold confidence values for each level 410 and/or parameters associated with additional data used to make a bypass decision, such as relative metadata weights, can be updated based on feedback from downstream AI agents and/or users. As described in more detail with respect to FIG. 8, the architecture 400 can include an adaptive threshold learning system 424 that can use feedback information to determine new values for the bypass parameters. In some implementations, the architecture 400 can store records of historical classification data in a log database. Each record can include data and/or metadata about the processing of the query 402, such as a representation of the query (e.g., vector representations, tokens, sub-queries), one or more confidence scores, one or more classifications, identifiers of one or more models used to process the query 402, a routing decision (e.g., identifiers of one or more downstream agents used to address the query 402), a latency associated with one or more levels 410, and the like. The adaptive threshold learning system 424 can receive feedback from the performance monitoring system 414 and/or downstream monitoring systems for downstream agents and/or systems, and use the feedback and/or records from the log database to subsequently update bypass parameters used by the dynamic bypass controller 416. In some implementations, the adaptive threshold learning system 424 analyzes accuracy patterns across different query types (e.g., determines correlations between confidence scores, classifications, and model accuracy). Accuracy data can be collected based on feedback information received from downstream agents and/or user feedback.

Once the query 402 and/or intermediate classification data has been processed by the one or more levels 410 of the hierarchical model cascade 406, the architecture 400 can generate compiled results. The compiled results can include classification results from all engaged levels 410 (e.g., a primary classification and/or alternative classifications), routing recommendations, and/or processing metadata (e.g., model identifiers, latencies). The architecture 400 can use the compiled results to generate a classified query 420. The classified query 420 can include information used to generate an output by one or more AI agents. For example, the classified query 420 can include the query 402 and/or a plurality of sub-queries generated from the query 402, one or more classifications of the query (e.g., a class, an intent, a domain), and/or one or more indications of AI agents for the classified query 420 to be routed to. Once the classified query 420 is generated, it can be routed to downstream agents and/or systems, such as AI agents 110 and/or the gateway router 106 of FIG. 1. In some implementations, the architecture 400 is implemented on the gateway router 106, where the architecture 400 generates the subqueries 108 from the query 402 and determines a routing path of one or more agents 110 for the subqueries 108.

In some implementations, the architecture 400 includes a security filter to prevent queries from being routed to particular AI agents. For example, the security filter can analyze the query 402 and/or query metadata (e.g., user context, such as user privileges) to prevent the query 402 from being addressed by an AI agent that has access to privileged information that the user does not have access to. Additionally, or alternatively, the security filter can prevent certain input (e.g., inappropriate or impermissible text) from being routed to one or more AI agents. For example, the architecture 400 can route the query 402 to a set of AI agents after determining that one or more predefined terms are absent from the query 402. In some implementations, and as described in more detail with respect to FIG. 16, the architecture 400 can also remove such forbidden tokens from a query 402 (e.g., input validation).

In some implementations, the architecture 400 implements a blockchain manager 426. The blockchain manager 426 can integrate the architecture 400 with distributed ledger technology to generate audit trails for the processing of the query 402 through the architecture 400 and to implement audit verification using the blockchain. The blockchain manager 426 can generate a cryptographic attestation of the query 402, which can include a timestamp, levels 410 and/or models used to process the query 402, and/or one or more characteristics of the query 402 (e.g., length, complexity, one or more confidence scores). The blockchain manager 426 can format the attestations for storage in a distributed ledger and/or blockchain, and can manage on-chain transaction submissions.

The architecture 400 can implement multiple strategies for improving computational efficiency and total throughput. Multiple independent classification levels 410 can be executed in parallel (e.g., if the dynamic bypass controller 416 determines that two or more levels will be engaged). The architecture 400 can implement batch processing for multiple queries to be processed in parallel. The architecture 400 can implement load balancing across multiple instances of a single model (e.g., where one of multiple instances of a model is chosen based on a queue depth of each instance). The architecture 400 can implement dynamic allocation of compute resources for optimal resource usage. For example, the architecture 400 can implement memory pooling for model loading and/or GPU scheduling for optimal utilization. Hardware-specific optimizations can be implemented for processing units such as CPUs, GPUs, and/or TPUs. The architecture 400 can implement memory caching of components and/or results. For example, the architecture 400 can implement query result caching for use in repeated classifications, model weight caching in memory (e.g., RAM), feature vector caching for similar queries, and/or blockchain proof caching for rapid verification. Components of the architecture 400 can be implemented in containers to facilitate scalability.

In some implementations, the architecture 400 displays results on a user interface. For example, the architecture 400 can cause display on a user interface of representations of agent-generated responses addressing the query 402 and/or query classification data (e.g., confidence scores, classifications, identifiers of one or more models and/or agents used to process the query 402). The user interface can include a dashboard and/or other predefined representation formats. The representations can be determined in part by the results of the query classification. For example, the representations can be displayed in accordance with a display attribute set (e.g., color, size, position) determined based on one or more confidence scores.

Dynamic Bypass Paths

Figure 5:
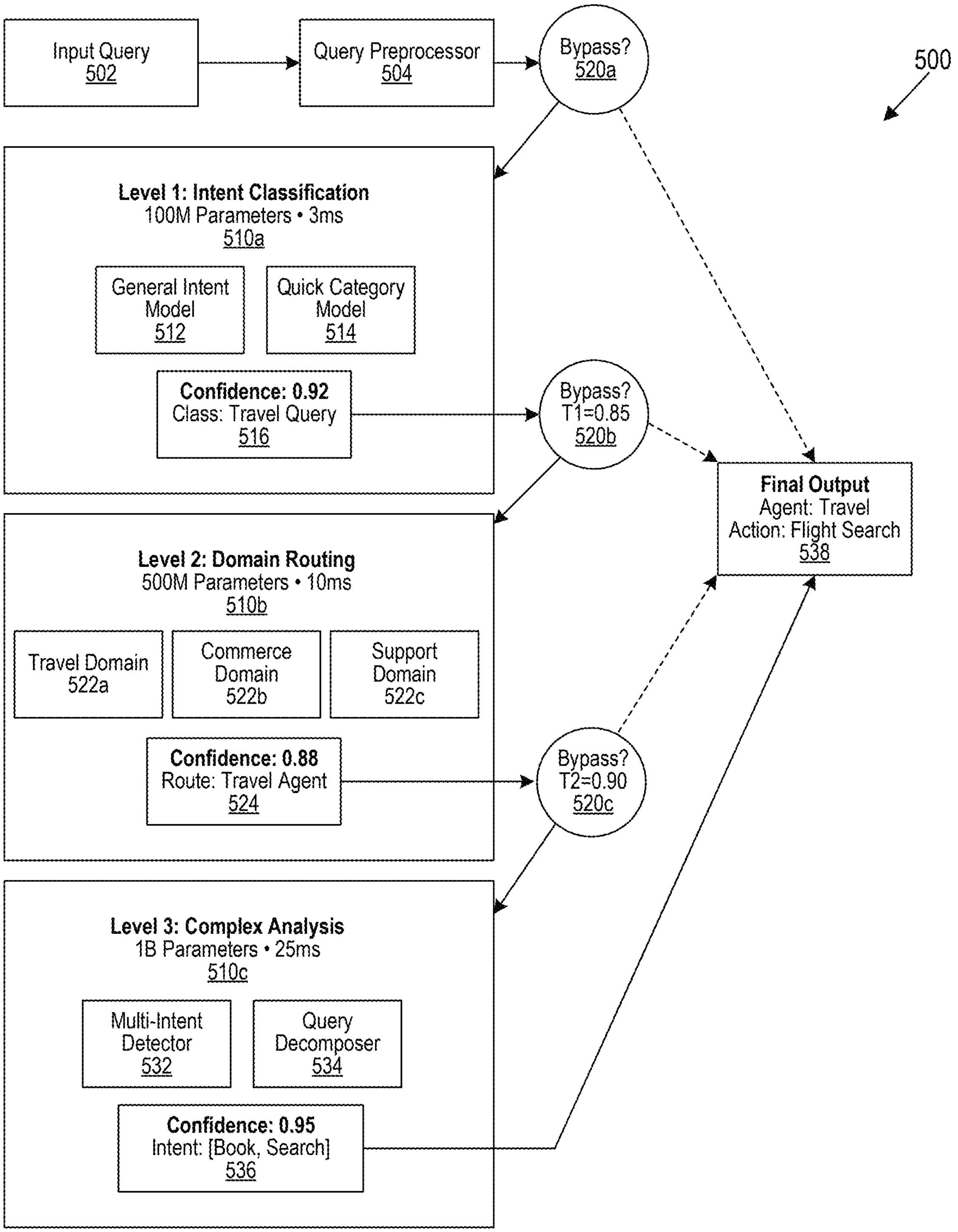
FIG. 5 shows a schematic illustrating an example architecture for implementing a dynamic bypass mechanism in a hierarchical model cascade, in accordance with some implementations of the present technology.

FIG. 5 shows a schematic illustrating an example architecture 500 for implementing a dynamic bypass mechanism in a hierarchical model cascade, in accordance with some implementations of the present technology. The architecture 500 is implemented on one or more computing systems, such as example devices 200 and computing devices 302 illustrated and described in more detail with respect to FIG. 2 and FIG. 3, respectively. The architecture 500 can implement aspects of the architecture 400, such as the hierarchical model cascade 406 and dynamic bypass controller 416, described with respect to FIG. 4. Implementations of FIG. 5 can include different and/or additional components or can be connected in different ways. The components included in the architecture 500 (e.g., the levels 510 and/or the models implemented thereby) can be configured based on deployment requirements for a specific deployment and/or system implementing the architecture 500.

The architecture 500 receives an input query 502. The query 502 can be received from a user interface, which can be implemented on the client 102 of FIG. 1. The query 502 can be a natural language query requesting generation of an output using one or more AI agents. The architecture 500 can be connected to multiple AI agents (e.g., via a network connection, API interface), such as the AI agents 110 in FIG. 1. Each AI agent can have a specific task or focus. The architecture 500 can be configured to route the query 502 to one or more downstream AI agents that are chosen from multiple AI agents.

The architecture 500 includes a hierarchical model cascade with three levels 510*a*-510*c*. The levels 510 are arranged hierarchically, with the first level 510*a* as the lowest level and the third level 510*c* as the highest level. Each level 510 can be configured to process data, such as the input query 502, output from the query preprocessing module 504, and/or output from one or more levels 510 and generate one or more query classifications and one or more confidence scores. The query classifications and/or confidence scores can be processed by one or more dynamic bypass controllers 520.

The dynamic bypass controllers 520 determine a dynamic bypass path through the architecture 500 based at least in part on the confidence scores. The dynamic bypass path can include one or more levels 510 that are engaged to sequentially process the query 502. For example, an input query 502 can be processed by the first level 510*a*, resulting in a high confidence score, and subsequently processed by the third level 510*c*, thereby bypassing the second level 510*b*. Alternatively, an input query 502 can be processed by the first level 510*a*, resulting in a low confidence score, subsequently processed by the second level 510*b*, resulting in a high confidence score, and subsequently used to directly generate a final output 538, thereby bypassing the third level 510*c*. In some implementations, two or more of the dynamic bypass controllers 520*a*-520*c* are a single dynamic bypass controller configured to determine dynamic bypass paths for multiple levels 510. For example, a single dynamic bypass controller can receive data from the first level 510*a* to determine if the second level 510*b* should be bypassed, and can also receive data from the second level 510*b* to determine if the third level 510*c* should be bypassed.

The dynamic bypass controllers 520 can process intermediate classification data, including query data, such as the query 502 and/or output from the query preprocessing module 504 (e.g., tokens, feature vectors), and/or level outputs, such as classifications and confidence scores generated by the levels 510. In some implementations, the dynamic bypass controllers 520 determine a dynamic bypass path at least in part by comparing a confidence score to a threshold confidence value. For example, the dynamic bypass controllers 520 can maintain a threshold data structure that stores one or more thresholds, such as threshold confidence values, each associated with a level 510.

In some implementations, the dynamic bypass controllers 520 determine a dynamic bypass path at least in part by using a classification of the query 502 (e.g., as generated by the first level 510*a*). For example, the dynamic bypass controllers 520 can bypass one or more levels 510 in response to a classification category being well-defined (e.g., clearly capable of being suitably addressed with a particular action, such as presenting specific information) or in response to the classification being supported by downstream agent availability (e.g., if a downstream agent is configured to address queries corresponding to the classification). In some implementations, the dynamic bypass controllers 520 use historical data about previous dynamic bypass paths. For example, the dynamic bypass controllers 520 can identify that queries 502 designated with a certain classification and confidence score have historically been accurately characterized and/or addressed by using a particular dynamic bypass path, and use the particular dynamic bypass path for future queries with the certain classification and confidence score. The dynamic bypass controllers 520 may use one or more historical performance metrics (e.g., average accuracy, latency) to determine the dynamic bypass path. In some implementations, the dynamic bypass controllers 520 can maintain fallback paths for uncertain classifications. For example, the dynamic bypass controllers 520 can engage one or more additional levels and/or specialized models in response to the final outputs and/or confidence scores of the levels 510 indicating an uncertain classification.

In some implementations, the dynamic bypass controllers 520 determine a dynamic bypass path at least in part by evaluating complexity characteristics of the query 502. For example, the dynamic bypass controllers 520 can bypass one or more levels 510 in response to the query 502 being short (e.g., comprising fewer than five tokens). Additionally, or alternatively, the dynamic bypass controllers 520 can engage higher levels 510 in response to the query 502 having multiple detected intents (e.g., having intent multiplicity). In some implementations, the dynamic bypass controllers 520 can engage specialized models in response to the presence of domain-specific keywords in the query 502. For example, the dynamic bypass controller 520 can engage a particular level 510 while causing certain specialized models of the level 510, associated with the domain-specific keywords, to be engaged in processing the query 502.

In some implementations, the dynamic bypass controllers 520 determine a dynamic bypass path at least in part by evaluating current system load. For example, the dynamic bypass controllers 520 can implement more aggressive bypassing of levels 510 (e.g., causing more frequent decisions to bypass a level 510) in response to high load conditions, thereby reducing overall latency. In some implementations, the dynamic bypass controllers 520 can engage additional levels 510 in response to low load conditions, thereby improving accuracy. Further, the dynamic bypass controllers 520 can determine dynamic bypass decisions at least in part by evaluating queue depths at each level 510. For example, if a particular level 510 has a large number of queries 502 that are set to be processed by the particular level 510, the dynamic bypass controller 520 can bypass the particular level 510 and engage a higher level 510 to process the query 502.

In some implementations, the dynamic bypass controllers 520 include one or more dynamic parameters. For example, the dynamic bypass controllers 520 can compare a confidence score to a threshold confidence value, where the threshold confidence value is dynamically updated based on additional inputs to the dynamic bypass controllers 520. The additional inputs can include complexity characteristics of the query (e.g., length, number of intents), current system load, model reputations, historical performance metrics, availability of downstream agents and/or systems, and the like. The dynamic parameters can be periodically updated (e.g., at regular time intervals and/or after a predetermined number of query classifications).

In some implementations, the dynamic bypass controllers 520 include one or more learned parameters. As described in more detail with respect to FIG. 8, the dynamic bypass controllers 520 can include one or more parameters (e.g., confidence threshold values, relative weights for composite scores) that are dynamically updated based on feedback (e.g., from users and/or downstream agents and/or systems).

The architecture 500 can process an input query 502 using a query preprocessing module 504. The query preprocessing module 504 can perform tokenization on the input query 502 and/or generate feature vectors for the query. The query preprocessing module 504 can additionally generate estimates for the length and/or complexity of the query 502. In some implementations, the output of the query preprocessing module 504 is used by a preliminary dynamic bypass controller 520*a* to determine if one or more levels 510 should be bypassed. For example, if the query 502 is determined to be long, complex, and/or include multiple intents, the preliminary dynamic bypass controller 520*a* can bypass the first level 510*a* and proceed directly to the second level 510*b*. Alternatively, the preliminary dynamic bypass controller 520*a* can cause the query 502 (and/or the output of the query preprocessing module 504) to be processed by the first level 510*a* and the second level 510*b* in parallel and/or simultaneously, rather than sequentially and/or conditionally (e.g., the second level 510*b* being conditioned on the output of the first level 510*a*).

In some implementations, the preliminary dynamic bypass controller 520*a* uses a feature vector generated for the query 502 to determine a dynamic bypass path. For example, the preliminary dynamic bypass controller 520*a* can compare the feature vector to a database containing other feature vectors, determine that the feature vector is similar to a particular feature vector, and choose a dynamic bypass path that previously led to a positive outcome for the query corresponding to the particular feature vector. Choosing the dynamic bypass path can include choosing all levels 510 that will be engaged to process the input query 502 and/or choosing one or more levels 510 (e.g., choosing to bypass the first level 510*a*, where later dynamic bypass controllers 520 determine further level engagements and/or dynamic bypass paths). The feature vectors contained in the database can be updated over time as input queries 502 are encoded into feature vectors, processed by the architecture 500 and/or downstream agents and/or systems, and feedback is received on the input queries 502.

The first level 510*a* is configured to determine and/or classify an intent of the query 502. The first level 510*a* can receive the input query 502 and/or related data (e.g., output from the query preprocessing module 504). The output 516 of the first level 510*a* includes a class (e.g., a classification of an intention of the query 502) and a confidence score. The first level 510*a* can implement one or more AI models, such as language models. In some implementations, the first level 510*a* includes a general intent model 512. The general intent model 512 can be a model designed to generate an intent classification from the input query 502, such as information retrieval, content generation, or purchase intent. In some implementations, the first level 510*a* includes a quick category model 514. The quick category model 514 can be a specialized model configured to generate a category of the query 502, such as travel, health, or finance, and/or to perform within certain computational resource and/or latency constraints.

The first dynamic bypass controller 520*b* corresponding to the first level 510*a* processes the output 516 to determine whether the second level 510*b* will be engaged or bypassed. The first dynamic bypass controller 520*b* determines if and how subsequent levels 510 of the hierarchical model cascade will be engaged to process the query 502. In some implementations, the first dynamic bypass controller 520*b* will select only the second level 510*b* for processing the query 502. For example, the second level 510*b* can be selected to process the query 502 and the second dynamic bypass controller 520*c* can subsequently determine further levels 510 to engage. In some implementations, only the third level 510*c* is selected, thus bypassing the second level 510*b*. In some implementations, the second level 510*b* and the third level 510*c* are selected to process the query 502 in parallel. For example, the first dynamic bypass controller 520*b* can determine that the query 502 will likely need complex analysis to determine an accurate classification and/or routing. In some implementations, all subsequent levels 510 are bypassed, and a final output 538 is subsequently generated.

In some implementations, the first dynamic bypass controller 520*b* additionally processes the query 502 and/or related data, such as the output of the query preprocessing module 504 and/or the preliminary bypass controller 520*a*. For example, the first dynamic bypass controller 520*b* can decide to bypass one or more levels 510 if (a) the confidence score is above a threshold confidence value and/or (b) the query complexity is low and/or if no ambiguities are detected in the query 502. In some implementations, the first dynamic bypass controller 520*b* uses parameters that are dynamically updated during implementation of the architecture 500. For example, the threshold confidence value can be updated based on an accuracy rate (e.g., the threshold confidence value can be increased if feedback indicates that bypassing a levels 510 historically leads to less accurate classifications and/or routing decisions).

The second level 510*b* can be configured to determine a domain 522 of the query 502. The domain 522 of the query 502 can correspond to one or more downstream agents that are configured to process the query 502. For example, the domain 522 of the query 502 can be a travel domain 522*a*, a commerce domain 522*b*, or a support domain 522*c* (e.g., customer support). The output 524 of the second level 510*b* includes a route and a confidence score. The route can identify one or more downstream agents and/or systems to process the query 502 and related data (e.g., classifications).

The second dynamic bypass controller 520*c* corresponding to the second level 510*b* processes the output 524 of the second level 510*b* to determine whether the third level 510*c* will be engaged or bypassed (e.g., whether the final output 538 will be generated without using the output 536 of the third level 510*c*). In some implementations, the second dynamic bypass controller 520*c* additionally processes the query 502 and/or related data, such as the output of the query preprocessing module 504, the preliminary bypass controller 520*a*, the output 516 of the first level 510*a*, and/or the output of the first dynamic bypass controller 520*b*.

The third level 510*c* is configured to perform a complex analysis of the query 502. The third level 510*c* can receive the input query 502 and/or related data (e.g., outputs from the query preprocessing module 504, one or more dynamic bypass controllers 520, and/or outputs from one or more previous levels 510). The third level 510*c* can include multiple components directed at performing a particular analysis of the query 502. The multi-intent detector 232 can determine if the query 502 contains multiple intents (e.g., searching for information on flights, optimizing an itinerary for each flight, and ranking the results) and/or can determine and/or classify the multiple intents. The query decomposer 234 can generate sub-queries from the query 502. Each sub-query can be directed to a different topic, domain, intent, or action. Each sub-query can be directed to a different downstream agent and/or system for individual, specialized processing. The output 536 of the third level 510*c* includes a confidence score, and can include an indication of multiple intents and/or a list of detected/classified intents. The output 536 can include one or more sub-queries of query 502.

The final output 538 can include the query 502 and related data, such as the outputs of the query preprocessing module 504, the outputs of the one or more levels 510, and/or the outputs of the dynamic bypass controllers 520. The final output 238 can include one or more sub-queries, and can include a routing path for the query 502 and/or the sub queries that indicates a set of downstream agents and/or systems that will analyze the query 502 and/or sub-queries. The routing path can depend on user metadata, such as access permissions for databases connected to the system and/or agents. For example, the routing path can avoid agents that have access to privileged or restricted databases. The final output 538 can include an action that is to be performed by the downstream agents and/or systems, which can align with a detected intent of the query 502.

Figure 6:
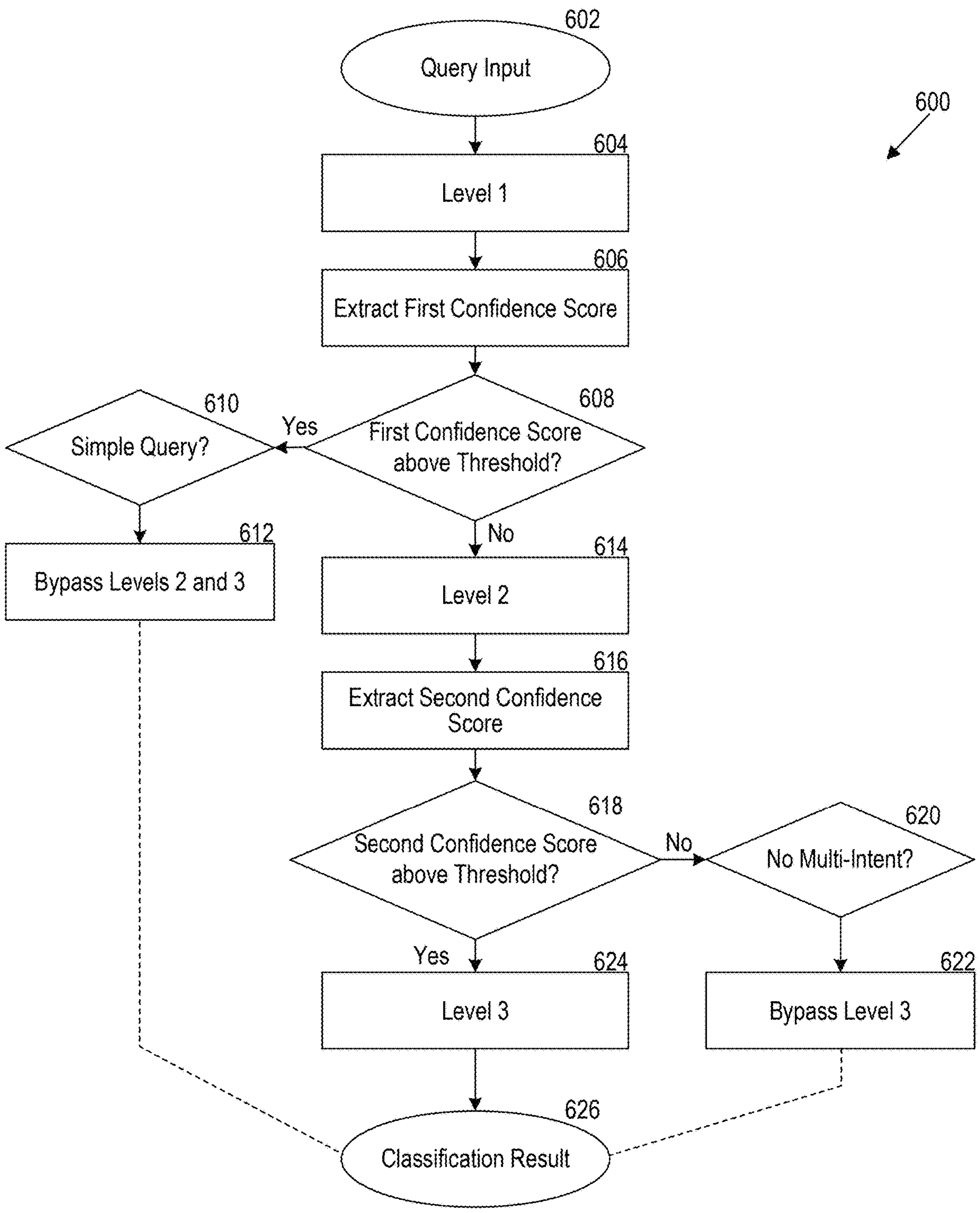
FIG. 6 shows a flow diagram illustrating an example process for generating a classification of a query using a dynamic bypass path in a hierarchical model cascade, in accordance with some implementations of the present technology.

FIG. 6 shows a flow diagram illustrating an example process 600 for generating a classification of a query using a dynamic bypass path in a hierarchical model cascade, in accordance with some implementations of the present technology. In some implementations, the process 600 is performed by components of example devices 200 and computing devices 302 illustrated and described in more detail with reference to FIG. 2 and FIG. 3, respectively. Likewise, implementations can include different and/or additional operations or can perform the operations in different orders.

In operation 602, the model orchestration platform is enabled to obtain (e.g., receive from a computing device) an output generation request that includes a digitally encoded input, such as a textual prompt, query object, or command set, for generation of an output using one or more AI agents of a set of AI agents communicatively connected to a gateway router (e.g., a large language model (LLM) set, an AI model set, a model set, an AI agent set).

In operation 604, the model orchestration platform can process the query input using a first level of a hierarchical model cascade. The first level can be configured to detect and/or classify an intent of the query input. The intent classification can correspond to a set of downstream AI agents and/or systems.

In operation 606, the model orchestration platform can extract a first confidence score from the output of the first level. The first confidence score can be a numerical value (e.g., between 0 and 1), a category, a rank, and so forth.

In operation 608, the model orchestration platform can compare the first confidence score with a first confidence threshold. The first confidence threshold can be dynamically determined by factors such as system load, historical performance metrics, current performance metrics of subsequent levels of the hierarchical model cascade, and the like.

In operation 610, the model orchestration platform can assess the query complexity in response to the first confidence score being above the first confidence threshold. For example, the platform can compare the query length (e.g., in tokens) to a threshold query length, and choose not to bypass level 2 if the query length is above the threshold query length.

In operation 612, the model orchestration platform can instruct a classification result to be generated from the query input and the output of the first level in response to the query satisfying a threshold complexity. The query intent classification can be used to determine a route for the input query (e.g., a set of agents to process the input query).

In operation 614, the model orchestration platform can process the query input and associated data (e.g., an intent classification) using a second level of a hierarchical model cascade in response to the first confidence score not being above the first confidence threshold and/or the query length not being below the threshold query length. The second level can be configured to determine a domain and/or routing path for the query input. The domain and/or routing path can correspond to a set of downstream AI agents and/or systems.

In operation 616, the model orchestration platform can extract a second confidence score from the output of the second level. The second confidence score can be a numerical value (e.g., between 0 and 1), a category, a rank, and so forth.

In operation 618, the model orchestration platform can compare the second confidence score with a second confidence threshold. The second confidence threshold can be dynamically determined by factors, such as the factors that can determine the first confidence threshold.

In operation 620, the model orchestration platform can assess an intent multiplicity of the query input in response to the second confidence score being above the second confidence threshold. The model orchestration platform can determine a number of intents (e.g., if the query input contains three separate questions) or determine a Boolean value indicating the presence of multiple intents. The model orchestration platform can use one or more language models (e.g., included in the first level or the second level) to determine an intent multiplicity. For example, the second level can be configured to additionally infer an intent multiplicity of the query intent. If the query has no intent multiplicity, then the set of downstream agents that process the query input can be associated with a single intent classification. If the query has intent multiplicity, then the model orchestration platform can be configured to choose a set of downstream agents for each intent of the query input.

In operation 622, the model orchestration platform can instruct the classification result to be generated from the query input and the output of the second level in response to the query not having an intent multiplicity.

In operation 624, the model orchestration platform can process the query input and associated data (e.g., outputs from the first and/or second levels) using a third level of a hierarchical model cascade in response to the second confidence score not being above the second confidence threshold and/or the query having intent multiplicity. The third level can be configured to perform an advanced analysis of the query input. The third level can generate sub-queries from the query input that each correspond to a detected intent of the query input.

In operation 626, the model orchestration platform can generate a classification result in response to the instruction at operation 612, the instruction at operation 622, or processing the query input using the third level at operation 624. The classification result can include the query input and/or sub-queries generated therefrom, the first/second confidence scores, and/or the outputs from the first, second, and/or third levels.

Blockchain Integration

Figure 7:
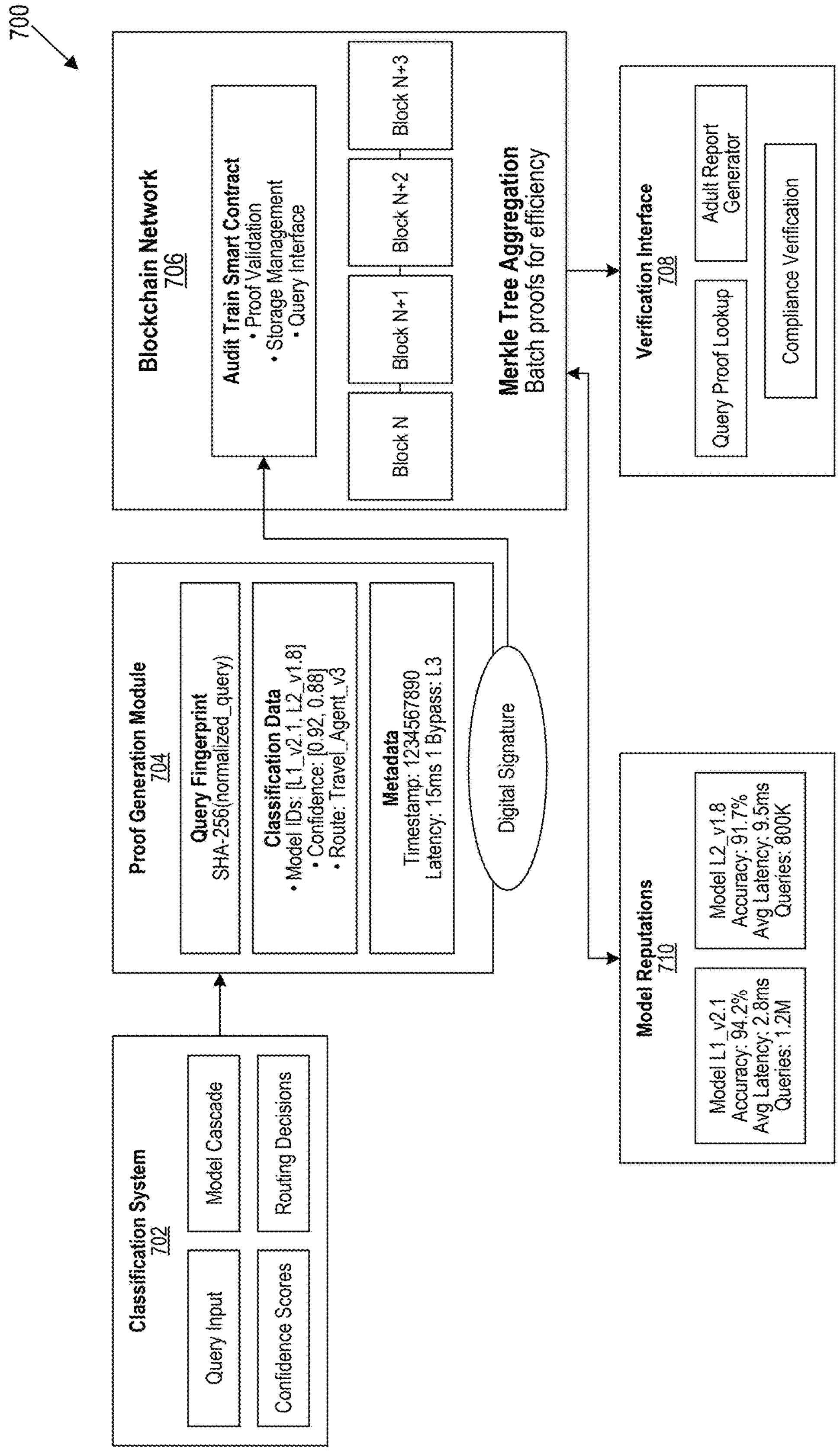
FIG. 7 shows a schematic illustrating an example architecture for using blockchain proofs to classify queries, in accordance with some implementations of the present technology.

FIG. 7 shows a schematic illustrating an example architecture 700 for using blockchain proofs to classify of queries, in accordance with some implementations of the present technology. The architecture 700 is implemented on one or more computing systems, such as example devices 200 and computing devices 302 illustrated and described in more detail with reference to FIG. 2 and FIG. 3, respectively. The architecture 700 can implement aspects of the architectures 400 and 500, such as the hierarchical model cascade 406 as described with respect to FIG. 4 and/or one or more dynamic bypass controllers 520 as described with respect to FIG. 5. Implementations of FIG. 7 can include different and/or additional components or can be connected in different ways. The components included in the architecture 700 can be configured based on deployment requirements for a specific deployment and/or system implementing the architecture 700.

The classification system 702 is configured to receive a query input and generate a routing decision for a set of downstream AI agents. The query can be received from a user interface, which can be implemented on the client 102 of FIG. 1. The query can be a natural language query requesting generation of an output using one or more AI agents. The architecture 700 can be connected to multiple AI agents (e.g., via a network connection, API interface), such as the AI agents 110 in FIG. 1. Each AI agent can have a specific task or focus. The routing decision can include a set of one or more downstream AI agents to process the query input to generate the output.

The classification system 702 can generate the routing decision via a hierarchical model cascade. The classification system 702 and/or the hierarchical model cascade can generate one or more confidence scores (e.g., one for each level of the hierarchical model cascade) and/or one or more query classifications (e.g., of query intent(s), query complexity, domain classification).

A proof generation module 704 can create a cryptographic attestation of the query and details related to its classification in order to provide cryptographic proofs of the classification process for a certain query. The cryptographic attestation can be in a structured data format, such as a JSON format structure. The cryptographic attestation can include a digital signature of attestation data, which can be digitally signed using a private system key. The attestation data can include the query input, one or more sub-queries, and/or a fingerprint thereof generated by performing a hash on corresponding data. In some implementations, the proof data includes a query fingerprint generated by performing a hash (e.g., SHA256) on the query input and/or normalized query. The attestation data can include classification data generated by the classification system. For example, the classification data can include one or more classification results for the query, a list of model IDs identifying the models and/or model versions used by the classification system to process the query input, a list of confidence scores generated, timestamps of input data and/or generated data, a duration and/or latency of a process, and/or a routing decision for the query input (e.g., a list of agent IDs). In some implementations, the attestation data can include contextual data, such as system load, latency, and/or a timestamp for when the query was received and/or when a classification was generated.

The architecture 700 can additionally track model reputations 710 and store them on the blockchain. This can allow cryptographic verification of the measured effectiveness of the models used to classify a particular query. In some implementations, the architecture 700 maintains performance data associated with one or more models, such as accuracy (e.g., average accuracy, cumulative accuracy), latency performance metrics (e.g. average latency), resource utilization statistics, reliability indicators, and/or total number of processed queries. The architecture 700 can periodically (e.g., at regular intervals and/or in response to a change in a model reputation) add a record of model reputations 710 to a blockchain.

The blockchain manager 706 can receive the cryptographic attestation and/or model reputation data and add the data to a blockchain. The blockchain can be a preexisting distributed ledger (e.g., Ethereum) and/or a locally hosted and/or controlled blockchain network. The blockchain can implement a Merkle tree structure and implement batching of data to improve efficiency. For example, multiple digital signatures corresponding to multiple attestation data of multiple queries can be generated in parallel and/or simultaneously. The blockchain manager 706 can implement configurable confirmation requirements for the blockchain to configure a delay before a transaction becomes immutable (e.g., measured as a number of blocks subsequently added to the blockchain). The blockchain manager 706 can arrange for cross-chain compatibility with different blockchain networks. The blockchain manager 706 can implement archival strategies for long-term storage of cryptographic proofs and blockchain data.

The blockchain manager 706 can include an audit trail verification program. In some implementations, the audit trail verification program is a smart contract stored on the blockchain. A smart contract can be computer-executable code stored on a blockchain that can be configured to automatically execute in response to certain conditions being satisfied. The audit trail verification program can implement storage management for proof data. The audit trail verification program can perform proof verification for a particular query. For example, a previously processed query can be identified (e.g., by a user) and the audit trail verification program can verify the contents and details of the query classification process (e.g., by retrieving the query classification process records and verifying that the hash of the data is the same as the hash recorded on the blockchain).

A query verification interface 708 can enable a user to interact with the audit trail verification program and verify information related to a query classification process. The query verification interface 708 can include a query proof lookup field to allow a user to search for previously processed queries (e.g., via a keyword search of the query/generated output, time submitted) in order to query the blockchain for specific proof records. The query verification interface 708 can include an audit report generator that enables retrieval (e.g., via the audit trail verification program) and presentation of processing information associated with a particular query, such as classification decisions, engaged model information (e.g., model identifiers and/or associated reputations 710), confidence scores, routing decisions, and/or contextual data (e.g., system load at the time that the classification was generated). The query verification interface 708 can include a compliance verification interface that enables compliance verification for one or more queries. For example, processing information associated with a particular query can be used to determine if the models used to process a query comply with one or more compliance requirements associated with the query (e.g., that the models are specialized HIPAA-compliant models when the query contains patient medical information).

Adaptive Threshold Learning System

Figure 8:
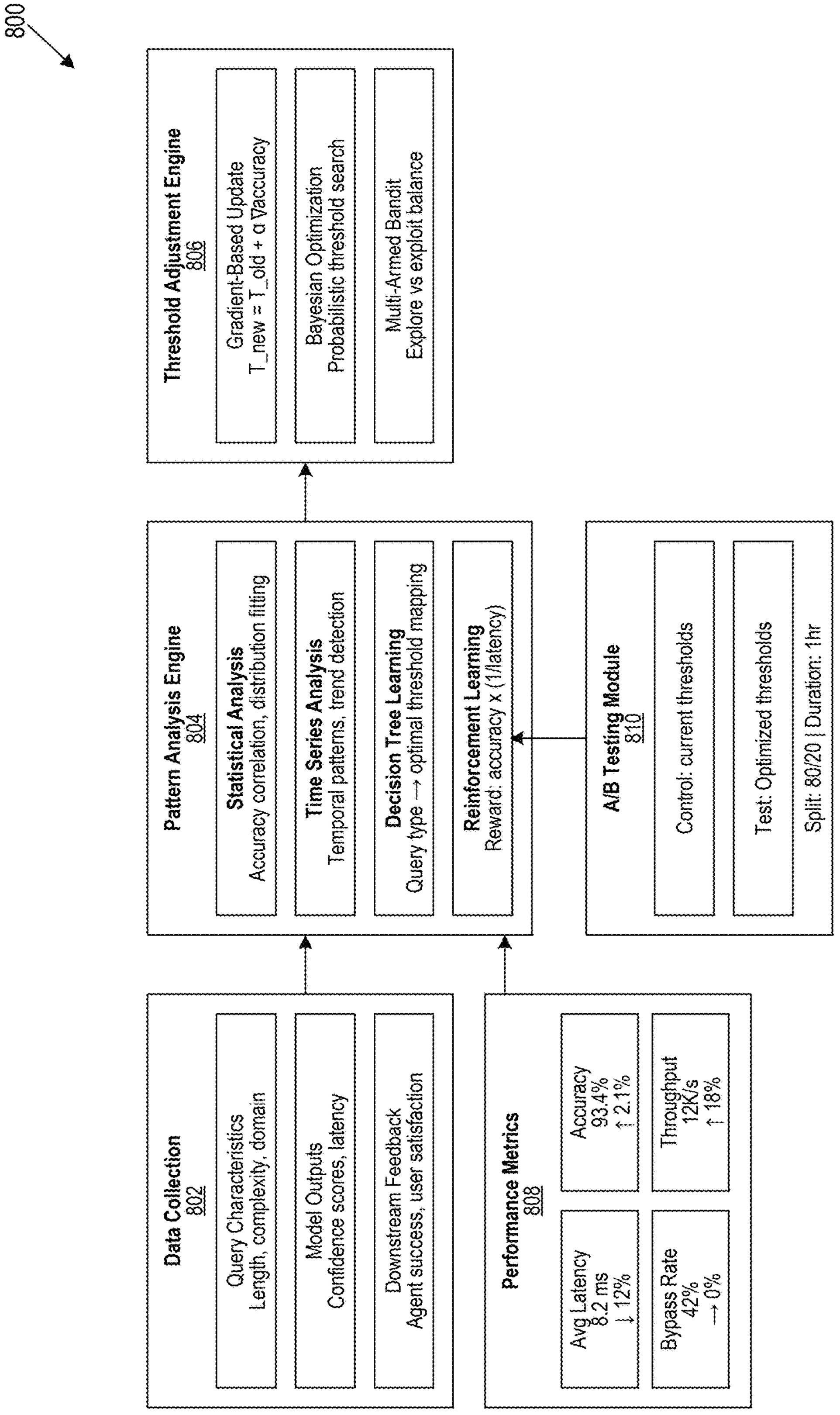
FIG. 8 shows a schematic illustrating an example adaptive threshold learning system for dynamically adapting one or more confidence thresholds for determining a dynamic bypass path in a hierarchical model cascade, in accordance with some implementations of the present technology.

FIG. 8 shows a schematic illustrating an example adaptive threshold learning engine 800 for dynamically adapting one or more confidence thresholds for determining a dynamic bypass path in a hierarchical model cascade, in accordance with some implementations of the present technology. The adaptive threshold learning engine 800 is implemented on one or more computing systems, such as example devices 200 and computing devices 302 illustrated and described in more detail with reference to FIG. 2 and FIG. 3, respectively. Implementations of FIG. 8 can include different and/or additional components or can be connected in different ways. The components included in the adaptive threshold learning engine 800 can be configured based on deployment requirements for a specific deployment and/or system implementing the adaptive threshold learning engine 800.

The pattern analysis engine 804 is configured to produce analyzed data for generating updates to one or more bypass parameters. The bypass parameters are used to determine dynamic bypass paths in a hierarchical model cascade. For example, the pattern analysis engine 804 can be configured to generate updates to threshold confidence values. The pattern analysis engine 804 can receive collected routing data 802 and historical performance metrics 808. The collected routing data 802 can include characteristics of a query (e.g., query length, complexity, domain, intents, and/or routing decisions), model outputs (e.g., confidence scores for each level), and downstream feedback (e.g., agent feedback, agent success rate, user feedback about effectiveness and/or accuracy). In some implementations, the data is retrieved from a log database that includes multiple records, each including a representation of the query (e.g., vector representation, list of sub-queries), one or more classifications, and/or a routing decision (e.g., set of agents). The historical performance metrics 808 can include latencies (e.g., average response latency) for one or more models, accuracy for one or more models (e.g., accuracy averaged across multiple models in a level, accuracy of a single model averaged over time), reliability scores for one or more models (e.g., reliability of a level of models based on historical classifications of the level), bypass rates for one or more models (e.g., the total number of times one or more models were bypassed compared to the total number of queries processed), and/or a throughput rates for one or more models (e.g., a number of queries processed per second).

The pattern analysis engine 804 can implement one or more AI models, such as machine learning algorithms, to produce analyzed data. The pattern analysis engine 804 can include multiple components for analyzing received data and generating an update to one or more confidence threshold values. The pattern analysis engine 804 can compute statistical features of distributions of values (e.g., a distribution of query lengths, a distribution of confidence scores), including accuracy correlation (e.g., correlating model accuracy to query length, confidence scores, classifications, and/or latency) and/or distribution fitting. The pattern analysis engine 804 can perform a time series analysis on data to perform trend detection and temporal pattern recognition. The pattern analysis engine 804 can detect temporal variations in query distributions. For example, the pattern analysis engine 804 can detect patterns of when queries belonging to certain categories will be more frequent based on a time of day, week, or month. The pattern analysis engine 804 can implement a decision tree learning algorithm. For example, the pattern analysis engine 804 can use the decision tree learning algorithm to recursively partition data (e.g., query complexity, confidence scores, classifications) into optimal classes, where each class is associated with a dynamic bypass path. The pattern analysis engine 804 can determine one or more threshold confidence values to implement the learned decision tree (e.g., where intervals between threshold confidence values correspond to partitions/classes of the decision tree). The pattern analysis engine 804 can analyze model performance degradation patterns (e.g., due to concept drift in input queries and/or overfitting on training data).

The threshold adjustment engine 806 receives analyzed data from the pattern analysis engine 804 and generates updates to one or more bypass parameters. For example, the threshold adjustment engine 806 can update threshold confidence values (e.g., replacing a threshold confidence value stored in a threshold data structure with an updated threshold confidence value), model weights in ensemble configurations (e.g., the relative importance of model outputs when multiple models are engaged to process a query), and bypass rules for specific query patterns (e.g., dynamic bypass paths corresponding to feature vectors, as described with respect to FIG. 5). The threshold adjustment engine 806 can use a gradient-based update algorithm to generate updates to bypass parameters. For example, a threshold confidence value can be increased in proportion to a measured increase in accuracy due to a threshold confidence value increase. That is, the update to a threshold confidence value can be proportional to the derivative of the accuracy with respect to the threshold confidence value. The threshold adjustment engine 806 can implement Bayesian optimization (e.g., using the accuracy as a function of bypass parameters as the objective function). For example, the threshold adjustment engine can probabilistically determine an optimal next threshold confidence value to implement, receive a measured model accuracy corresponding to that threshold confidence value, and iteratively repeat this process. The threshold adjustment engine can implement a multi-armed bandit optimization approach (e.g., using the accuracy as a function of threshold confidence value as the objective function).

In some implementations, historical data (e.g., collected routing data 802 and/or historical performance metrics 808), pattern data (e.g., generated by the pattern analysis engine 804), agent capabilities (e.g., computer-executable task sets), and/or feedback data (e.g., received from users and/or downstream agents and/or systems) can be used to update models and/or model parameters. For example, a model update module can generate a training dataset including a labeled corpus that identifies historical inputs (e.g., queries, sub-queries, vector representations), historical classifications (e.g., composite classifications), and/or historical computer-executable task sets. The training dataset can correspond to a particular pre-defined time window (e.g., the training dataset can include data stored over the pre-defined time window). The model update module can cause a model to be trained, retrained, and/or fine-tuned using the training dataset.

An A/B testing module 810 can be used to validate updated parameters. For example, the A/B testing module 810 can be configured to gradually implement updated bypass parameters while monitoring for model degradation. Monitoring for degradation can include continuously monitoring key indicators (e.g., downstream feedback, latency) and comparing the key indicators against baseline metrics to detect a large deviation. Updates to parameters can be reverted if model accuracy decreases as a result of implementing the updated parameters. In some implementations, the A/B testing module 810 tests updated bypass parameters by processing a set of controlled query samples (e.g., with predetermined classifications and/or routing paths) and analyzing the results. In some implementations, the A/B testing module can be configured to implement a partial update to bypass parameters (e.g., a 50/50 split, an 80/20 split) for an amount of time (e.g., predetermined amount of time, predetermined number of queries).

In some implementations, the A/B testing module 810 can be used to validate and/or test updated models. For example, the A/B testing module 810 can gradually implement updated modules (e.g., via the model management module 422 of FIG. 4) while monitoring for degradation, implement a partial update to implemented models (e.g., 50/50 or 80/20 split), and/or validate a model using a set of controlled query samples.

In some implementations, the A/B testing module can be used to update parameters of the pattern analysis engine 804 and/or threshold adjustment engine 806 themselves to produce more optimized updates to the bypass parameters. In some implementations, the A/B testing module 810 determines a difference in accuracy between the original bypass parameters and the new bypass parameters, which can be used as a reward for optimizing parameters used by the pattern analysis engine 804 and/or the threshold adjustment engine 806. For example, the pattern analysis engine 804 and/or threshold adjustment engine 806 can implement reinforcement learning using a reward function that rewards high accuracy and low latency, and can implement an adaptive learning rate that decreases over time to introduce stability. The A/B testing module 810 can be responsible for managing the rollout of the updated parameters. For example, the A/B testing module can be responsible for a staged rollout of a new version of a model. A portion of inputs to the model can be processed by a new version and checked for accuracy before fully implementing the new version of the model.

Query Classification Flow

Figure 9:
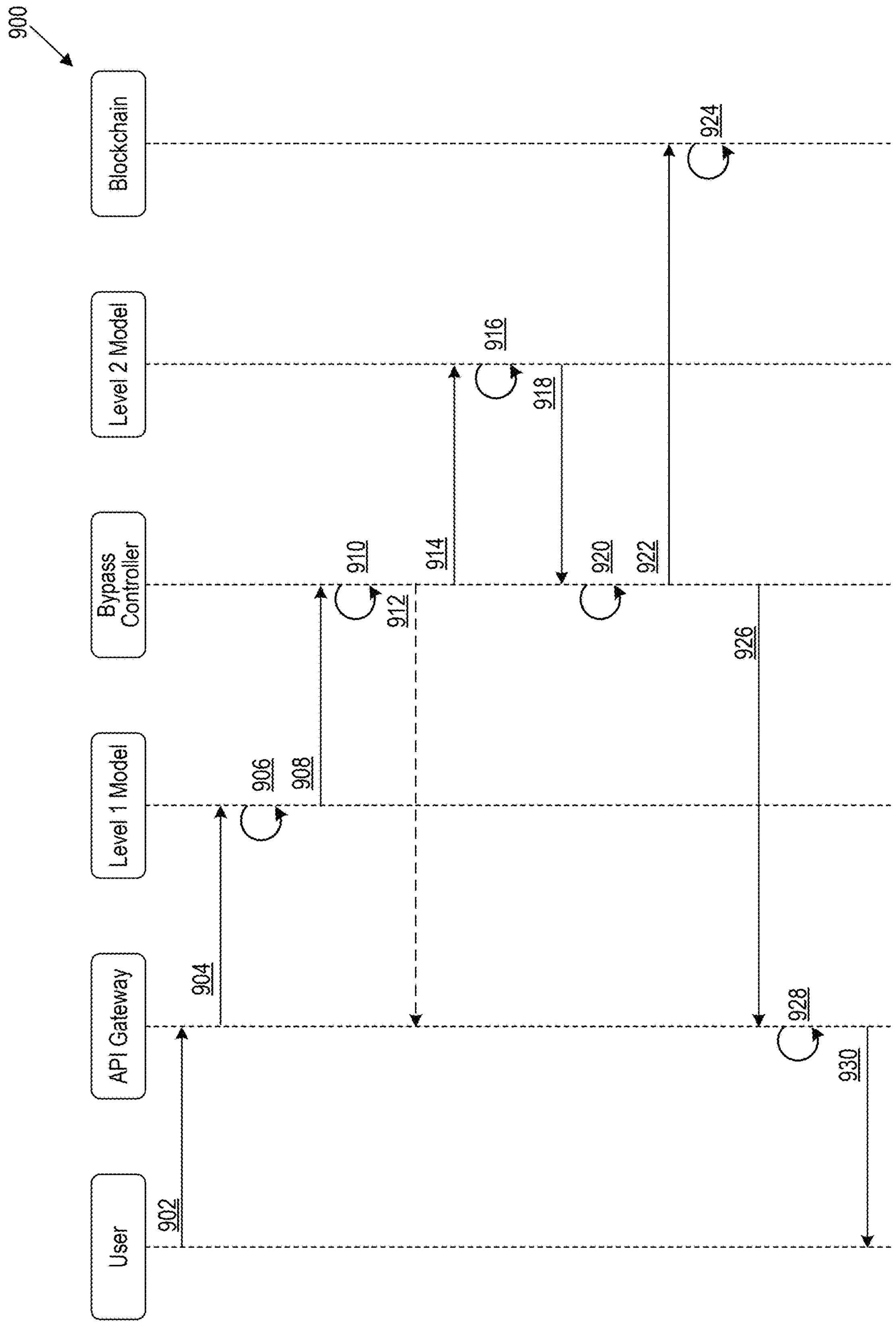
FIG. 9 illustrates a sequence diagram of a process for classifying a query using the model orchestration platform, in accordance with some implementations of the present technology.

FIG. 9 illustrates a sequence diagram of a process 900 for classifying a query using the model orchestration platform, in accordance with some implementations of the present technology. The process 900 is implemented on one or more computing systems, such as example devices 200 and computing devices 302 illustrated and described in more detail with reference to FIG. 2 and FIG. 3, respectively. The process 900 can implement aspects of the architectures 400 and 500, such as the hierarchical model cascade 406 as described with respect to FIG. 4 and/or one or more dynamic bypass controllers 520 as described with respect to FIG. 5.

At operation 902, a user submits a query to a model orchestration platform via an API gateway. The API gateway can be configured to receive and route incoming data to components of a hierarchical model cascade platform (e.g., one or more levels and/or a dynamic bypass controller). The API gateway can normalize data and/or perform query preprocessing (e.g., tokenize the query and/or generate a feature vector from the query). The API gateway can also receive and/or annotate the query with metadata (e.g., user identifier, privileges, timestamp).

At operation 904, the model orchestration platform performs query preprocessing and inputs the results in to a first level of a hierarchical model cascade. The preprocessed query can include one or more tokens, a feature vector, and/or associated metadata.

At operation 906, the first level of the hierarchical model cascade processes the preprocessed query. The first level can include one or more models, such as language models and/or small language models (SLMs), configured to process the preprocessed query and generate a classification (e.g., a classification of an intent of the query) and a first confidence score.

At operation 908, the confidence score can be received by a dynamic bypass controller. The dynamic bypass controller can use the first confidence score and/or additional data (e.g., the preprocessed query, query metadata, contextual data such as system load) to determine whether to bypass or engage a second level.

At operation 910, the dynamic bypass controller can compare the first confidence score with a first threshold (e.g., as stored in a threshold data structure). In some implementations, the first threshold is dynamically determined based on system state, historical accuracy, or other performance metrics. In some implementations, the first threshold is a learned parameter that is determined based on historical feedback metrics.

At operation 912, the dynamic bypass controller can bypass the second level in response to the first confidence score satisfying (e.g., meeting or exceeding) the threshold confidence value. The output of the first level will, at operation 928, be sent to the user.

At operation 914, the dynamic bypass controller can engage the second level in response to the first confidence score not satisfying the threshold confidence value.

At operation 916, the second level can process the preprocessed query and/or the output from the first level (e.g., a classification of the query). The second level can include one or more models configured to generate an advanced classification (e.g., a routing decision, domain, set of detected intents) and a second confidence score.

At operation 918, the dynamic bypass controller can receive the second confidence score. The dynamic bypass controller can use the second confidence score and/or additional data (e.g., the preprocessed query, query metadata, contextual data such as system load, output from the first level) to determine whether to bypass or engage a third level.

At operation 920, the dynamic bypass controller can compare the second confidence score with a second threshold (e.g., as stored in the threshold data structure). In some implementations, the second threshold is dynamically determined based on system state, historical accuracy, or other performance metrics. In some implementations, the second threshold is a learned parameter that is determined based on historical feedback metrics.

At operation 922, a cryptographic attestation of the classification process performed by the process 900 can be generated and sent to a blockchain manager, in response to the second confidence score satisfying the second threshold confidence value.

At operation 924, the blockchain manager can store the cryptographic attestation on a blockchain and/or distributed ledger, thereby providing an immutable audit trail of the classification and routing process At operation 926, the dynamic bypass controller can bypass the third level in response to the second confidence score satisfying the second threshold value. The output from the first and/or second levels can be compiled into a classified query. The classified query can include the original query, separated sub-queries, vector representations, and routing decisions.

At operation 928, the classified query is processed by a set of AI agents to generate a final result.

At operation 928, the final result can be sent to the user. The final output can include the query classification and associated data, such as query metadata, confidence scores, and/or identifications of one or more models used to process the query.

Model Reputation Tracking System

Figure 10:
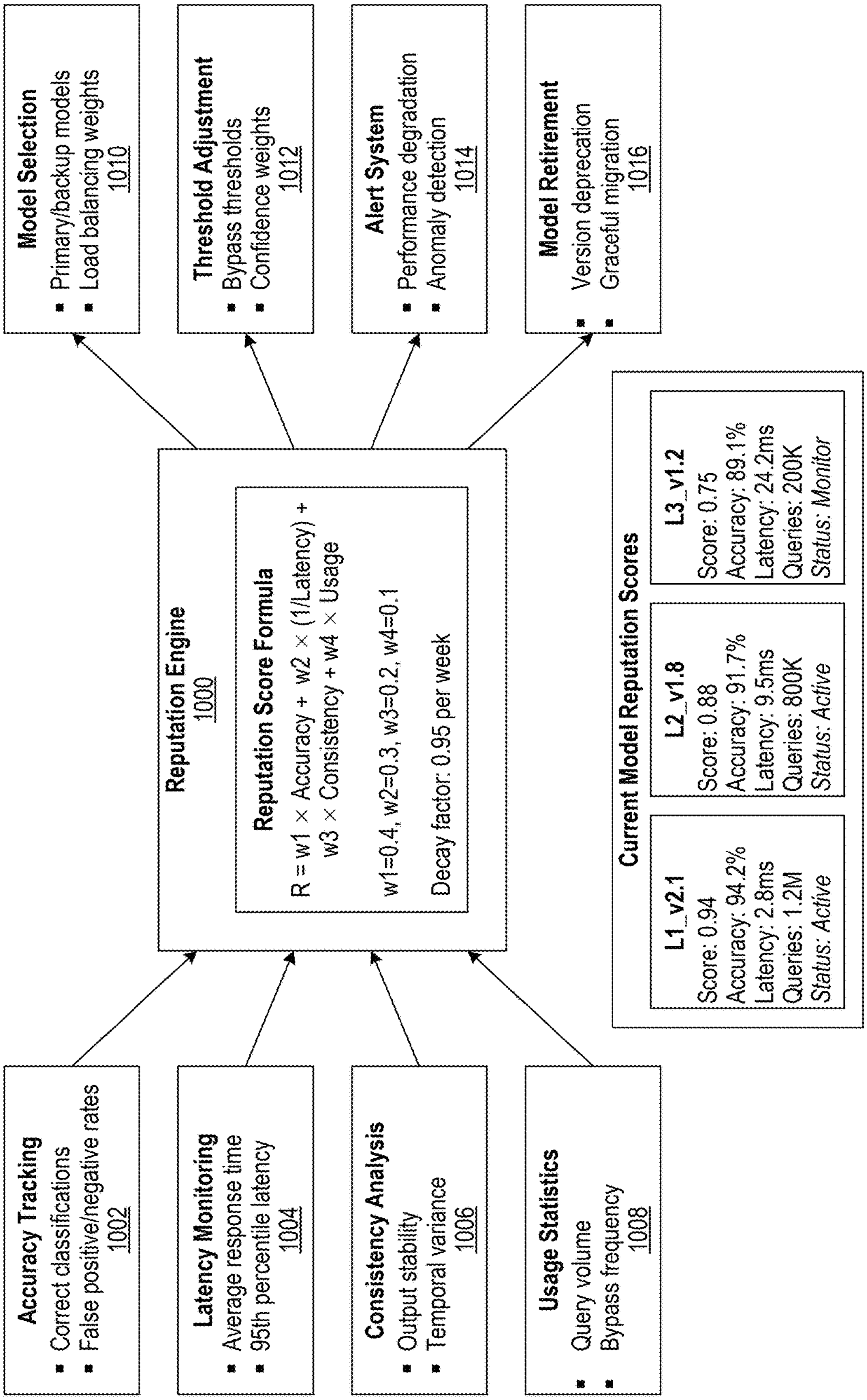
FIG. 10 shows a schematic representing an example reputation engine of the model orchestration platform, in accordance with some implementations of the present technology.

FIG. 10 shows a schematic representing an example reputation engine 1000 of the model orchestration platform, in accordance with some implementations of the present technology. The reputation engine 1000 is implemented on one or more computing systems, such as example devices 200 and computing devices 302 illustrated and described in more detail with reference to FIG. 2 and FIG. 3, respectively. The reputation engine 1000 can be implemented as part of a model orchestration platform. Implementations of FIG. 10 can include different and/or additional components or can be connected in different ways. The components included in the reputation engine 1000 can be configured based on deployment requirements for a specific deployment and/or system implementing the reputation engine 1000.

The reputation engine 1000 can generate a reputation score for a particular model. The reputation score can be a value between 0 and 1. The model can be implemented in one or more levels of a hierarchical model cascade. The reputation score can be a weighted sum of model performance metrics 1010. The relative weights can be dynamically changed and/or learned via a feedback loop. A model accuracy 1010*a* can characterize an accuracy of classifications of queries generated by the model. The accuracy 1010*a* can be calculated using downstream feedback (e.g., from downstream agents and/or users) indicating a frequency of correct classifications, a rate of false negatives (e.g., the model failing to make a classification), and/or a rate of false positives (e.g., the model incorrectly classifying a query). A model latency 1010*b* can characterize a response time to process an input to generate a classification. The latency 1010*b* can be an average latency, a cumulative latency, and/or a particular percentile latency (e.g., $95^{th}$ percentile latency). A model consistency 1010*c* can characterize an overall consistency of the performance of the model. The consistency 1010*c* can indicate a stability of the output of the model or a temporal variance (e.g., in the latency). A model usage statistics 1010*d* can characterize how often the model is being used (e.g., chosen by the system to process queries). The usage statistics 1010*d* can include query volume, average/cumulative queue depth, and/or bypass frequency.

The reputation engine 1000 can be used by the model orchestration platform to perform one or more actions 1020, such as enabling, improving, or retiring models. The reputation engine 1000 can be used for model selection 1020*a*, where higher-reputation models can be favored for use in classifying queries. Model selection 1020*a* can include selecting primary and/or backup models for classifying queries, and for dynamically determining load balancing weights (e.g., optimizing tradeoff between model complexity and accuracy). The reputation engine 1000 can be used for threshold adjustment 1020*b*, where higher-reputation models are more likely to produce accurate classifications and thus allow later levels to be bypassed. Threshold adjustment 1020*b* can include dynamically modifying bypass parameters (e.g., threshold confidence values) and/or confidence weights (e.g., relative weights of confidence scores in a composite confidence metric). The reputation engine 1000 can be used in an alert system 1020*c*, which can alert a user and/or system of a performance degradation in a model and/or one or more detected anomalies. The reputation engine 1000 can be used for model retirement 1020*d*, where lower-reputation models are candidates for replacing and/or upgrading. Model retirement 1020*d* can include version deprecation (e.g., reducing usage of one version of a model in favor of another) and/or graceful migration.

In some implementations, the system categorizes models based on reputation scores generated by the reputation engine 1000. For example, a high reputation score (e.g., above 0.9) can cause the model to be preferred as a primary model selection and make outputs of the model more likely to bypass later levels. A low reputation score (e.g., below 0.7) can cause the model to be disfavored, make outputs of the model less likely to bypass later levels, and can trigger an alert.

Query Routing Process

Figure 11:
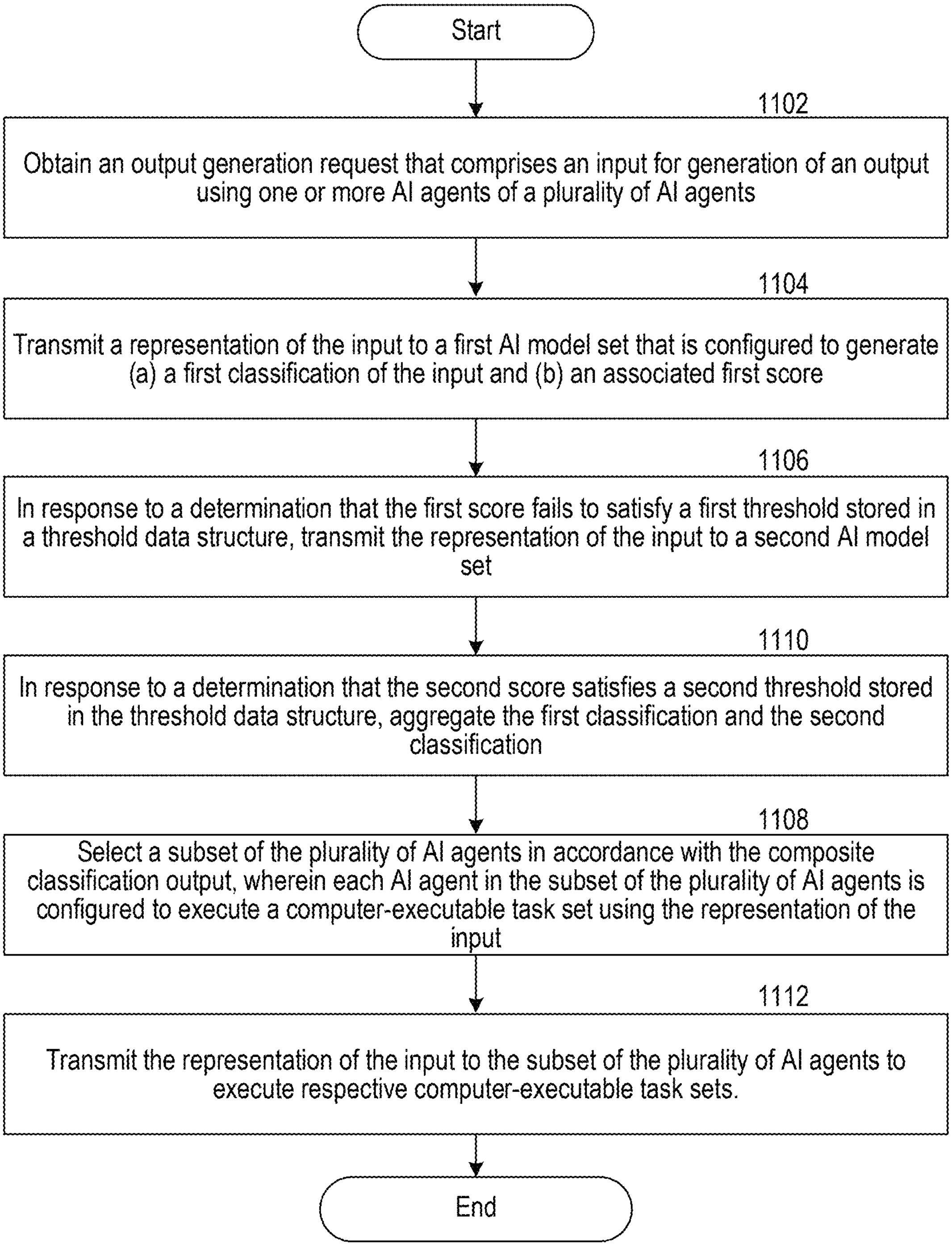
FIG. 11 is a flow diagram illustrating a process for routing queries by performing multi-stage classification of the queries using a hierarchical cascade of artificial intelligence (AI) models, in accordance with some implementations of the present technology.

FIG. 11 is a flow diagram illustrating a process 1100 for routing queries by performing multi-stage classification of the queries using a hierarchical cascade of artificial intelligence (AI) models, in accordance with some implementations of the present technology. The process 1100 can be implemented on one or more computing systems, such as example devices 200 and computing devices 302 illustrated and described in more detail with reference to FIG. 2 and FIG. 3, respectively. The process 1100 can be implemented as part of a model orchestration platform.

At operation 1102, the process 1100 can include obtaining an output generation request that comprises an input for generation of an output using one or more AI agents of a plurality of AI agents. The output generation request can include metadata indicating one or more of: a user identifier associated with the input, a timestamp of receipt of the input, or a requested output modality. In some implementations, one or more AI agents of the plurality of AI agents are autonomous AI agents and/or semi-autonomous AI agents.

At operation 1104, the process 1100 can include transmitting a representation of the input to a first AI model set that is configured to generate (a) a first classification of the input and (b) an associated first score. In some implementations, the first AI model set is trained to generate the first classification by mapping the input to one or more predefined intents based on a degree of similarity between (a) a vector representation of the input and (b) a vector representation of each of the one or more predefined intents.

At operation 1106, the process 1100 can include, in response to a determination that the first score fails to satisfy a first threshold stored in a threshold data structure, transmitting the representation of the input to a second AI model set, wherein the second AI model set is configured to generate (a) a second classification of the input and (b) an associated second score, using a larger number of AI model parameters than the first AI model set. In some implementations, the first threshold is determined using a historical performance metric value set of the first AI model set, where the historical performance metric value set includes at least one of: model accuracy, average response latency, or a model reliability score determined using previous classifications performed by the first AI model set. In some implementations, the second AI model set is trained on a domain-specific training dataset associated with a predefined subject matter. In some implementations, the process 1100 includes, in response to the determination that the first score fails to satisfy the first threshold, dynamically updating the first threshold by replacing the first threshold in the threshold data structure with a third threshold. In some implementations, the first AI model set and the second AI model set are organized in a hierarchal multi-model architecture.

At operation 1108, the process 1100 can include, in response to a determination that the second score satisfies a second threshold stored in the threshold data structure, aggregating the first classification and the second classification. Aggregating the first classification and the second classification can include associating a weight to each of the first classification and the second classification using a first historical performance metric value set and a second historical performance metric value set, respectively, and determining a composite classification output that ranks the first classification and the second classification in accordance with respective weights of the first classification and the second classification.

At operation 1110, the process 1100 can include selecting a subset of the plurality of AI agents in accordance with the composite classification output, wherein each AI agent in the subset of the plurality of AI agents is configured to execute a computer-executable task set using the representation of the input. In some implementations, the first classification and the second classification maps the input to a particular subset of AI agents within the plurality of AI agents. In some implementations, the process 1100 includes generating an input complexity score using one or more of: (a) a number of tasks represented within the representation of the input or (b) a size of the input, and selecting the subset of the plurality of AI agents based on the input complexity score.

At operation 1112, the process 1100 can include transmitting the representation of the input to the subset of the plurality of AI agents to execute respective computer-executable task sets. Each computer-executable task set executed by each AI agent can cause the AI agent to perform one or more of: invocation of a software application, retrieval of data from a database, or a return of a response to the computing device. In some implementations, the process 1100 includes, prior to transmitting the representation of the input to the subset of the plurality of AI agents, storing a record in a log database configured to be accessed using the computing device, wherein the record includes the representation of the input, the aggregated classification, and the subset of the plurality of AI agents. In some implementations, the process 1100 includes, prior to transmitting the representation of the input to the subset of the plurality of AI agents, evaluating the query for a presence of one or more predefined terms in the query, and in response to a determination that the one or more predefined terms are absent from the query, transmitting the vector representation of the query to the routing AI agent set.

In some implementations, at least one AI model within the first AI model set and the second AI model set is a language model. In some implementations, the process 1100 includes causing training of one or more of: the first or second AI model set using a labeled corpus that identifies historical inputs, historical classifications, and historical computer-executable task sets stored over a pre-defined time window. In some implementations, the process 1100 includes generating a cryptographic hash representing the composite classification output and the subset of the plurality of AI agents, and storing the cryptographic hash on a distributed ledger. In some implementations, the process 1100 includes causing display of a representation of the subset of the plurality of AI agents on a user interface of a computing device, wherein the representation is displayed in accordance with a display attribute set determined based on the first score and the second score.

In some implementations, the process 1100 includes, in response to a determination that the second score fails to satisfy a second threshold stored in the threshold data structure, transmitting the representation of the input to a third AI model set, wherein the third AI model set is configured to generate (a) a third classification of the query and (b) an associated third score. In some implementations, the process 1100 includes, in response to a determination that the third score fails to satisfy a third threshold stored in the threshold data structure, preventing aggregating the third classification with the first classification and the second classification.

Figure 12:
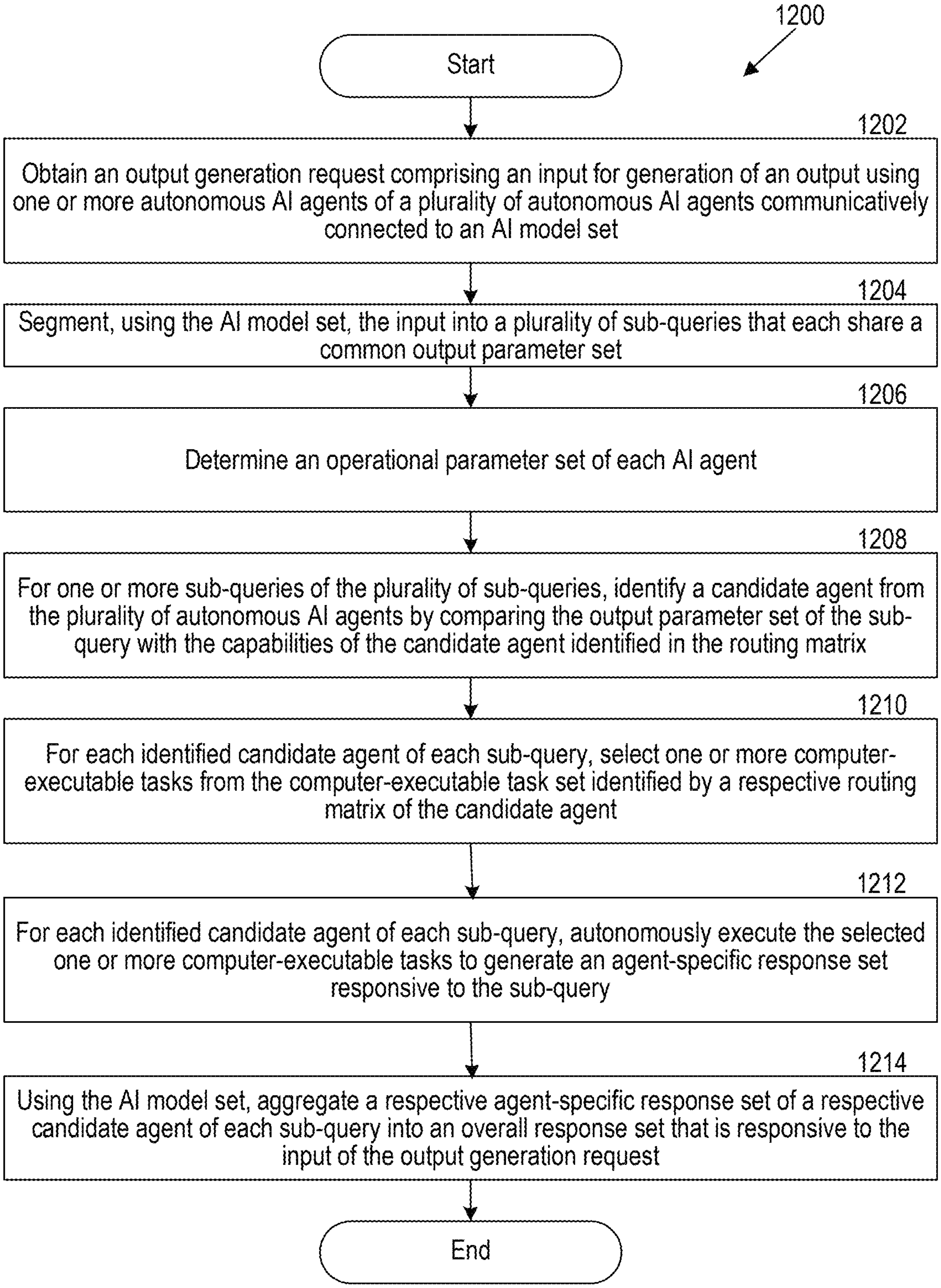
FIG. 12 shows a flow diagram illustrating a process for orchestrating a plurality of semi-autonomous or autonomous AI agents to generate a personalized response, in accordance with some implementations of the present technology.

Orchestrating Semi-Autonomous/Autonomous Agents Using the Model Orchestration Platform FIG. 12 shows a flow diagram illustrating a process 1200 for orchestrating a plurality of semi-autonomous or autonomous AI agents to generate a personalized response, in accordance with some implementations of the present technology. In some implementations, the process 1200 is performed by components of example devices 200 and computing devices 302 illustrated and described in more detail with reference to FIG. 2 and FIG. 3, respectively. Likewise, implementations can include different and/or additional operations or can perform the operations in different orders.

In operation 1202, the model orchestration platform is enabled to obtain (e.g., receive from a computing device) an output generation request that includes a digitally encoded input, such as a textual prompt, query object, or command set, for generation of an output using one or more AI agents of a set of AI agents communicatively connected to a gateway router (e.g., a large language model (LLM) set, an AI model set, a model set, an AI agent set).

In implementations where the gateway router is an LLM set, the LLM set can identify the context, intent, and/or semantic structure of the input using techniques such as dependency parsing, named entity recognition, and semantic role labeling. In some implementations, the gateway router is a modular suite of models that can include a hybrid setup of rules-based classifiers, neural embeddings, and so forth. The gateway router can map out which portions of the input are linked (e.g., what is the main verb, which nouns are the subject or object, and which adjectives modify which nouns) to identify dependencies. The gateway router can identify entities referenced within the input, such as names of people, organizations, locations, dates, or products. The gateway router can determine the underlying intent of the input by predicting the likely action based on training data or using a rule-based system to map identified verbs to a corresponding action. For example, an intent can be referenced as "retrieve information," "book an appointment," "send an email," or "answer a question."

One or more AI agents can be associated with a specific routing data structure such as a matrix, table, graph, or other data structure that identifies actions such as a computer-executable task set used to generate a response, preconditions, parameter boundaries, and/or trigger events. The routing data structure(s) can be annotated using domain-specific ontologies or knowledge graphs. For example, a matrix row maps a detected user type and operation to a given agent's indices, while a column encodes resource constraints or regulatory flags.

Each action can be autonomously executed by the AI agent on a set of software applications in response to satisfaction of a condition set. For example, each action can be identified in the routing data structure by its operational signature, such as a software API call, database transaction, service invocation, code execution on an isolated virtual machine, and so forth. The respective AI agent can evaluate a condition set, which can be Boolean or other logic, against the input's operational parameters (such as user permissions, data sensitivity, time constraints, or current system load). Only when the conditions in the condition set are satisfied does the agent proceed to autonomously execute the action.

In operation 1204, the model orchestration platform is enabled to segment, using the gateway router, the input into a plurality of portions such as sub-queries. Each sub-query can share a common output parameter set that identifies, for example, a user type or privilege level (to enforce access control), timestamp of receipt, requested output modality (such as text, file, JSON object, vector embedding, or structured report), performance metric thresholds (e.g., required response time, accuracy bounds, resource usage limits), constraints on system resource allocation (such as memory, CPU, or bandwidth quotas per sub-query), and so forth.

To partition the input, the gateway router can transform the input into high-dimensional vectors (i.e., numerical representations that encode the underlying contextual relationships of each part of the input) using an embedding model (which can be within the gateway router). The embeddings enable the gateway router to detect shifts in intent, semantic domains, or actionable entities within the input. For example, the vectors are compared against a set of pre-established reference embeddings, each representing prototypical intents, domains (e.g., a subset of knowledge), or entity types. By measuring the proximity and direction of the input vectors relative to these references (using cosine similarity or related distance metrics), the gateway router can quantify how closely each segment aligns with known categories or detect when vector patterns shift, signaling a change in user intent, topic, or actionable item. A vector shift can be flagged as a context transition, and therefore form a separate sub-query.

For example, when a user or automated system transmits an input to the platform that states "prepare the house for bedtime by turning off the downstairs lights, locking all exterior doors, lowering the thermostat to 65 degrees, and activating security cameras," the gateway router identifies the sequence of independent operations: (1) turning off lights, (2) locking doors, (3) adjusting the thermostat, and (4) activating security devices by identifying keywords within the input (e.g., "lock," "adjust thermostat"). Each of the operations is treated as a sub-query. For each sub-query, the gateway router can obtain the common output parameter set of the predefined sub-query. For instance, the gateway router tags each one with the user's privilege level (so "lock all doors" or "deactivate alarms" will only be attempted if the user has admin access).

In operation 1206, the model orchestration platform is enabled to determine an operational parameter set of each AI agent that defines at least one user type authorized to use the AI agent, a range of timestamps associated with the AI agent, at least one output modality of responses generated by the AI agent, at least one performance metric value, at least one resource usage value, and so forth. Performance metric values, such as required response time (latency), accuracy, trust confidence, or compliance levels, can be retrieved from agent registries or calculated in near-real-time or real-time based on prior executions, simulated workloads, or machine learning-based predictions. Resource usage values can define computational boundaries, such as maximum CPU cycles, RAM usage, bandwidth consumption, number of concurrent threads, and so forth. The model orchestration platform can store the operational parameter set of each AI agent within a respective dynamic routing table or configuration graph that tracks active constraints and current state for each agent.

In operation 1208, the model orchestration platform is enabled to, for each sub-query of the plurality of sub-queries, identify, using the gateway router, a candidate agent (single or multiple) from the plurality of AI agents by comparing the output parameter set of the sub-query with the operational parameter set of each AI agent within the plurality of AI agents. In a rule-based approach, the gateway router uses filtering and logic rules to remove agents who do not meet particular requirements, such as compliance, privilege level, and so forth. In some implementations, the gateway router calculates similarity scores between the vectors of sub-query output parameters and agent operational parameters, e.g., using cosine similarity or other distance measures. The gateway router can use an ensemble model to rank candidate agents on predefined static capabilities (e.g., training data) and/or near-real-time or real-time performance, availability, historical success rate for similar tasks, predicted energy consumption, and so forth. For example, when the operational parameter set defines the at least one resource usage value, the model orchestration platform can allocate a subset of available computational resources to process the sub-query based on the one or more resource usage values of the identified candidate agent.

The gateway router can cross-reference the vectorized input against structured ontologies, or digital maps of domain expertise and capabilities of the AI agents communicatively connected to the model orchestration platform, to map distinct portions of the input to their most appropriate downstream handler. The gateway router can compare the current prompt with historical requests and workflows, and use the comparison to route similar input portions to historically routed agents.

In some implementations, each AI agent is associated with an ontology data structure. The ontology data structure can refer to a machine-readable representation of a domain set, an attribute set of each domain-specific category in the domain set, and/or a set of relationships among the domain set and the attribute set of each domain set. The AI model set can access the ontology data structure of a particular AI agent to identify, for a particular sub-query, a query-specific domain within the domain set based on one or more query-specific attributes within respective attribute sets of each domain. One or more candidate agents of the candidate agent set can be associated with the query-specific domain. The ontology data structure can be stored in, for example, a graph database, a distributed file system, a cloud-based object storage service, a local persistent memory of the AI agent, and so forth. Updates to the ontology structure can be performed only in response to a consensus among the AI agents. For example, the model orchestration platform can update the ontology data structure responsive to receiving a data signal from the AI agent set that indicates a consensus among the AI agent set for the update.

The plurality of AI agents can be organized in a hierarchal architecture (e.g., a "constellation" of agents). The hierarchal architecture can include a general-purpose agent at a first level of the hierarchal architecture, multiple specialized sub-agents at a second level, and so forth. AI agents can be identified on an API registry, which can refer to a continuously updated directory that lists all registered agents, their endpoints, supported functions, operational health status, and/or compliance metadata. For example, the model orchestration platform can expose an API registry identifying the AI agent set, where the API registry is accessible by the gateway router. This registry can be implemented as a centralized ledger or a distributed service, allowing the orchestrator (and even sub-agents) to dynamically discover, authenticate, and select the available agents for a given sub-task.

In some implementations, at least one AI agent is associated with a dynamic retrieval-augmented generation (RAG)-based model. The dynamic RAG-based model can update a knowledge base associated with the RAG-based model by retrieving data from one or more data sources via, for example, an API. The update can be triggered based on detected performance degradation, received user feedback, a scheduled interval, and/or other contextual signals. The dynamic agent refers to a dynamic RAG-based agent that communicatively connects its internal language model(s) to an actively managed knowledge base that is continually refreshed by retrieving new data from sources (e.g., trusted sources) through APIs, web scrapers, and/or other database connectors. The timing and frequency of the updates can be fully automated or governed by predefined logic, for example, triggering data incorporation when an agent's live performance metrics drop below an accuracy benchmark (e.g., 90% on evaluation sets), in direct response to user feedback highlighting knowledge gaps, or at regular, scheduled intervals. The flexibility enables the gateway router and/or the candidate agent itself to monitor for new or valuable data sources, check for stale entries, and incorporate vetted updates, while minimizing or at least greatly reducing retraining costs and ensuring that sensitive or proprietary information remains secure and is not intermixed or exfiltrated outside a trusted or otherwise validated environment.

In some implementations, at least one AI agent is instantiated as fine-tuned models, wherein the fine-tuning can be performed using domain-specific datasets to modify the model parameters of a pre-trained neural network. The model orchestration platform can receive a base model (e.g., a transformer-based LLM or small language model (SLM)), select a corpus of training data associated with a target domain (such as legal, medical, or financial records), and/or execute a supervised learning operation to update the model's weights. The resulting fine-tuned AI agent is enabled to generate responses to sub-queries that match the domain of the training data, and the model orchestration platform can dynamically route such sub-queries to the fine-tuned agent by matching sub-query metadata or semantic embeddings of the query to a respective domain of the fine-tuned AI agent. Thus, internal representations of the fine-tuned AI agent are specifically adapted to the operational context of the sub-query.

The model orchestration platform, in some implementations, uses purpose-trained SLMs that have been constructed using knowledge distillation operations. For example, the knowledge distillation operations include training a "compact" SLM (the "student") to replicate the output distributions of a larger, more "complex" (i.e., more parameters) model (the "teacher") on a set of inputs. In some implementations, a dataset of input-output pairs is generated using the teacher model that can be subsequently used to train the student SLM to minimize or otherwise reduce a divergence metric (e.g., Kullback-Leibler divergence) between its outputs and those of the teacher. The resulting SLM agent can be registered within the model orchestration platform with metadata that indicates its specific capabilities. During runtime, the model orchestration platform evaluates system resource constraints and sub-query requirements, and selectively routes sub-queries to the SLM agent when its operational profile and knowledge domain are determined to be aligned for the task.

The AI agents can be instantiated using various machine learning techniques, such as Bayesian inference models, decision trees, SVMs, rule-based expert systems, and the like. Each AI agent can be instantiated as a software module with a defined interface for receiving sub-queries, executing a computational procedure (e.g., probabilistic inference, tree traversal, or rule evaluation), and/or returning a structured response. The model orchestration platform can maintain a registry of agent capabilities and match sub-query characteristics (such as data type, required explainability, or determinism) to the agent sharing common attributes.

Conversely, static agents operate against fixed, immutable knowledge bases, which provides the benefit of full control, data provenance, and improved data privacy, especially when the underlying LLM or SLM is kept on-premises or within particular operative boundaries (e.g., within the automated systems or servers of an organization). This architecture reduces the risk of unwanted data leakage or contamination. In some implementations, dynamic RAG agents can perform validations via both automated validation (using deep learning-driven validators) and human-in-the-loop workflows, where updates to the knowledge base are subject to approval by users with specific roles or permissions.

In some implementations, at least one AI agent is a static agent associated with a first knowledge base that is fixed, and at least one other AI agent is a dynamic agent with a second knowledge base that can be updated. The data routing table can select between static and dynamic agents for a particular portion of the input based on data sensitivity, update frequency, user-defined policy, and so forth. The routing data structure or gateway router can dynamically determine, for each incoming input or sub-query, whether a static or dynamic agent is most appropriate, based on the rate at which information changes in the relevant domain (update frequency), the sensitivity or classification of the information (ensuring proprietary or confidential data is handled only by static agents), policies defined by administrators, and so forth.

In operation 1210, the model orchestration platform is enabled to, for each identified candidate agent of each sub-query, select, using the gateway router, one or more actions (e.g., computer-executable tasks from the computer-executable task set) identified by a respective routing data structure (e.g., table, matrix) of the candidate agent. Each of the one or more actions can be selected based on the sub-query satisfying a respective condition set of the action. For example, the routing data structure can indicate a knowledge source used by the AI agent and/or a model used by the AI agent. The gateway router evaluates each sub-query against condition sets (i.e., logic rules or feature thresholds) identified by the routing data structure. For instance, if a sub-query requests "lower temperature if above 28° C.," the agent's task table can only activate its "HVAC adjust" action if current sensor data meets or exceeds that threshold. The routing structure can indicate which knowledge source (such as a sensor, retrieved data, or an external model) the agent should use, as well as which specific model or sub-model is invoked to process the input.

Routing data structures, which determine how actions are matched to conditions, can be maintained manually (e.g., updated by administrators through dashboards or configuration files) or automatically, via dynamic signals observed by the model orchestration platform itself. To update the routing data structures dynamically, the model orchestration platform can detect a change in one or more environmental signals using the LLM set, and dynamically modify the routing data structure of one or more AI agents based on the detected change in the one or more environmental signals.

The routing data structure can be updated in response to a detected change in system load (CPU, memory, or network usage), a detected change in user context (such as a role change), a detected change in environmental signals (such as a change in building occupancy or sensor reading/malfunction), and so forth. The change can additionally or alternatively be a change in value of a performance metric associated with the AI agent. For instance, if performance metrics indicate that an AI agent is becoming a bottleneck (increased response time, dropped packets), the routing data structure can downgrade its task assignment priority until a particular action such as fault recovery is executed.

In some implementations, the AI agent set and/or the gateway router includes a validation agent to validate updates to a knowledge base accessed by one or more AI agents. The validation agent can obtain (e.g., receive) a proposed update to the knowledge base. The validation agent can initiate a computer-implemented workflow to evaluate the proposed update against an update criteria set, and responsive to determining satisfaction of the proposed update with the update criteria set, apply the proposed update to the knowledge base. This thus prevents inadvertent propagation of faulty rules or data.

In some implementations, candidate agents can be identified based on historical queries. For example, the model orchestration platform compares the prompt against a database of previous queries, and identifies one or more identified candidate agents based on the comparison. Each new input can be compared against a database of previously processed output generation requests, using vector similarity search, recurrence pattern mining, or clustering models. If a current input closely matches a previously handled input, the routing platform can prioritize (e.g., increase the rank of) agent(s) that successfully (e.g., accurately, within a particular latency threshold) responded in the past.

In operation 1212, the model orchestration platform is enabled to autonomously execute, using the identified candidate agent, the selected one or more computer-executable tasks to generate an agent-specific response set responsive to the sub-query.

In operation 1214, the model orchestration platform is enabled to, using the gateway router, aggregate each respective agent-specific response set of each respective candidate agent of each sub-query (possibly from different modalities, such as text, images, audio, video, multi-modal data, unstructured data, semi-structured data, structured data, device status codes, summaries, and the like) into an overall response set that is responsive to the prompt of the output generation request. In some implementations, since responses can stem from a wide variety of data modalities, the gateway router normalizes each respective agent-specific response set into a standardized internal format so that disparate data types can be mapped to the original subcomponents of the input and enable the model orchestration platform to maintain a traceable link between each response and the specific sub-query of the input the response addresses. For example, one sub-query can request a temperature reading (structured data) while another requests a video snapshot from a security camera (multi-modal data).

Once normalized, the model orchestration platform can synthesize each respective agent-specific response set using temporal and semantic alignment (linking events or data across agents by their timestamp or logical context) and merging or summarizing redundant or complementary information. The model orchestration platform can perform conflict resolution through policy rules or majority voting. Confidence scoring and contextual weighting can be used to assess the reliability of each agent based on historical performance metrics, current system status, or explicit confidence values returned by the agents themselves. For instance, if two agents provide disagreeing status codes for a device state, the model orchestration platform can resolve the discrepancy by choosing (or weighting more heavily) the result from the most recently updated or highest-confidence agent. The aggregated response can be formatted or encoded according to the requirements of the output channel or requesting user, such as generating a structured report, a dashboard, a single summary text, or machine-consumable data package (e.g., JSON).

In some implementations, one or more AI agents are enabled to implement a feedback loop. For example, the model orchestration platform, via the gateway router and/or the AI agent, obtains a feedback set for one or more agent-specific response sets. The model orchestration platform generates a modification set (e.g., actions to adjust task parameters, alter execution sequences, or reweight routing priorities) to modify the one or more computer-executable tasks of a respective candidate agent and/or a sequence of the one or more computer-executable tasks of the respective candidate agent. The model orchestration platform transmits the modification set to the respective candidate agent, and applies the actions indicated in the modification set onto the respective candidate agent. The one or more AI agents can, once modified, re-execute the computer-executable tasks to generate a modified agent-specific response set, which can then be re-validated using the model orchestration platform.

In some implementations, the feedback loop is implemented using operations associated with fine-tuning and reinforcement learning. Fine-tuning can be performed by updating the parameters of a deployed agent model using additional labeled data that is specific to the operational environment or user context. For example, once new training samples are received, a supervised learning operation can be applied to adjust the model's weights, and the updated agent can be redeployed within the model orchestration platform. Reinforcement learning operations can be executed so that an agent receives reward signals based on the outcomes of its actions within the environment of the model orchestration platform. For example, an agent's policy is updated to enable the agent to iteratively adjust its behavior over time in response to observed feedback and performance metrics (e.g., using algorithms such as Q-learning or policy gradients).

Feedback can be generated internally by the agent itself, for example, by monitoring its own performance metrics, error rates, or confidence scores during task execution. Additionally or alternatively, feedback can be received from the orchestrator, which can be aggregate system-level performance data, user satisfaction scores, or compliance audit results. The orchestrator can transmit the received feedback as structured feedback signals to the agent. Agents, in some implementations, receive feedback from peer agents within the network to enable collaborative learning from feedback received by other agents. Furthermore, the model orchestration platform can obtain feedback from external sources, such as user annotations, third-party evaluation services, or regulatory compliance systems.

Agents within the model orchestration platform can autonomously generate feedback signals based on their internal state, task outcomes, or detected anomalies. The agent-generated feedback signals can be transmitted to the orchestrator, to other agents, or to external monitoring systems. For example, the model orchestration platform can implement a subscriber framework to enable services, agents, or external systems to register as subscribers to specific feedback channels or topics. When feedback is generated or received, the model orchestration platform can publish the feedback to all subscribed entities using a publish-subscribe messaging protocol. Thus, relevant feedback is disseminated in near real time or real time to all associated components across the model orchestration platform.

Validating Agent Inputs and Outputs Using the Model Orchestration Platform

Figure 13:
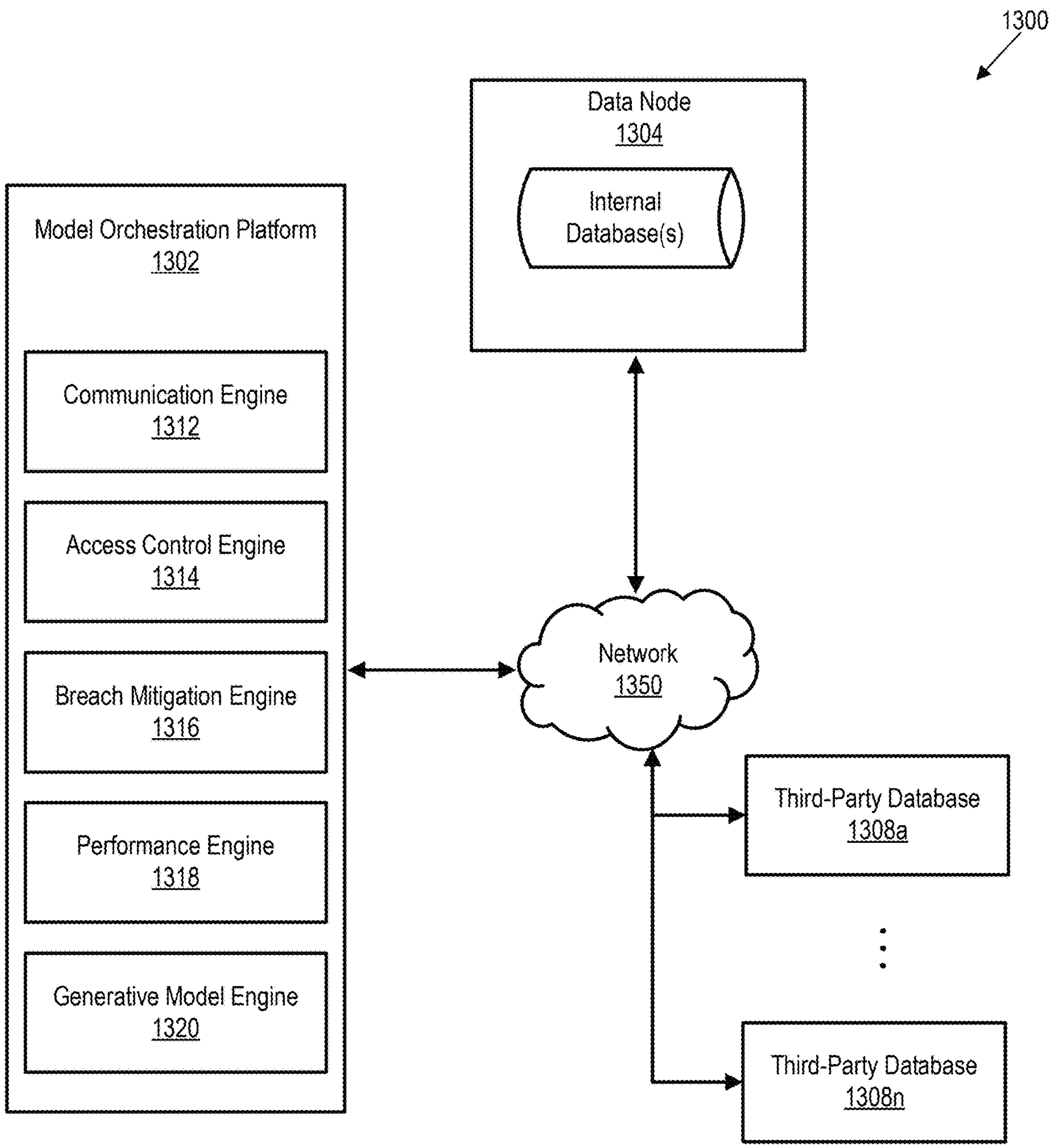
FIG. 13 shows an illustrative environment for evaluating model prompts and outputs for model selection and validation, in accordance with some implementations of the present technology.

FIG. 13 shows an illustrative environment 1300 for evaluating machine learning model inputs (e.g., agent prompts) and outputs for model selection and validation, in accordance with some implementations of the present technology. For example, the environment 1300 includes the model orchestration platform 1302, which is capable of communicating with (e.g., transmitting or receiving data to or from) a data node 1304 and/or third-party databases 1308*a*-1308*n* via a network 1350. The model orchestration platform 1302 can include software, hardware, or a combination of both and can reside on a physical server or a virtual server (e.g., as described in FIG. 3) running on a physical computer system. For example, the model orchestration platform 1302 can be distributed across various nodes, devices, or virtual machines (e.g., as in a distributed cloud server). In some implementations, the model orchestration platform 1302 can be configured on a user device (e.g., a laptop computer, smartphone, desktop computer, electronic tablet, or another suitable user device). Furthermore, the model orchestration platform 1302 can reside on a server or node and/or can interface with third-party databases 1308*a*-1308*n* directly or indirectly.

The data node 1304 can store various data, including one or more machine learning models, prompt validation models, associated training data, user data, performance metrics and corresponding values, validation criteria, and/or other suitable data. For example, the data node 1304 includes one or more databases, such as an event database (e.g., a database for storage of records, logs, or other information associated with LLM-related user actions), a vector database, an authentication database (e.g., storing authentication tokens associated with users of the model orchestration platform 1302), a secret database, a sensitive token database, and/or a deployment database.

An event database can include data associated with events relating to the model orchestration platform 1302. For example, the event database stores records associated with users' inputs or prompts for generation of an associated natural language output (e.g., prompts intended for processing using an LLM). The event database can store timestamps and the associated user requests or prompts. In some implementations, the event database can receive records from the model orchestration platform 1302 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the model orchestration platform 1302). By doing so, the model orchestration platform 1302 can store and track information relating to performance, errors, and troubleshooting. The model orchestration platform 1302 can include one or more subsystems or subcomponents. For example, the model orchestration platform 1302 includes a communication engine 1312, an access control engine 1314, a breach mitigation engine 1316, a performance engine 1318, and/or a generative model engine 1320.

A vector database can include data associated with vector embeddings of data. For example, the vector database includes a numerical representations (e.g., arrays of values) that represent the semantic meaning of unstructured data (e.g., text data, audio data, or other similar data). For example, the model orchestration platform 1302 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the model orchestration platform 1302 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the model orchestration platform 1302 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the model orchestration platform 1302 can evaluate prompts and/or outputs to prevent breaches or leakage of such sensitive information.

A deployment database can include data associated with deploying, using, or viewing results associated with the model orchestration platform 1302. For example, the deployment database can include a server system (e.g., physical or virtual) that stores validated outputs or results from one or more LLMs, where such results can be accessed by the requesting user.

The model orchestration platform 1302 can receive inputs (e.g., prompts), training data, validation criteria, and/or other suitable data from one or more devices, servers, or systems.

The model orchestration platform 1302 can receive such data using communication engine 1312, which can include software components, hardware components, or a combination of both. For example, the communication engine 1312 includes or interfaces with a network card (e.g., a wireless network card and/or a wired network card) that is associated with software to drive the card and enables communication with network 1350. In some implementations, the communication engine 1312 can also receive data from and/or communicate with the data node 1304, or another computing device. The communication engine 1312 can communicate with the access control engine 1314, the breach mitigation engine 1316, the performance engine 1318, and the generative model engine 1320.

In some implementations, the model orchestration platform 1302 can include the access control engine 1314. The access control engine 1314 can perform tasks relating to user/device authentication, controls, and/or permissions. For example, the access control engine 1314 receives credential information, such as authentication tokens associated with a requesting device and/or user. In some implementations, the access control engine 1314 can retrieve associated stored credentials (e.g., stored authentication tokens) from an authentication database (e.g., stored within the data node 1304). The access control engine 1314 can include software components, hardware components, or a combination of both. For example, the access control engine 1314 includes one or more hardware components (e.g., processors) that are able to execute operations for authenticating users, devices, or other entities (e.g., services) that request access to an LLM associated with the model orchestration platform 1302. The access control engine 1314 can directly or indirectly access data, systems, or nodes associated with the third-party databases 1308*a*-1308*n* and can transmit data to such nodes. Additionally or alternatively, the access control engine 1314 can receive data from and/or send data to the communication engine 1312, the breach mitigation engine 1316, the performance engine 1318, and/or the generative model engine 1320.

The breach mitigation engine 1316 can execute tasks relating to the validation of inputs and outputs associated with the LLMs. For example, the breach mitigation engine 1316 validates inputs (e.g., prompts) to prevent sensitive information leakage or malicious manipulation of LLMs, as well as validate the security or safety of the resulting outputs. The breach mitigation engine 1316 can include software components (e.g., modules/virtual machines that include prompt validation models, performance criteria, and/or other suitable data or processes), hardware components, or a combination of both. As an illustrative example, the breach mitigation engine 1316 monitors prompts for the inclusion of sensitive information (e.g., PII), or other forbidden text, to prevent leakage of information from the model orchestration platform 1302 to entities associated with the target LLMs. The breach mitigation engine 1316 can communicate with the communication engine 1312, the access control engine 1314, the performance engine 1318, the generative model engine 1320, and/or other components associated with the network 1350 (e.g., the data node 1304 and/or the third-party databases 1308*a*-1308*n*).

The performance engine 1318 can execute tasks relating to monitoring and controlling performance of the model orchestration platform 1302 (e.g., or the associated development pipeline). For example, the performance engine 1318 includes software components (e.g., performance monitoring modules), hardware components, or a combination thereof. To illustrate, the performance engine 1318 can estimate performance metric values associated with processing a given prompt with a selected LLM (e.g., an estimated cost or memory usage). By doing so, the performance engine 1318 can determine whether to allow access to a given LLM by a user, based on the user's requested output and the associated estimated system effects. The performance engine 1318 can communicate with the communication engine 1312, the access control engine 1314, the performance engine 1318, the generative model engine 1320, and/or other components associated with the network 1350 (e.g., the data node 1304 and/or the third-party databases 1308*a*-1308*n*).

The generative model engine 1320 can execute tasks relating to machine learning inference (e.g., natural language generation based on a generative machine learning model, such as an LLM). The generative model engine 1320 can include software components (e.g., one or more LLMs, and/or API calls to devices associated with such LLMs), hardware components, and/or a combination thereof. To illustrate, the generative model engine 1320 can provide users' prompts to a requested, selected, or determined model (e.g., LLM) to generate a resulting output (e.g., to a user's query within the prompt). As such, the generative model engine 1320 enables flexible, configurable generation of data (e.g., text, code, or other suitable information) based on user input, thereby improving the flexibility of software development or other such tasks. The generative model engine 1320 can communicate with the communication engine 1312, the access control engine 1314, the performance engine 1318, the generative model engine 1320, and/or other components associated with the network 1350 (e.g., the data node 1304 and/or the third-party databases 1308*a*-1308*n*).

Engines, subsystems, or other components of the model orchestration platform 1302 are illustrative. As such, operations, subcomponents, or other aspects of particular subsystems of the model orchestration platform 1302 can be distributed, varied, or modified across other engines. In some implementations, particular engines can be deprecated, added, or removed. For example, operations associated with breach mitigation are performed at the performance engine 1318 instead of at the breach mitigation engine 1316.

Figure 14:
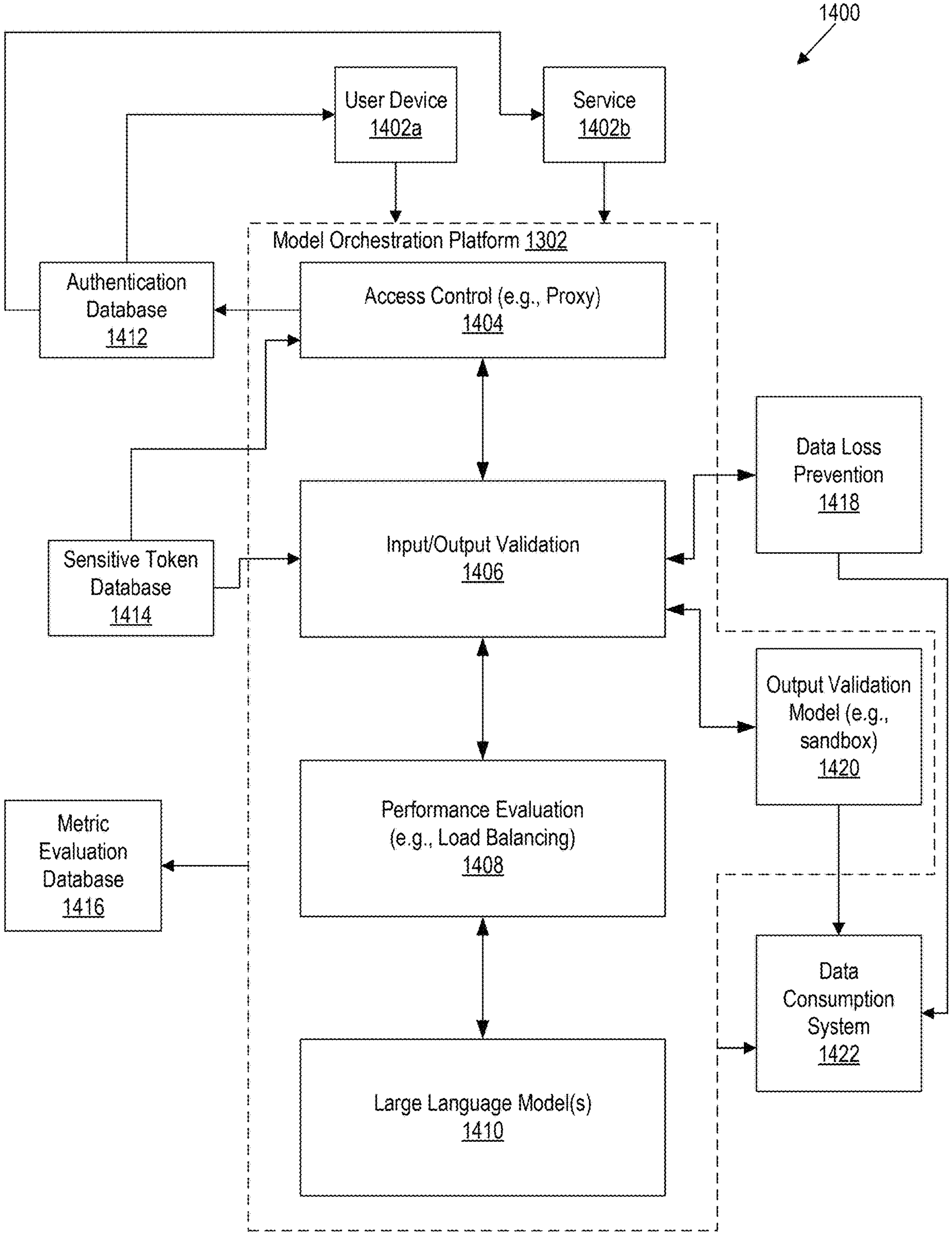
FIG. 14 is a schematic illustrating a process for validating model inputs and outputs, in accordance with some implementations of the present technology.

FIG. 14 is a schematic illustrating a process 1400 for validating model (e.g., agent) inputs and outputs, in accordance with some implementations of the present technology. For example, a user device 1402*a* or a service 1402*b* provides an output generation request (e.g., including an input, such as a prompt, and an authentication token) to the model orchestration platform 1302 (e.g., to the access control engine 1314 for access control 1404 via the communication engine 1312 of FIG. 13). The access control engine 1314 can authenticate the user device 1402*a* or service 1402*b* by identifying stored tokens within an authentication database 1412 that match the provided authentication token. The access control engine 1314 can communicate the prompt to the breach mitigation engine 1316 for input/output validation 1406. The breach mitigation engine 1316 can communicate with a sensitive token database 1414 and/or a data-loss prevention engine 1418, and/or an output validation model 1420 for validation of prompts and/or model outputs. Following input validation, the performance engine 1318 can evaluate the performance of models to route the prompt to an appropriate model (e.g., model(s) 1410). The model orchestration platform 1302 can transmit the generated output to the output validation model 1420 for testing and validation of the output (e.g., to prevent security breaches). The output validation model 1420 can transmit the validated output to a data consumption system 1422, for exposure of the output to the user device 1402*a* and/or the service 1402*b*. In some implementations, the model orchestration platform 1302 can transmit metric values, records, or events associated with the model orchestration platform 1302 to a metric evaluation database 1416 (e.g., an event database) for monitoring, tracking, and evaluation of the model orchestration platform 1302.

A user device (e.g., the user device 1402*a*) and/or a module, component, or service of a development pipeline (e.g., a service 1402*b*) can generate and transmit an output generation request to the model orchestration platform 1302 (e.g., via the communication engine 1312 of FIG. 13). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from a model). The prompt can include a natural language question or command (e.g., in English). For example, the prompt includes a request for a model to generate code (e.g., within a specified programming language) that executes a particular operation. Additionally or alternatively, a prompt includes a data processing request, such as a request to extract or process information of a database (e.g., associated with one or more of the third-party databases 1308*a*-1308*n*). The output generation request can be transmitted to the model orchestration platform 1302 using an API call to an API associated with the model orchestration platform 1302 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the model orchestration platform disclosed herein enable inputs of various formats or combinations thereof.

Figure 15:
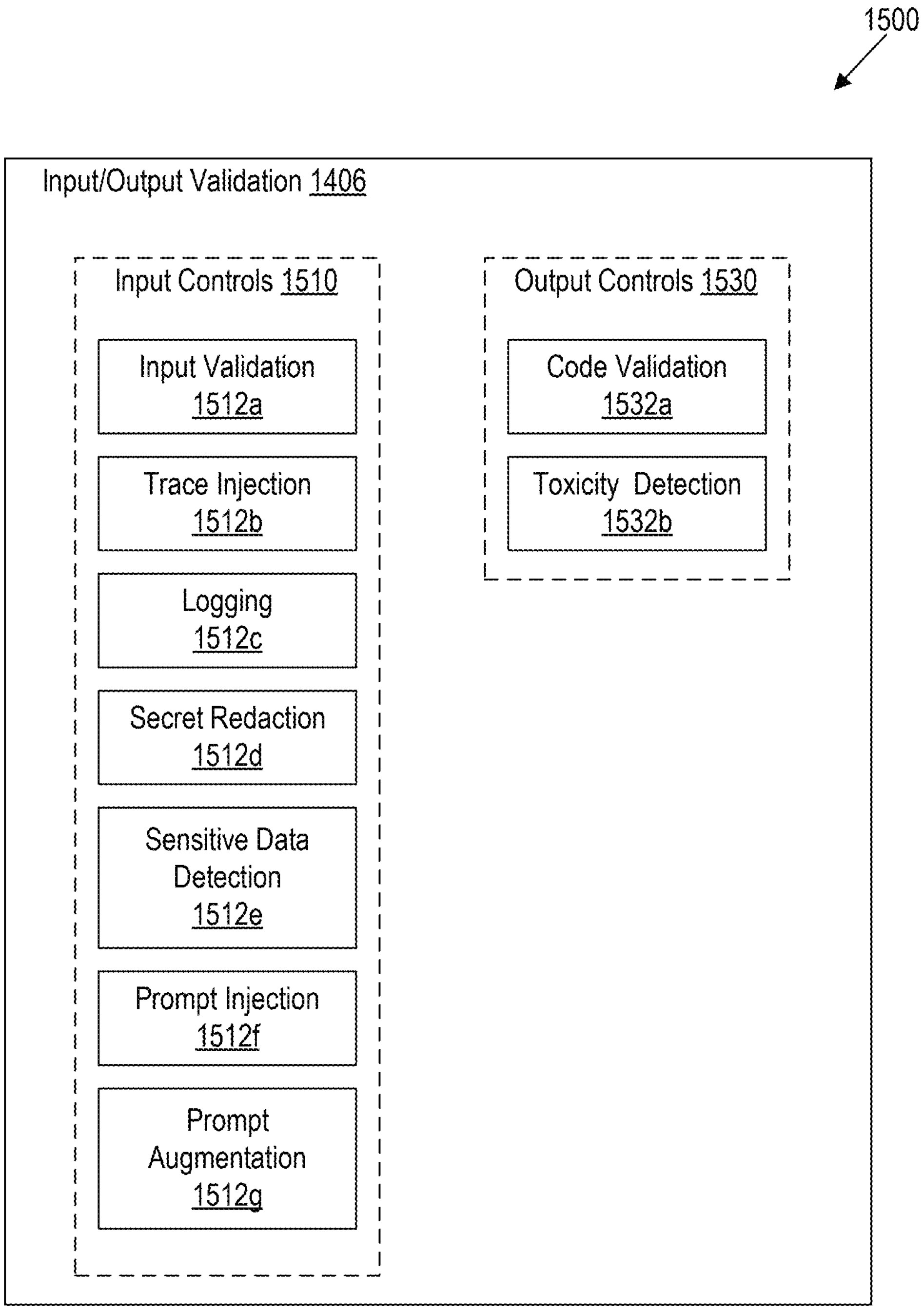
FIG. 15 shows a schematic illustrating components of input/output validation, in accordance with some implementations of the present technology.

FIG. 15 shows a schematic 1500 illustrating components of input/output validation, in accordance with some implementations of the present technology. For example, input/output validation 1406 (e.g., through breach mitigation engine 1316) includes input controls 1510 (e.g., associated with prompt validation) that include one or more prompt validation models. The input/output validation 1406 can additionally or alternatively include output controls 1530, as discussed below. Modules, components, or models associated with the input/output validation 1406 can be updated, modified, added, removed, activated, or deactivated (e.g., according to attributes of the output generation request, a classification of the user, or other suitable factors). Thus the breach mitigation engine 1316 (and the model orchestration platform 1302) are flexible, modular, and configurable in an application-specific manner.

A prompt (e.g., input) validation model can include a module (e.g., a software component), model, algorithm, or process for validating, authenticating, modifying, and/or controlling inputs (e.g., to models). For example, a prompt validation model includes one or more input controls 1510, as shown in FIG. 15. Additionally or alternatively, the input controls 1510 can include one or more prompt validation models capable of executing operations including input validation 512*a*, trace injection 512*b*, logging 512*c*, secret redaction 512*d*, sensitive data detection 512*e*, prompt injection 512*f*, and/or prompt augmentation 512*g*. A prompt validation model can generate a validation indicator. The validation indicator can indicate a validation status (e.g., a binary indicator specifying whether the prompt is suitable for provision to the associated model). Additionally or alternatively, the validation indicator can indicate or specify aspects of the prompt that are validated and/or invalid, thereby enabling further modification to cure any associated deficiencies in the prompt.

Figure 16:
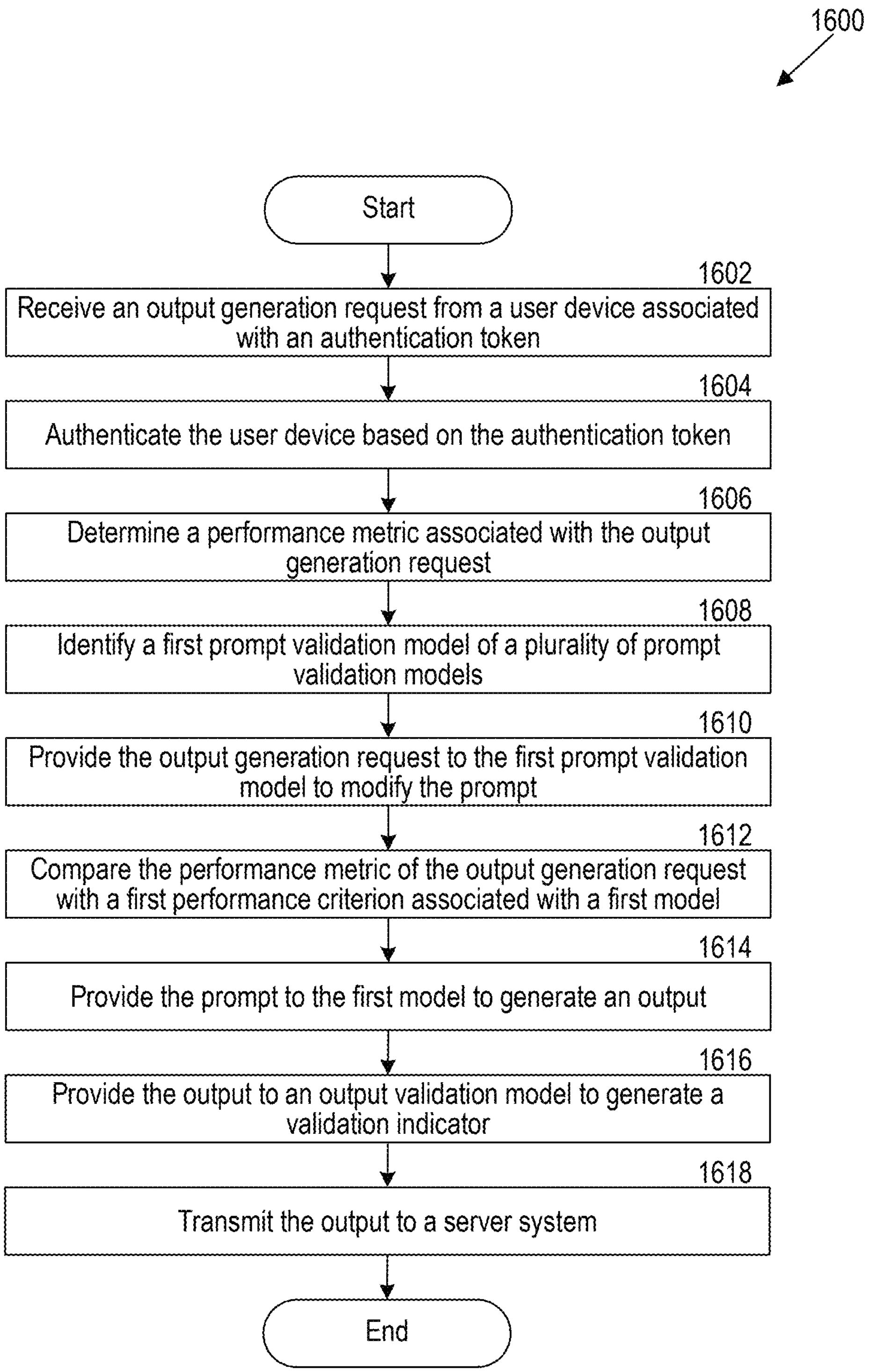
FIG. 16 shows a flow diagram illustrating a process for evaluating natural language prompts for model selection and for validating generated responses, in accordance with some implementations of the present technology.

FIG. 16 shows a flow diagram illustrating a process 1600 for the dynamic evaluation of model prompts and validation of the resulting outputs, in accordance with some implementations of the present technology. For example, the process 1600 is used to generate data and/or code for in the context of data processing or software development pipelines.

At act 1602, process 1600 can receive an output generation request from a user device (e.g., where the user device is associated with an authentication token). For example, the model orchestration platform 1302 receives an output generation request from a user device, where the user device is associated with an authentication token, and where the output generation request includes a prompt for generation of a text-based output using a first model. As an illustrative example, the model orchestration platform 1302 receives a request from a user, through a computing device, indicating a query to request the generation of code for a software application. The request can include a user identifier, such as a username, as well as a specification of a particular requested model architecture. By receiving such a request, the model orchestration platform 1302 can evaluate the prompt and generate a resulting output in an efficient, secure manner.

In some implementations, process 1600 can generate an event record that describes the output generation request. For example, the model orchestration platform 1302 generates, based on the output generation request, an event record including the performance metric value, a user identifier associated with the user device, and the prompt. The model orchestration platform 1302 can transmit, to the server system, the event record for storage in an event database. As an illustrative example, the model orchestration platform 1302 can generate a log of requests from users for generation of outputs (e.g., including the user identifier and associated timestamp). By doing so, the model orchestration platform 1302 can track, monitor, and evaluate the use of system resources, such as models, thereby conferring improved control to system administrators to improve the effectiveness of troubleshooting and system resource orchestration.

At act 1604, process 1600 can authenticate the user. For example, the model orchestration platform 1302 authenticates the user device based on the authentication token (e.g., credentials associated with the output generation request). As an illustrative example, the model orchestration platform 1302 can identify the user associated with the output generation request and determine whether the user is allowed to submit a request (e.g., and/or whether the user is allowed to select an associated model). By evaluating the authentication status of the user, the model orchestration platform 1302 can protect the associated software development pipeline from malicious or unauthorized use.

In some implementations, process 1600 can compare the authentication token with a token stored within an authentication database in order to authenticate the user. For example, the model orchestration platform 1302 determines a user identifier associated with the user device. The model orchestration platform 1302 can determine, from a token database, a stored token associated with the user identifier. The model orchestration platform 1302 can compare the stored token and the authentication token associated with the output generation request. In response to determining that the stored token and the authentication token associated with the output generation request match, the model orchestration platform 1302 can authenticate the user device. As an illustrative example, the model orchestration platform 1302 can compare a first one-time password assigned to a user (e.g., as stored within an authentication database) with a second one-time password provided along with the authentication request. By confirming that the first and second passwords match, the model orchestration platform 1302 can ensure that the user submitting the output generation request is authorized to interact to use the requested models.

At act 1606, process 1600 can determine a performance metric value associated with the output generation request. For example, the model orchestration platform 1302 determines a performance metric value associated with the output generation request, where the performance metric value indicates an estimated resource requirement for the output generation request. As an illustrative example, the model orchestration platform 1302 can determine an estimated memory usage associated with the output generation request (e.g., an estimated memory size needed by the associated model to generate the requested output based on the input prompt). By doing so, the model orchestration platform 1302 can determine the load or burden on the system associated with the user's request, thereby enabling the model orchestration platform 1302 to evaluate and suggest resource use optimization strategies to improve the efficiency of the associated development pipeline.

At act 1608, process 1600 can identify a prompt validation model, for validation of the output generation request, based on an attribute of the request. For example, the model orchestration platform 1302 identifies, based on an attribute of the output generation request, a first prompt validation model of a plurality of prompt validation models (e.g., of a set of input controls). As an illustrative example, the model orchestration platform 1302 can determine a technical application or type of requested output associated with the prompt. The attribute can include an indication that the prompt is requesting code (e.g., for software development purposes). Based on this attribute, the model orchestration platform 1302 can determine a prompt validation model (e.g., an input control) that is suitable for the given prompt or output generation request. By doing so, the model orchestration platform 1302 enables tailored, flexible, and modular controls or safety checks on prompts provided by users, thereby improving the efficiency of the system will targeting possible vulnerabilities in a prompt-specific manner.

At act 1610, process 1600 can provide the output generation request to the identified model for modification of the prompt. For example, the model orchestration platform 1302 provides the output generation request to the first prompt validation model to modify the prompt. As an illustrative example, the model orchestration platform 1302 can execute one or more input controls to evaluate the prompt, including trace injection, prompt injection, logging, secret redaction, sensitive data detection, prompt augmentation, or input validation. By doing so, the model orchestration platform 1302 can improve the accuracy, security, and stability of prompts that are subsequently provided to models, thereby preventing unintended data leakage (e.g., of sensitive information), malicious prompt manipulation, or other adverse effects.

In some implementations, process 1600 can replace or hide sensitive data within the user's prompt. For example, the model orchestration platform 1302 determines that the prompt includes a first alphanumeric token. The model orchestration platform 1302 can determine that one or more records in a sensitive token database include a representation of the first alphanumeric token. The model orchestration platform 1302 can modify the prompt to include a second alphanumeric token in lieu of the first alphanumeric token, where the sensitive token database does not include a record representing the second alphanumeric token. As an illustrative example, the model orchestration platform 1302 can detect that the prompt includes sensitive information (e.g., PII), such as users' personal names, social security numbers, or birthdays. By masking such information, the model orchestration platform 1302 can ensure that such sensitive information is not leaked to or provided to external systems (e.g., via an API request to an externally housed model), thereby mitigating security breaches associated with model use.

In some implementations, process 1600 can remove forbidden tokens from the user's prompt. For example, the model orchestration platform 1302 determines that the prompt includes a forbidden token. The model orchestration platform 1302 can generate the modified prompt by omitting the forbidden token. As an illustrative example, the model orchestration platform 1302 can determine whether the user's prompt includes inappropriate or impermissible tokens, such as words, phrases, or sentences that are associated with swear words. The model orchestration platform 1302 can mask or replace such inappropriate tokens, thereby improving the quality of inputs to the target model and preventing unintended or undesirable outputs as a result.

In some implementations, process 1600 can inject a trace token into the user's prompt to improve model evaluation and tracking capabilities. For example, the model orchestration platform 1302 can generate a trace token comprising a traceable alphanumeric token. The model orchestration platform 1302 can generate the modified prompt to include the trace token. As an illustrative example, the model orchestration platform 1302 can inject (e.g., by modifying the prompt to include) tokens, such as characters, words, or phrases, that are designed to enable tracking, evaluation, or monitoring of the prompt any resulting outputs. By doing so, the model orchestration platform 1302 enables evaluation and troubleshooting with respect to model outputs (e.g., to detect or prevent prompt manipulation or interception of the prompt or output by malicious actors).

At act 1612, process 1600 can compare the performance metric value with a performance criterion (e.g., a threshold metric value) that is related to the model associated with the output generation request. For example, the model orchestration platform 1302 compares the performance metric value of the output generation request with a first performance criterion associated with the first model of a plurality of models. As an illustrative example, the model orchestration platform 1302 can compare a requirement of system resources for execution of the model using the given prompt with a threshold value (e.g., as associated with the model, the user, and/or the attribute of the output generation request). For example, the model orchestration platform 1302 can compare an estimated system memory usage for use of the model with an available system memory availability to determine whether the model can be used without adversely affecting the associated computing system. By doing so, the model orchestration platform 1302 can prevent unintended system-wide issues regarding resource use.

In some implementations, process 1600 can generate a cost metric value and determine whether the cost metric value satisfies a threshold cost (e.g., a threshold associated with the performance criterion). For example, the model orchestration platform 1302 generates a cost metric value associated with the estimated resource requirement for the output generation request. The model orchestration platform 1302 can determine a threshold cost associated with the first model. The model orchestration platform 1302 can determine that the cost metric value satisfies the threshold cost. As an illustrative example, the model orchestration platform 1302 can determine a monetary cost associated with running the model with the requested prompt. Based on determining that the cost is greater than a threshold cost (e.g., a remaining budget within the user's allotment), the model orchestration platform 1302 can determine not to provide the prompt to the model. Additionally or alternatively, the model orchestration platform 1302 can determine that the cost is less than the threshold cost and, in response to this determination, proceed to provide the prompt to the model. By doing so, the model orchestration platform 1302 provides improved flexibility and/or control over the use of system resources (including memory, computational, and/or financial resources), enabling optimization of the associated development pipeline.

At act 1614, process 1600 can provide the prompt (e.g., as modified by suitable prompt validation models) to the model generate the requested output. For example, in response to determining that the performance metric satisfies the first performance criterion, the model orchestration platform 1302 provides the prompt to the first model to generate an output. As an illustrative example, the model orchestration platform 1302 can generate a vector representation of the prompt (e.g., using a vectorization system and/or the vector database) and provide the vector representation to a transformer model and/or a neural network associated with an model (e.g., through an API call). By doing so, the model orchestration platform 1302 can generate a resulting output (e.g., generated code or natural language data) in response to a query submitted by the user within the prompt.

At act 1616, process 1600 can validate the output from the model. For example, the model orchestration platform 1302 provides the output to an output validation model to generate a validation indicator associated with the output. As an illustrative example, the model orchestration platform 1302 can validate the output of the model to prevent security breaches or unintended behavior. For example, the model orchestration platform 1302 can review output text using a toxicity detection model and determine an indication of whether the output is valid or invalid. In some implementations, the model orchestration platform 1302 can determine a sentiment associated with the output and modify the output (e.g., by resubmitting the output to the model) to modify the sentiment associated with the output. By doing so, the model orchestration platform 1302 can ensure the accuracy, utility, and reliability of generated data.

In some implementations, process 1600 can validate the output by generating and testing an executable program compiled on the basis of the output. For example, the model orchestration platform 1302 extracts a code sample from the output, where the code sample includes code for a software routine. The model orchestration platform 1302 can compile, within a virtual machine of the system, the code sample to generate an executable program associated with the software routine. The model orchestration platform 1302 can execute, within the virtual machine, the software routine using the executable program. The model orchestration platform 1302 can detect an anomaly in the execution of the software routine. In response to detecting the anomaly in the execution of the software routine, the model orchestration platform 1302 can generate the validation indicator to include an indication of the anomaly. As an illustrative example, the model orchestration platform 1302 can generate a validation indicator based on determining that the output contains code and testing the code (and/or the compiled version of the code) in an isolated environment for potential adverse effects, viruses, or bugs. By doing so, the model orchestration platform 1302 can ensure the safety and security of generated code, thereby protecting the software development pipeline from security breaches or unintended behavior.

At act 1618, process 1600 can enable access to the output by the user. For example, in response to generating the validation indicator, the model orchestration platform 1302 transmits the output to a server system enabling access to the output by the user device. As an illustrative example, the model orchestration platform 1302 can provide the output to a server that enables users to access the output data (e.g., through login credentials) for consumption of the data and/or use in other downstream applications. As such, the model orchestration platform 1302 provides a robust, flexible, and modular way to validate model-generated content.

Figure 17:
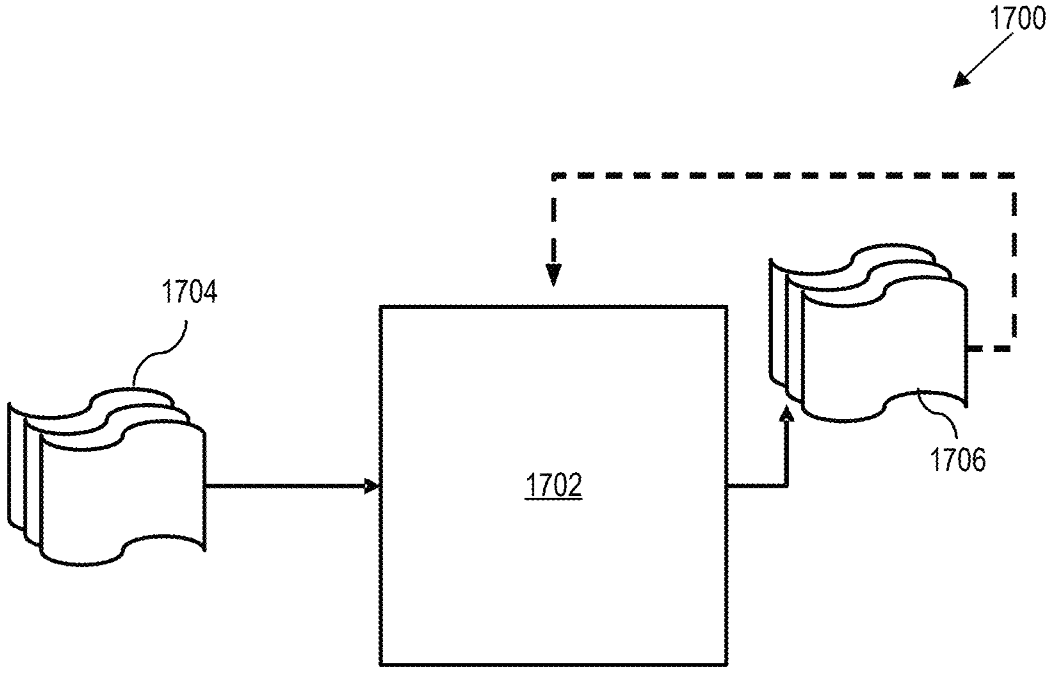
FIG. 17 shows a diagram of an artificial intelligence (AI) model, in accordance with some implementations of the present technology.

FIG. 17 shows a diagram of an AI model, in accordance with some implementations of the present technology. AI model 1700 is shown. In some implementations, AI model 1700 can be any AI model. In some implementations, AI model 1700 can be part of, or work in conjunction with, server computing device 306 (FIG. 3). For example, server computing device 306 can store a computer program that can use information obtained from AI model 1700, provide information to AI model 1700, or communicate with AI model 1700. In other implementations, AI model 1700 can be stored in database 308 and can be retrieved by server computing device 306 to execute/process information related to AI model 1700, in accordance with some implementations of the present technology.

In some implementations, AI model 1700 can be a machine learning model 1702. Machine learning model 1702 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 17, machine learning model 1702 can take inputs 1704 and provide outputs 1706. In one use case, outputs 1706 can be fed back to machine learning model 1702 as input to train machine learning model 1702 (e.g., alone or in conjunction with user indications of the accuracy of outputs 1706, labels associated with the inputs, or other reference feedback information). In another use case, machine learning model 1702 can update its configurations (e.g., weights, biases, or other parameters) based on its assessment of its prediction (e.g., outputs 1706) and reference feedback information (e.g., user indication of accuracy, reference labels, or other information). In another use case, where machine learning model 1702 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1702 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Agent Selection for the Model Orchestration Platform

The model orchestration platform disclosed herein enables dynamic model (e.g., LLM, agent) selection for processing inputs (e.g., prompts) to generate associated outputs (e.g., responses to the prompts). For example, the model orchestration platform can redirect a prompt to a second model (e.g., distinct from the first model selected by the user within the output generation request). Additionally or alternatively, the model orchestration platform operates with other suitable machine learning model algorithms, inputs (e.g., including images, multimedia, or other suitable data), and outputs (e.g., including images, video, or audio). By doing so, the model orchestration platform 1302 can mitigate adverse system performance (e.g., excessive incurred costs or overloaded memory devices or processors) by estimating system effects associated with the output generation request (e.g., the prompt) and generating an output using an appropriate model.

FIG. 18 shows a schematic of a data structure 1800 illustrating a system state and associated threshold metric values, in accordance with some implementations of the present technology. For example, the data structure 1800 includes usage values 1804 and maximum values 1806 for performance metrics 1802. The model orchestration platform 1302 can determine threshold metric values based on data associated with system performance (e.g., at the time of receipt of the output generation request). By doing so, the model orchestration platform 1302 enables dynamic evaluation of requests for output generation, as well as dynamic selection of suitable models with which to process such requests.

As discussed in relation to FIG. 14 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 1802, such as CPU usage, memory usage, hard disk space usage, a number of input tokens (e.g., system-wide, across one or more models associated with the model orchestration platform 1302), and/or cost incurred. The data structure 1800 corresponding to the system state can include usage values 1804 and maximum values 1806 associated with the respective performance metrics 1802.

In some implementations, the model orchestration platform 1302 determines a threshold metric value (e.g., of the threshold metric values 1808 of FIG. 18) based on a usage value and maximum value for a corresponding performance metric (e.g., of performance metrics 1802). For example, the model orchestration platform 1302 determines a cost incurred up to a given point of time or within a predetermined time period associated with machine learning models of the model orchestration platform 1302. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the model orchestration platform 1302 can determine a threshold metric value associated with generating an output using the selected model based on the prompt.

For example, the model orchestration platform 1302 determines the threshold metric value based on a difference between the usage value and the maximum value. The model orchestration platform 1302 can determine a threshold metric value associated with a cost allowance for processing a prompt based on a difference between a maximum value (e.g., a maximum budget) and a usage value (e.g., a cost incurred). As such, the model orchestration platform 1302 can handle situations where the system's performance metric changes over time.

In some implementations, the model orchestration platform 1302 can determine or predict a threshold metric value based on providing the output generation request and the system state to a threshold evaluation model. For example, the model orchestration platform 1302 can provide the input, the indication of a selected model, and information of the system state to the threshold evaluation model to predict a threshold metric value. To illustrate, the model orchestration platform 1302 can predict a future system state (e.g., a time-series of performance metric values associated with the system) based on the output generation request, the current system state, and the selected model. The model orchestration platform 1302 can estimate an elapsed time for the generation of output using the requested model; based on this elapsed time, the model orchestration platform 1302 can determine a predicted system state throughout the output generation, thereby enabling more accurate estimation of the threshold metric value. The threshold evaluation model can be trained on historical system usage (e.g., performance metric value) information associated with previous output generation requests. As such, the model orchestration platform 1302 enables the determination of threshold metric values on a dynamic, pre-emptive basis, thereby improving the ability of the model orchestration platform 1302 to predict and handle future performance issues.

In some implementations, the system state is generated with respect to a particular user and/or group of users. For example, the model orchestration platform 1302 determines a system state associated with a subset of resources assigned to a given user or group of users. To illustrate, the model orchestration platform 1302 can determine a maximum cost value associated with output generation for a given user or subset of users of the model orchestration platform 1302. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using models by users of the group). As such, the model orchestration platform 1302 can determine an associated threshold metric value that is specific to the particular associated users. By doing so, model orchestration platform 1302 enables flexible, configurable requirements and limits to system resource usage based on the identity of users submitting prompts.

In some implementations, the model orchestration platform 1302 determines an estimated performance metric value, as discussed in relation to FIG. 14. For example, the model orchestration platform 1302 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., agents, LLMs). For example, the performance metric evaluation model can generate an estimated cost value for processing a prompt using the first model to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the model orchestration platform 1302 evaluates the suitability of a prompt for a given model based on comparing a composite metric value with a threshold composite value. For example, the model orchestration platform 1302 generates a composite performance metric value based on a combination of performance metrics (e.g., the performance metrics 1802 as shown in FIG. 18). To illustrate, the model orchestration platform 1302 can generate a composite performance metric based on multiple performance metrics of the computing system associated with the machine learning models. Based on the metric, the model orchestration platform 1302 can generate an estimated composite metric value corresponding to the composite metric (e.g., by calculating a product of values associated with the respective performance metrics) and compare the estimated composite metric value with an associated threshold metric value. As such, model orchestration platform 1302 enables a more holistic evaluation of the effect of a given output generation request on system resources, thereby improving the accuracy and efficiency of the model orchestration platform 1302 in selecting a suitable model. In some implementations, the model orchestration platform 1302 can assign particular performance metrics a respective weight and calculate a value for the composite metric accordingly. Accordingly, the model orchestration platform 1302 enables the prioritization of relevant performance metrics (e.g., cost) over other metrics (e.g., memory usage) according to system requirements.

Figure 19:
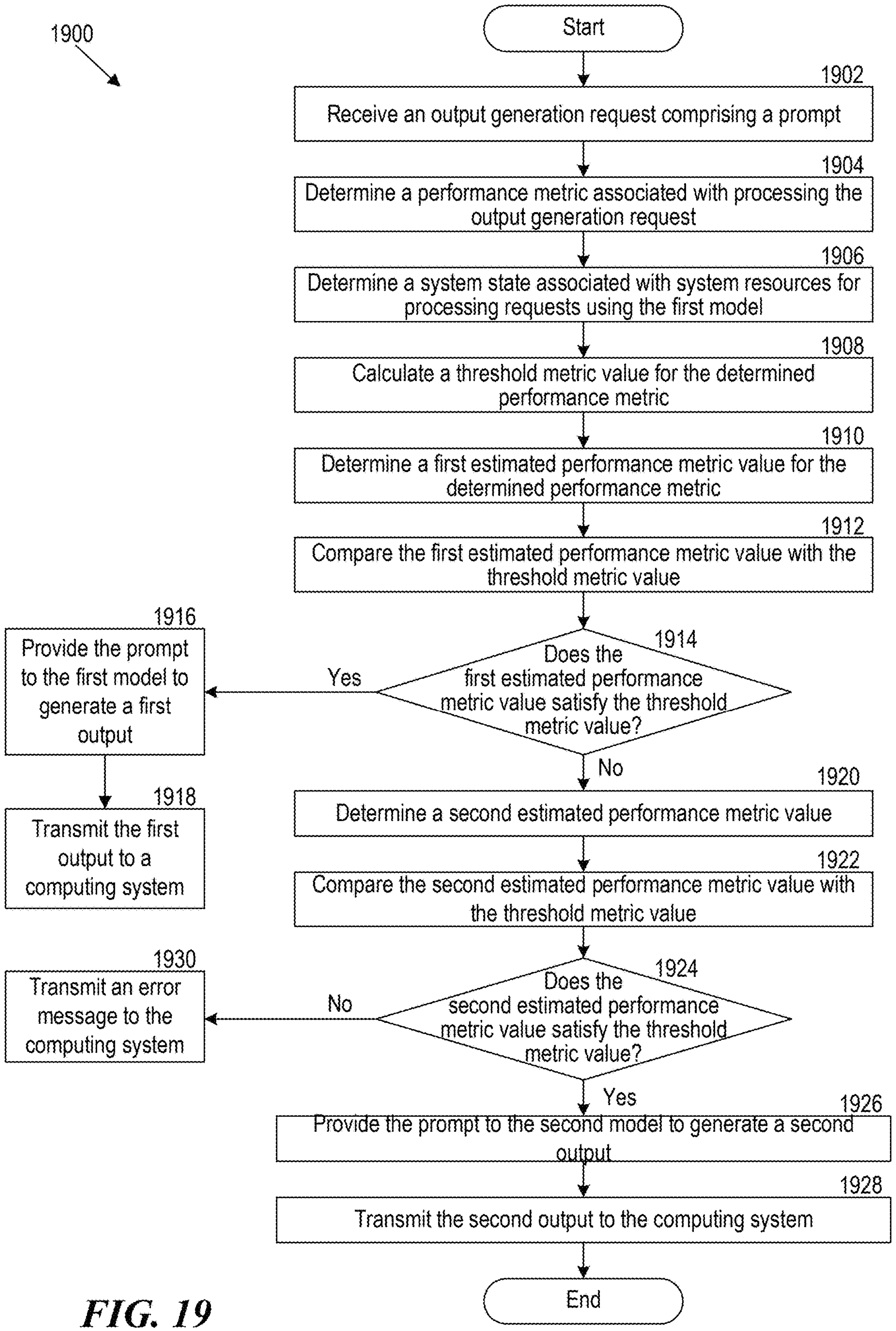
FIG. 19 shows a flow diagram illustrating a process for dynamic selection of models based on evaluation of user prompts, in accordance with some implementations of the present technology.

FIG. 19 shows a flow diagram illustrating a process 1900 for dynamic selection of models based on evaluation of user inputs (e.g., prompts), in accordance with some implementations of the present technology. For example, the process 1900 enables selection of an model for generation of an output (e.g., software-related code samples) based on an input (e.g., a text-based prompt) to prevent overuse of system resources (e.g., to ensure that sufficient system resources are available to process the request).

At act 1902, the process 1900 can receive an input for generation of an output using a model. For example, the process 1900 receives, from a user device, an output generation request comprising an input (e.g., prompt) for generation of an output using a first model (e.g., an agent) of a plurality of models. As an illustrative example, the model orchestration platform 1302 (e.g., through the communication engine 1312) receives a prompt indicating a desired output, such as a text-based instruction for the generation of software-related code samples (e.g., associated with a particular function). The output generation request can include an indication of a selected model (e.g., agent) for processing the prompt. As such, the model orchestration platform 1302 can evaluate the effect of generating an output using the selected model based on the prompt (e.g., or other suitable inputs) on the basis of the content or nature of the request (e.g., based on a user identifier associated with the request).

At act 1904, the process 1900 can determine a performance metric associated with processing the output generation request. For example, the process 1900 determines a performance metric associated with processing the output generation request. As an illustrative example, the model orchestration platform 1302 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with MODELs. In some implementations, the model orchestration platform 1302 (e.g., through the performance engine 1318) determines multiple performance metrics (e.g., associated with the system state) for evaluation of the effects (e.g., of generating an output based on the prompt) on the system.

At act 1906, the process 1900 can determine a system state associated with system resources. For example, the process 1900 determines a system state associated with system resources for processing requests using the first model of the plurality of models. As an illustrative example, the performance engine 1318 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the model orchestration platform 1302, through communication engine 1312 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the model orchestration platform 1302 can evaluate the received prompt to determine whether the selected model is suitable for generating an associated output.

At act 1908, the process 1900 can calculate a threshold metric value (e.g., associated with the output generation request). For example, the process 1900 can calculate, based on the system state, a threshold metric value for the determined performance metric. As an illustrative example, the model orchestration platform 1302 (e.g., through the performance engine 1318) determines an indication of computational or monetary resources available for processing the input or prompt (e.g., to generate an associated output). The model orchestration platform 1302 can determine an available budget (e.g., a threshold cost metric) and/or available memory space (e.g., remaining space within a memory device of the system) for processing the request. By doing so, the model orchestration platform 1302 can evaluate the effect of generating an output based on the prompt using the specified model (e.g., agent) with respect to system requirements or constraints.

In some implementations, the model orchestration platform 1302 (e.g., through performance engine 1318) can determine the threshold metric value to include the allowance value. For example, the performance engine 1318 determines that the performance metric corresponds to a cost metric. The performance engine 1318 can determine a maximum cost value associated with output generation associated with the system. The performance engine 1318 can determine, based on the system state, a sum of cost metric values for previous output generation requests associated with the system. The performance engine 1318 can determine, based on the maximum cost value and the sum, an allowance value corresponding to the threshold metric value. The performance engine 1318 can determine the threshold metric value comprising the allowance value. As an illustrative example, the performance engine 1318 determines a remaining budget associated with model operations. By doing so, the performance engine 1318 can mitigate cost overruns associated with output text generation, thereby improving the efficiency of the model orchestration platform 1302.

In some implementations, the model orchestration platform 1302 (e.g., through the performance engine 1318) can determine the threshold metric value based on a user identifier and corresponding group associated with the output generation request. For example, the model orchestration platform 1302 determines, based on the output generation request, a user identifier associated with a user of the user device. The performance engine 1318 can determine, using the user identifier, a first group of users, wherein the first group comprises the use. The performance engine 1318 can determine the allowance value associated with the first group of users. As an illustrative example, the performance engine 1318 determines an allowance value (e.g., a budget) that is specific to a group of users associated with the user identifier (e.g., a username) of the output generation request. As such, the model orchestration platform 1302 enables tracking of resources assigned or allocated to particular groups of users (e.g., teams), thereby improving the flexibility of allocation of system resources.

In some implementations, the model orchestration platform 1302 (e.g., through the performance engine 1318) can determine the threshold metric value based on a usage value for a computational resource. For example, the model orchestration platform 1302 determines that the performance metric corresponds to a usage metric for a computational resource. The performance engine 1318 can determine an estimated usage value for the computational resource based on the indication of an estimated computational resource usage by the first model (e.g., agent) when processing the input (e.g., prompt) with the first model. The performance engine 1318 can determine a maximum usage value for the computational resource. The performance engine 1318 can determine, based on the system state, a current resource usage value for the computational resource. The performance engine 1318 can determine, based on the maximum usage value and the current resource usage value, an allowance value corresponding to the threshold metric value. The performance engine 1318 can determine the threshold metric value comprising the allowance value. As an illustrative example, the performance engine 1318 can determine a threshold metric value based on a remaining available set of resources that are idle (e.g., processors that are not being used or free memory). As such, the model orchestration platform 1302 enables dynamic evaluation of the state of the system for determination of whether sufficient resources are available for processing the output.

At act 1910, the process 1900 can determine an estimated performance metric value associated with processing the output generation request. For example, the process 1900 determines a first estimated performance metric value for the determined performance metric based on an indication of an estimated resource usage by the first model when processing the input included in the output generation request. As an illustrative example, the model orchestration platform 1302 determines a prediction for resource usage for generating an output using the indicated model (e.g., an agent associated with the determined performance metric). The model orchestration platform 1302 (e.g., through the performance engine 1318) can determine a number of input tokens within the input or prompt and predict a cost and/or a memory usage associated with processing the prompt using the selected model. By doing so, the model orchestration platform 1302 can evaluate the effects of processing the input on system resources for evaluation of the suitability of the model for generating the requested output.

In some implementations, the model orchestration platform 1302 generates a composite performance metric value based on more than one performance metric. For example, the performance engine 1318 determines that the performance metric includes a composite metric associated with a plurality of system metrics. The performance engine 1318 can determine, based on the system state, a threshold composite metric value. The performance engine 1318 can determine a plurality of estimated metric values corresponding to the plurality of system metrics. Each estimated metric value of the plurality of estimated metric values can indicate a respective estimated resource usage associated with processing the output generation request with the first model. The performance engine 1318 can determine, using the plurality of estimated metric values, a composite metric value associated with processing the output generation request with the first model. The performance engine 1318 can determine the first estimated performance metric value comprising the composite metric value. As an illustrative example, the model orchestration platform 1302 can generate a geometric mean of estimated values associated with various performance metrics (e.g., estimated memory usage, CPU utilization, and/or cost) and determine an associated metric. In some implementations, the model orchestration platform 1302 can generate a weighted geometric mean based on weightings assigned to respective values of the performance metric. By doing so, the model orchestration platform 1302 enables flexible, targeted evaluation of system behavior associated with generating outputs using models.

In some implementations, the model orchestration platform 1302 generates a performance metric value corresponding to a number of input or output tokens. For example, the first estimated performance metric value corresponds to a number of input or output tokens, and wherein the threshold metric value corresponds to a maximum number of tokens. As an illustrative example, the model orchestration platform 1302 determines a number of input tokens (e.g., words or characters) associated with the input or prompt. Additionally or alternatively, the model orchestration platform 1302 determines (e.g., predicts or estimates) a number of output tokens associated with the output in response to the prompt. For example, the model orchestration platform 1302 can estimate a number of output tokens by identifying instructions or words associated with prompt length within the prompt (e.g., an instruction to keep the generated output within a particular limit). By doing so, the model orchestration platform 1302 can compare the number of tokens associated with processing the prompt with an associated threshold number of tokens to determine whether the selected model is suitable for the generation task. As such, the model orchestration platform 1302 can limit wordy or excessive output generation requests, thereby conserving system resources.

In some implementations, the model orchestration platform 1302 generates the estimated performance metric value based on providing the prompt to an evaluation model. For example, the model orchestration platform 1302 provides the input (e.g., the prompt) and an indication of the first model (e.g., agent) to a performance metric evaluation model to generate the first estimated performance metric value. To illustrate, the model orchestration platform 1302 can provide the input to a machine learning model (e.g., an artificial neural network) to generate an estimate of resources used (e.g., an estimated memory usage or cost) based on historical data associated with output generation. By doing so, the model orchestration platform 1302 improves the accuracy of estimated performance metric value determination, thereby mitigating overuse of system resources.

In some implementations, the model orchestration platform 1302 trains the evaluation model based on previous inputs (e.g., prompts) and associated performance metric values. For example, the model orchestration platform 1302 obtains, from a first database, a plurality of training prompts and respective performance metric values associated with providing respective training prompts to the first model. The model orchestration platform 1302 can provide the plurality of training prompts and respective performance metric values to the performance metric evaluation model to train the performance metric evaluation model to generate estimated performance metric values based on prompts. For example, the model orchestration platform 1302 can retrieve previous prompts submitted by users, as well as previous system states when the prompts are submitted to the associated model (e.g., agent). Based on these previous prompts and system states, the model orchestration platform 1302 can train the performance metric evaluation model to generate estimated performance metrics based on inputs.

At act 1912, the process 1900 can compare the first estimated performance metric value with the threshold metric value. As an illustrative example, the model orchestration platform 1302 can determine whether the first estimated performance metric value is greater than, equal to, and/or less than the threshold metric value. At act 1914, the process 1900 can determine whether the first estimated performance metric value satisfies the threshold metric value. (e.g., by determining that the estimated resource usage value is less than or equal to a threshold metric value). For example, the model orchestration platform 1302 can determine whether an estimated cost value associated with processing the prompt using the first model is less than or equal to an allowance value (e.g., a remaining balance within a budget). By doing so, the model orchestration platform 1302 can ensure that the prompt is processed when suitable system resources are available.

At act 1916, the process 1900 can provide the input (e.g., prompt) to the first model in response to determining that the first estimated performance metric value satisfies the threshold metric value. For example, in response to determining that the first estimated performance metric value satisfies the threshold metric value, the process 1900 provides the prompt to the first model to generate a first output by processing the input (e.g., prompt) included in the output generation request. As an illustrative example, the model orchestration platform 1302 can transmit the prompt (e.g., through the communication engine 1312 and/or via an associated API) to the first model for generation of an associated output. To illustrate, the model orchestration platform 1302 can generate a vector representation of the prompt (e.g., through word2vec or another suitable algorithm) and generate a vector representation of the output via the first model. By doing so, the model orchestration platform 1302 can process the user's output generation request with available system resources (e.g., monetary resources or computational resources).

At act 1918, the process 1900 can generate the output for display on a device associated with the user. For example, the process 1900 transmits the first output to a computing system enabling access to the first output by the user device. As an illustrative example, the model orchestration platform 1302 (e.g., through the communication engine 1312) can transmit the output from the first model to a computing system (e.g., a server) from which the user can access the generated output (e.g., through an API call and/or via a user interface). By doing so, the model orchestration platform 1302 enables generation of outputs (e.g., natural language outputs) using models specified by the user when system resources are available to process associated prompts.

At act 1920, the process 1900 can determine a second estimated performance metric value associated with a second model (e.g., agent) in response to determining that the first estimated performance metric value does not satisfy the threshold metric value. For example, in response to determining that the first estimated performance metric value does not satisfy the threshold metric value, the process 1900 determines a second estimated performance metric value for the determined performance metric based on an indication of an estimated resource usage by a second model of the plurality of models when processing the prompt included in the output generation request. As an illustrative example, the model orchestration platform 1302 can determine a second estimate for a cost associated with processing the output with the second model and determine whether this cost estimate is consistent with the threshold cost value (e.g., determine whether the cost is less than the budget available to the user for the output generation request).

At act 1922, the process 1900 can compare the second estimated performance metric value with the threshold metric value. For example, at act 1924, the process 1900 can determine whether the second estimated performance metric value satisfies the threshold metric value. As an illustrative example, the model orchestration platform 1302 can determine whether the cost metric value associated with processing the input (e.g., prompt) with the second model is greater than, less than, and/or equal to the threshold metric value (e.g., associated with an allowance or budget). By doing so, the model orchestration platform 1302 can ensure that sufficient system resources are available for processing the prompt using the second model, thereby enabling redirection of output generation requests to an appropriate model when the selected model is unsuitable due to insufficient resource availability.

At act 1926, the process 1900 can generate a second output by providing the prompt to the second model in response to determining that the second estimated performance metric value satisfies the threshold metric value. For example, the process 1900 provides the prompt to the second model to generate a second output by processing the input (e.g., prompt) included in the output generation request. As an illustrative example, the model orchestration platform 1302 (e.g., through the communication engine 1312) can generate vector representations of the prompt and transmit these (e.g., via an API call) to a device associated with the second model for generation of the associated output. By doing so, the model orchestration platform 1302 enables processing of the output generation request using a model (e.g., the second agent) that satisfies system resource limitations or constraints, thereby improving the resilience and efficiency of the model orchestration platform 1302.

In some implementations, the process 1900 can determine the second model based on a selection of the model by the user. For example, in response to determining that the first estimated performance metric value does not satisfy the threshold metric value, the model orchestration platform 1302 transmits a model (e.g., agent) selection request to the user device. In response to transmitting the model selection request, the model orchestration platform 1302 obtains, from the user device, a selection of the second model. The model orchestration platform 1302 can provide the input (e.g., prompt) to the second model associated with the selection. As an illustrative example, the model orchestration platform 1302 can generate a message for the user requesting selection of another model for generation of an output in response to the prompt. In response to the message, the model orchestration platform 1302 can receive instructions from the user (e.g., via a command or function) for redirection of the prompt to another suitable model that satisfies performance requirements for the system.

In some implementations, the process 1900 can determine the second model based on a selection of the model on a GUI (e.g., from a list of models with performance metrics that satisfy the performance requirements). For example, the model orchestration platform 1302, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the model orchestration platform 1302 can receive a user instruction comprising an indication of the second model. In response to receiving the user instruction, the model orchestration platform 1302 can provide the prompt to the second model. To illustrate, the model orchestration platform 1302 can generate indications of one or more recommended models with estimated performance metric values (e.g., estimated cost values) that are compatible with the associated threshold performance metric (e.g., a threshold cost metric). By doing so, the model orchestration platform 1302 can present options for models (e.g., that satisfy system performance constraints) for processing the user's prompt, conferring the user with increased control over output generation.

At act 1928, the process 1900 can generate the output for display on a device associated with the user. For example, the process 1900 transmits the second output to the computing system enabling access to the second output by the user device. As an illustrative example, the model orchestration platform 1302 (e.g., through communication engine 1312) transmits the second output to a computing system that enables access to the output by the user (e.g., through an associated API or GUI).

At act 1930, the process 1900 can transmit an error message to the computing system in response to determining that the second estimated performance metric value does not satisfy the threshold metric value. As an illustrative example, the model orchestration platform 1302 (e.g., through the communication engine 1312) can generate a message that indicates that the input (e.g., prompt) is unsuitable for provision the second model due to insufficient resources. Additionally or alternatively, the model orchestration platform 1302 can determine a third model (e.g., agent) with satisfactory performance characteristics (e.g., with a third estimated performance metric value that satisfies the threshold metric value). By doing so, the model orchestration platform 1302 enables generation of an output based on the prompt via a model such that system resources are conserved or controlled.

In some implementations, the process 1900 generates a recommendation for a model by providing the output generation request (e.g., the associated prompt) to a selection model. For example, in response to determining that the first estimated performance metric value does not satisfy the threshold metric value, the model orchestration platform 1302 generates, for display on a user interface of the user device, a request for user instructions. The request for user instructions can include a recommendation for processing the output generation request with the second model of the plurality of models. In response to generating the request for user instructions, the model orchestration platform 1302 can receive a user instruction comprising an indication of the second model. In response to receiving the user instruction, the model orchestration platform 1302 can provide the input (e.g., prompt) to the second model. As an illustrative example, the model orchestration platform 1302 can evaluate the prompt for selection of a model that is compatible with resource requirements and/or a task associated with the output generation request. For example, the model orchestration platform 1302 can determine an attribute associated with the prompt (e.g., that the prompt is requesting the generation of a code sample) and reroute the prompt to a model that is configured to generate software-related outputs. By doing so, the model orchestration platform 1302 can recommend models that are well-suited to the user's requested task, thereby improving the utility of the disclosed model orchestration platform.

Figure 20:
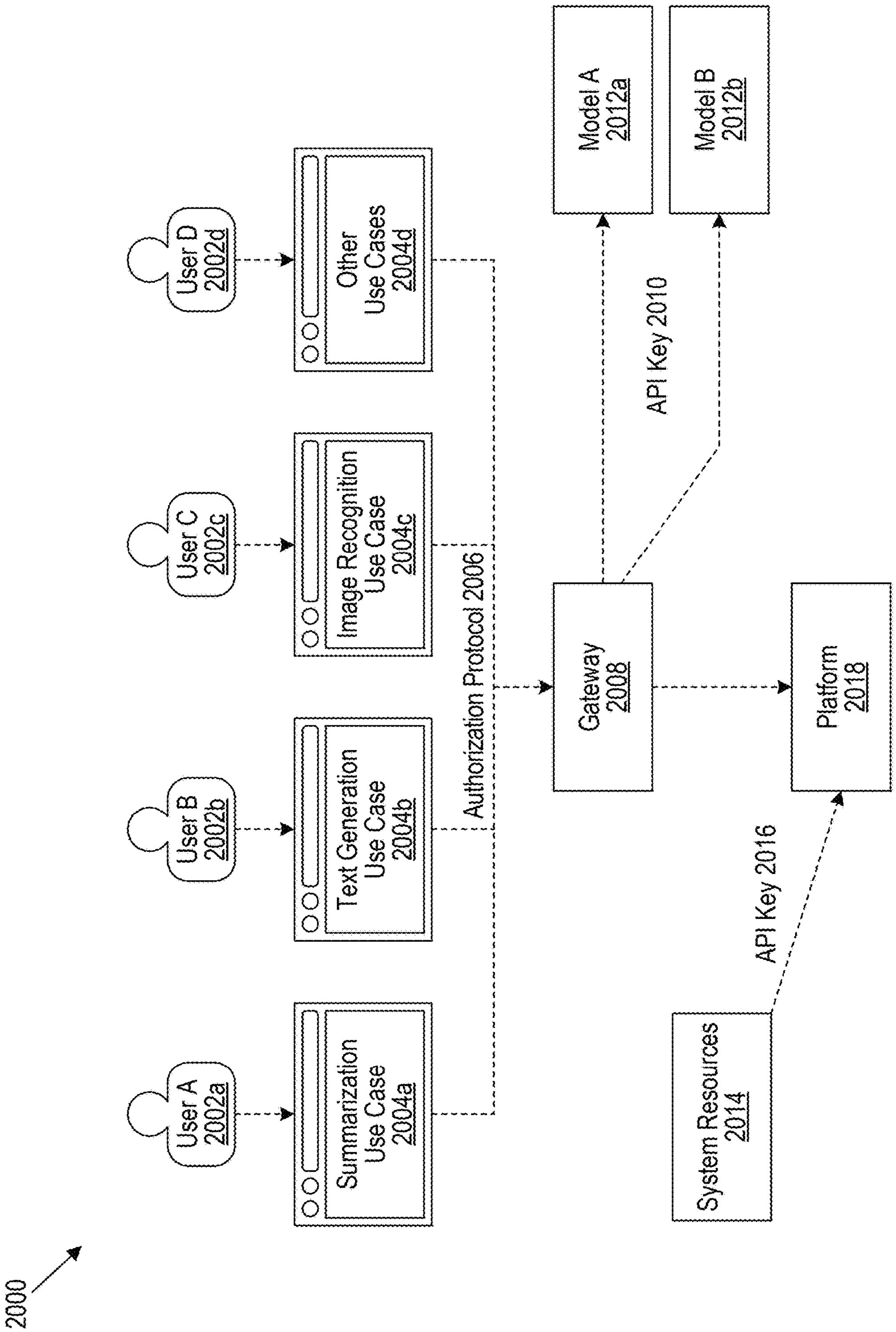
FIG. 20 shows a schematic illustrating an example environment of a platform for dynamically selecting models and infrastructure to process a request with the selected models, in accordance with some implementations of the present technology.

Dynamic Resource-Sensitive Agent Selection Using the Model Orchestration Platform FIG. 20 is an illustrative diagram illustrating an example environment 2000 of a platform 2018 for dynamically selecting models and infrastructure to process a request with the selected models, in accordance with some implementations of the present technology. Environment 2000 includes users 2002*a-d*, use cases 2004*a-d*, authorization protocol 2006, gateway 2008, API key 2010, 2016, models 2012*a-b*, system resources 2014, and platform 2018. Platform 2018 is implemented using components of example devices 200 and computing devices 302 illustrated and described in more detail with reference to FIG. 2 and FIG. 3, respectively. Platform 2018 can be the same as or similar to model orchestration platform 1302 with reference to FIG. 13. Likewise, implementations of example environment 2000 can include different and/or additional components or can be connected in different ways.

Users 2002*a-d* can each represent different individuals or entities who interact with the platform by submitting inputs (e.g., input inquiry, prompt, query) in an output generation request to be processed subsequently by the platform 2018 to select appropriate models and resources. Each user 2002*a-d* can have distinct requirements and use cases, such as summarization use case 2004*a*, text generation use case 2004*b*, image recognition use case 2004*c*, and/or other use cases 2004*d*. For example, the summarization use case 2004*a* can include generating a concise summary of a given text input. The user 2002*a* submits a text document or a large body of text, and the platform 2018 processes the text document to produce a shorter version that captures the representative points and information of the text document. Additionally, the text generation use case 2004*b* can include generating new text based on a given prompt or input. The user 2002*b* provides a starting sentence, topic, or context, and the platform generates coherent and contextually relevant text. For instance, a user can provide a prompt like "Once upon a time in a faraway land," and the platform generates a continuation of the story. Further, the image recognition use case 2004*c* can include analyzing and identifying objects, features, or patterns within an image. The user 2002*c* submits an image, and the platform processes the image to recognize and label the contents. For example, a user can upload a photo of a crowded street, and the platform identifies and labels objects such as cars, pedestrians, traffic lights, and buildings.

The authorization protocol 2006 ensures that only authorized users and devices can access the platform 2018 by managing authentication and authorization processes, verifying user identities, and granting appropriate access rights based on predefined policies. The authorization protocol 2006 can include one or more of, for example, multi-factor authentication, OAuth tokens, or other security measures to ensure access control. In some implementations, the authorization protocol can also include biometric verification or hardware-based security modules for improved security. Examples of authorization protocol 2006 and methods of implementing authorization protocol 2006 are discussed with reference to FIG. 21.

The gateway 2008 is an entry point for output generation requests submitted by users 2002*a-d*, routing the output generation requests to the platform 2018. The gateway 2008 can perform load balancing (i.e., distributing requests across multiple platform instances to improve efficiency of resource use and prevent bottlenecks), data transformations (i.e., converting and normalizing input data for compatibility with the platform), and/or protocol translations (e.g., converting HTTP requests to gRPC) to support the interactions between users 2002*a-d* and the platform 2018. In some implementations, the gateway 2008 is a microservices-based architecture that allows for scalable and modular handling of requests. For example, when user 2002*a* submits a text summarization request, the gateway 2008 balances the load by directing the request to an available instance (e.g., platform 2018), transforms the data format if needed, and/or translates the protocol to ensure compatibility before transmitting the request to the platform 2018. The platform 2018 processes the request, and the gateway 2008 returns the summarized text to the user.

In some implementations, when a user submits a request, the gateway 2008 first intercepts the request and checks for the presence of a valid API key 2010. The API key 2010, which serves as a unique identifier, is verified against the authorization protocol 2006. API key 2010 is used to authenticate (e.g., via authorization protocol 2006) and authorize API requests to ensure that only valid requests from authorized users or systems are processed by the platform. Once authenticated, the authorization protocol 2006 can check the associated permissions and roles linked to the API key 2010 to determine if the user has the necessary access rights to perform the requested action. If the API key 2010 is valid and the user is authorized, the gateway 2008 routes the request to the appropriate components within the platform 2018. This interaction ensures that only authorized users can access the platform's resources, maintaining the security and integrity of the system. In some implementations, the authorization protocol 2006 can also enforce additional security measures, such as rate limiting and logging, to further protect the platform from unauthorized access and abuse. In some implementations, API key 2010 can be supplemented with JWT (JSON Web Tokens) for stateless authentication and improved security.

Models 2012*a-b* are the different models (e.g., AI models, machine learning models, LLMs) accessible by the platform 2018. The models 2012*a-b* can have different capabilities and performance properties or attributes. The platform 2018 dynamically selects the most appropriate model(s) within models 2012*a-b* based on the output generation request of the user 2002*a-d* that specifies the use case 2004*a-d*. Methods of dynamically selecting the most appropriate model(s) is discussed in further detail with reference to FIG. 21. The models 2012*a-b* can include, for example, deep learning models, decision trees, or ensemble methods, depending on the use case 2004*a-d*. In some implementations, the platform can use a model registry to manage and version control the models 2012*a-b* to ensure that the most up-to-date and accurate versions of models 2012*a-b* are used for processing the output generation request.

Similarly to API key 2010, API key 2016 can be used to verify the system resources 2014 accessible by the users 2002*a-d*. System resources 2014 include the computational and storage resources used to process output generation request, encompassing CPU, GPU, memory, and/or other software, hardware, and/or network components that the platform allocates dynamically. The platform can use container orchestration tools such as KUBERNETES to manage the system resources 2014. In some implementations, the platform could leverage cloud-based infrastructure for elastic scaling and cost efficiency.

Figure 21:
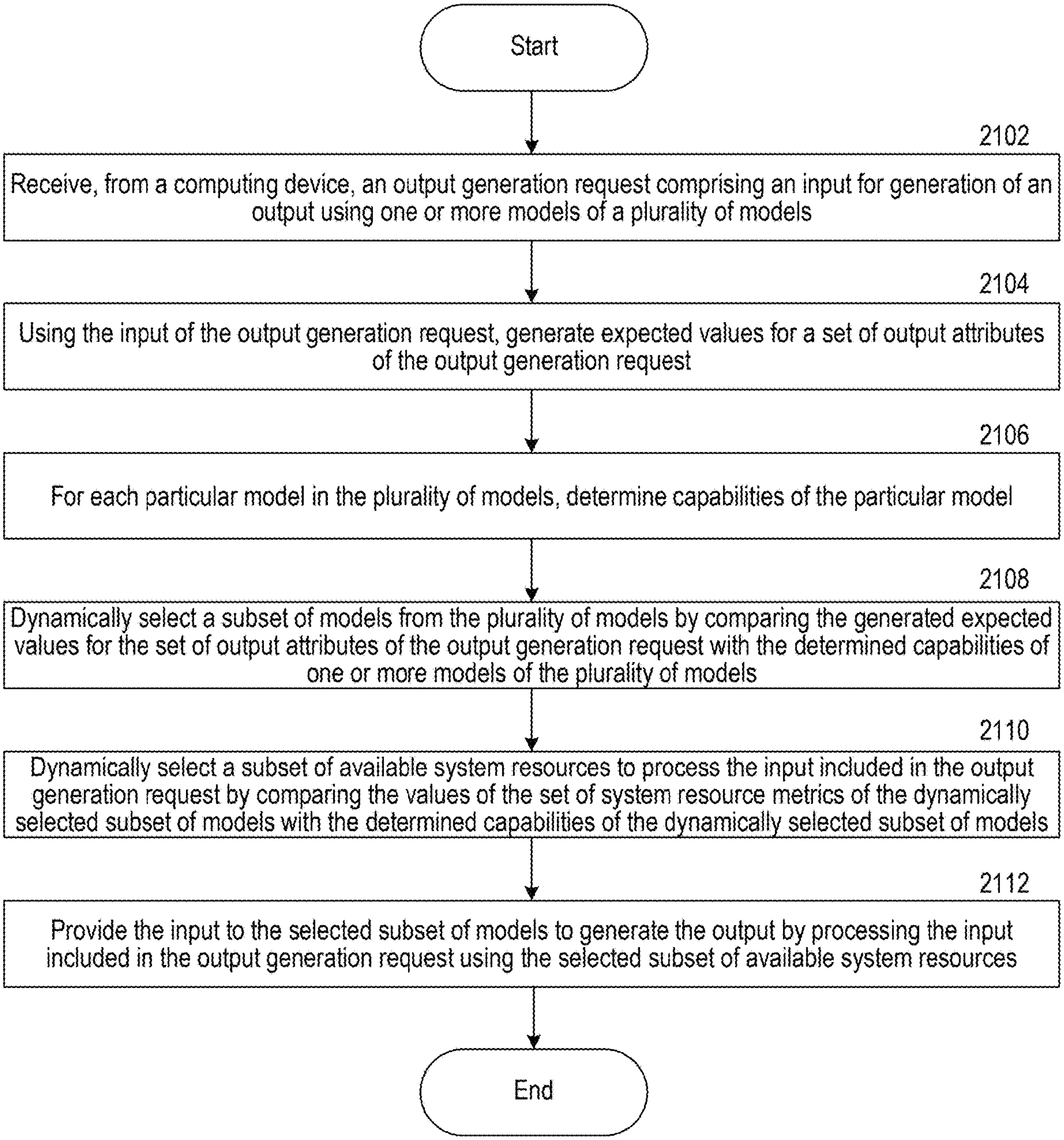
FIG. 21 is a flow diagram illustrating a process for the dynamic selection of models and infrastructure to process the request with the selected models based on evaluation of user prompts, in accordance with some implementations of the present technology.

FIG. 21 is a flow diagram illustrating a process 2100 for the dynamic selection of models and infrastructure to process the request with the selected models based on evaluation of user prompts, in accordance with some implementations of the present technology. In some implementations, the process 2100 is performed by components of example devices 200 and computing devices 302 illustrated and described in more detail with reference to FIG. 2 and FIG. 3, respectively. Likewise, implementations can include different and/or additional operations or can perform the operations in different orders.

In operation 2102, the system receives, from a computing device, an output generation request including an input (e.g., a prompt, query, input query, request) for generation of an output using one or more models (e.g., AI models) of a plurality of models. In some implementations, at least one AI model in the plurality of AI models is an LLM. The request can be received, for example, via an API endpoint exposed by a gateway (e.g., gateway 2008), which can be the entry point for incoming output generation request. The output generation request can include various parameters such as the type of output desired (e.g., text, image, or data), specific instructions or constraints, and/or metadata about the requestor.

In some implementations, the output generation request includes a predefined query context (e.g., metadata about the requestor) corresponding to a user of the computing device. The predefined query context is a vector representation of one or more expected values for the set of output attributes of the output generation request. The query context can include various types of metadata, such as the user's preferences, historical interaction data, or specific constraints and requirements for the output. For example, if the requestor is a user seeking a text summary, the query context can include information about the preferred summary length, the level of detail required, and any specific sections of the text that should be prioritized.

The vector representation of the query context is typically generated using techniques such as word embeddings, sentence embeddings, or other forms of vectorization that capture the semantic meaning and relationships of the metadata. Text vectorization transforms textual data into a numerical format. The pre-defined query context can be preprocessed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making the text easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog".

This vector is used to inform and guide the AI models during the output generation process. For instance, a model can adjust its text generation parameters to produce a summary that aligns with the user's historical or recorded preferences for length and detail. The use of a predefined query context allows the system to provide more personalized and contextually relevant outputs, enhancing the overall user experience. Additionally, the query context can be dynamically updated based on the user's interactions and feedback, allowing the system to continuously learn and improve its performance.

In operation 2104, using the prompt of the output generation request, the system generates expected values for a set of output attributes (e.g., output properties, features) of the output generation request. The generated expected values for the set of output attributes of the output generation request can indicate: (1) a type of the output generated from the prompt (e.g., text generation, summarization, image recognition, length of output, format, tone) and (2) a threshold response time of the generation of the output (e.g., low latency, high latency). Natural language processing (NLP) techniques, such as tokenization, part-of-speech tagging, and named entity recognition, can be used to identify the semantic structure and intent of the prompt. Based on this analysis, the system generates expected values for the output attributes.

The type of output refers to the specific format or nature of the generated content. For instance, the system can determine whether the output should be a text summary, a detailed report, an image, or a data visualization. The determination is based on the prompt's content and any predefined query context provided in the request. The system can use classification algorithms or predefined rules to categorize the prompt and assign the appropriate output type. For example, a prompt asking for a summary of a document can result in the system generating a concise text summary, while a prompt requesting an analysis of sales data can lead to the creation of a graphical report.

The threshold response time is an attribute that specifies the maximum allowable time for generating the output. The threshold response time ensures that the system meets performance requirements and provides timely responses to user requests. The system can calculate the threshold response time based on factors such as the complexity of the prompt, the computational resources available, and any user-specified constraints. For instance, a simple text generation task can have a shorter threshold response time compared to a complex image recognition task that uses extensive processing. The threshold response time can be dynamically adjusted based on a current load or resource availability of the system. For example, the system continuously monitors metrics such as CPU and GPU utilization, memory usage, network bandwidth, and active requests. When high load or limited resources are detected, the system increases the threshold response time for new requests to balance the load and prevent delays. Conversely, during low demand periods, the system decreases the threshold response time to provide faster responses. The system can prioritize requests based on the importance, assigning shorter response times to high-priority requests and longer times to lower-priority ones.

In operation 2106, for each particular AI model in the plurality of AI models, the system determines capabilities of the particular AI model. The capabilities can include, for example, (1) values of a set of estimated performance metrics for processing requests using the particular AI model (e.g., the abilities of the models on the platform), and/or (2) values of a set of system resource metrics indicating an estimated resource usage of available system resources for processing the requests using the particular AI model. The available system resources can include hardware resources, software resources, and/or network resources accessible by the computing device to process the output generation request using the particular AI model. Hardware resources can include resources beyond physical hardware, such as virtual machines (VMs). A VM is a software-based emulation of a physical computer that runs an operating system and applications just like a physical computer. Multiple VMs are able to run on a single physical machine, sharing the physical machine's resources such as CPU, memory, and storage. Each VM operates independently and can run different operating systems and applications, and are thus commonly used for tasks such as testing, development, and running multiple applications on a single hardware platform.

The values of the set of estimated performance metrics for each particular AI model in the plurality of AI models can include, for example, response time, accuracy, and/or latency. For example, the system can analyze the model's accuracy in generating text summaries, its response time for image recognition tasks, or its throughput in handling multiple concurrent requests.

The values of the set of system resource metrics for each particular AI model in the plurality of AI models can include, for example, Central Processing Unit (CPU) usage, Graphical Processing Unit (GPU) usage, memory usage, cost, power consumption, and/or network bandwidth. The system assesses the resource consumption patterns of each AI model, considering factors like computational intensity, memory footprint, and data transfer requirements. For instance, a deep learning model for image recognition can have high GPU and memory usage, while an NLP model can use significant CPU and network bandwidth for handling large text datasets.

To determine the capabilities of each AI model, the system can examine the model's architecture (e.g., the number of layers in a neural network), configuration (e.g., the types of operations the model performs), and dependencies (e.g., dependency on specific libraries or frameworks) to estimate the model's resource requirements and performance characteristics (e.g., computational intensity, memory footprint, and potential bottlenecks). In some implementations, the system can execute the model with representative data and capturing metrics such as processing time, accuracy, throughput, CPU and GPU utilization, memory consumption, and network bandwidth usage.

In some implementations, the system obtains a set of operation boundaries (e.g., guidelines, regulatory guidelines) of the plurality of AI models. In some implementations, the system translates guidelines into actionable test cases for evaluating AI model compliance. By parsing and interpreting guidelines (e.g., regulatory documents), the system identifies relevant compliance requirements and operational boundaries that must be complied with plurality of AI models. The system constructs a set of test cases associated with each guideline that covers various scenarios derived from the regulatory requirements. These test cases can include prompts, expected outcomes, and/or expected explanations. For each particular AI model in the plurality of AI models, the system evaluates the particular AI model against the set of test cases to determine compliance of the particular AI model with the set of operation boundaries. The system can generate one or more compliance indicators based on comparisons between expected and actual outcomes and explanations. For example, if the particular AI model's response meets the expected outcome and explanation, the particular AI model receives a positive compliance indicator. If there are discrepancies, the system can flag these as areas requiring further attention or modification. In some implementations, the system can automatically adjust to the parameters of the particular AI model to ensure alignment with regulatory guidelines. By validating each particular AI model, this results in more efficient resource usage so the validation test cases only have to be run once by the platform, rather than every time a user attempts to access a particular AI model.

In operation 2108, the system dynamically selects a subset of AI models from the plurality of AI models by comparing the generated expected values for the set of output attributes of the output generation request with the determined capabilities of the plurality of AI models. This comparison can be performed by assigning a degree to which each model's capabilities align with/satisfy the expected values. For instance, if the request requires a high-accuracy text summary with a short response time, the system assigns a higher degree of alignment/satisfaction to models that have demonstrated high accuracy and low latency in similar tasks in their determined capabilities.

In some implementations, the subset of models is dynamically selected responsive to determining the capabilities of each particular model in the plurality of models. The system can compare the determined capabilities a first model of the plurality of models with the determined capabilities of a second model of the plurality of models. The system can use a scoring mechanism that assigns a compatibility score to each AI model based on how well its capabilities match the expected values. The scoring mechanism can use weighted criteria to prioritize certain attributes over others, depending on the specific requirements of the request. For example, in a real-time application, response time can be weighted more heavily than accuracy, whereas in a medical diagnosis task, accuracy can be the primary criterion. The system aggregates the scores to rank the AI models, identifying those that best meet the overall requirements of the request. The system can normalize the performance metrics and expected values to a common scale to allow different metrics can be compared and aggregated. The system applies weights to each metric based on the importance of the corresponding attribute. The weights can be predefined based on the type of request or dynamically adjusted based on user preferences or contextual factors. For instance, a weight of 0.7 can be assigned to accuracy and 0.3 can be assigned to latency for a medical diagnosis task, reflecting the higher priority of accuracy.

Once the weights are applied, the system calculates a weighted sum for each AI model, representing its overall compatibility score. The score is a composite measure that reflects how well the model's capabilities align with the expected values across all relevant attributes. The system aggregates the scores to rank the AI models, identifying those that best meet the overall requirements of the request. The models with the highest compatibility scores are selected as the subset of AI models for processing the output generation request. In some implementations, the system prioritizes each AI model in the plurality of AI models based on historical performance data of each AI model in the plurality of AI models. The system can store the historical performance data of each AI model in a database accessible by the system. The system updates the historical performance data of one or more AI models in the plurality of AI models after the output generation request is processed.

In some implementations, the system sequentially evaluates each model's capabilities and compares them to the expected values, until a model is found that satisfies the requirements of the output generation request. The system determines the capabilities of a first model in the plurality of models. The system compares the generated expected values for the set of output attributes of the output generation request with the determined capabilities of the first model. Responsive to the determined capabilities of the first model satisfying the generated expected values for the set of output attributes of the output generation request, the system provides the input to the first model to generate the output by processing the input included in the output generation request using the selected subset of available system resources. Responsive to the determined capabilities of the first model not satisfying the generated expected values for the set of output attributes of the output generation request, the system can determine the capabilities of a second model in the plurality of models. Responsive to the determined capabilities of the second model satisfying the generated expected values for the set of output attributes of the output generation request, the system can provide the input to the second model to generate the output by processing the input included in the output generation request using the selected subset of available system resources. The approach ensures that the system quickly identifies a suitable model without the need for exhaustive evaluation of all available models. By stopping the search as soon as a model that meets the expected values is found, the system can efficiently allocate resources and minimize processing time.

In operation 2110, the system dynamically selects a subset of available system resources to process the prompt included in the output generation request by comparing the values of the set of system resource metrics of the dynamically selected subset of AI models with the determined capabilities of the dynamically selected subset of AI models. The system can query resource management modules to obtain real-time data on resource usage across the computing infrastructure. The system assesses the availability of hardware resources, such as the number of free CPU cores, available GPU memory, and storage capacity. The system can additionally or alternatively consider software dependencies, ensuring that the required libraries and frameworks are installed and compatible with the selected models. Additionally, the system evaluates network resources, such as available bandwidth and latency, to ensure that data can be transferred efficiently between components. To perform the comparison, the system can take into account various factors, such as resource constraints, priority levels, and potential contention with other tasks. The system can assign weights (e.g., accessed via an API key) to different resource types based on the resource's respective importance for the specific models and the output generation request. For example, GPU resources can be weighted more heavily for a model that relies on parallel processing, while network bandwidth can be prioritized for a model that requires frequent data transfers.

The dynamically selected subset of available system resources can include a set of shared hardware and a set of dedicated hardware. Shared hardware refers to resources that are concurrently used by multiple tasks or processes, such as general-purpose CPUs, shared GPU clusters, and common storage systems. Dedicated hardware, on the other hand, refers to resources that are exclusively allocated to a specific task or process, such as dedicated GPU instances, specialized accelerators (e.g., TPUs), and isolated memory pools. In some implementations, the system initializes processing the input query included in the output generation request using the set of shared hardware for a predetermined time period. Upon expiration of the predetermined time period, the system continues to process the input query included in the output generation request using the set of dedicated hardware. The transition allows the most resource-intensive stages of the processing are handled by dedicated resources, which can provide higher performance, lower latency, and more predictable execution times.

In some implementations, the system initializes processing the input query included in the output generation request using the set of dedicated hardware for a predetermined time period. Upon expiration of the predetermined time period, the system continues to process the input query included in the output generation request using the set of shared hardware. The transition helps better use resources by offloading less performance-based stages of the processing to shared resources, freeing up dedicated hardware for other high-priority tasks.

In operation 2112, the system provides the prompt to the selected subset of AI models to generate the output by processing the prompt included in the output generation request using the selected subset of available system resources. The routing process can be managed by a task scheduler that coordinates the execution of the models across the allocated system resources. The scheduler ensures that the input data is distributed to the appropriate models, taking into account factors such as data locality, resource availability, and load balancing. For example, if multiple models are running on different GPU instances, the scheduler ensures that the input data is transferred to the correct GPU memory to minimize data transfer latency and maximize processing efficiency. In some implementations, responsive to the generated output, the system automatically transmits, to the computing device, the output within the threshold response time. In some implementations, processing the input included in the output generation request using the dynamically selected subset of available system resources consumes less electrical power than processing the input included in the output generation request using a different subset of available system resources within the set of available system resources.

The output can be a final output. In some implementations, the system provides the prompt to the dynamically selected subset of AI models in parallel. The system can aggregate model-specific outputs from each AI model of the dynamically selected subset of AI models to generate the final output. In some implementations, the system distributes the input prompt across multiple AI models simultaneously, allowing each model to process the data independently and concurrently. The system can partition the input prompt into segments or sub-tasks that can be processed in parallel. For instance, in a text summarization task, the input document can be divided into sections, with each section being processed by a different model. In an image recognition task, different regions of an image can be analyzed by separate models. Once the input prompt is partitioned, the system routes each segment to the corresponding AI model in the dynamically selected subset. Once each AI model has processed the model's segment of the input prompt, the system aggregates the model-specific outputs to generate the final output. For instance, in a text summarization task, the system can merge the summaries generated by each model into a single summary. In an image recognition task, the system can combine the detected objects and features from each model into a single analysis of the input image.

In some implementations, the system provides the prompt to the dynamically selected subset of AI models in a sequence. The system can input a model-specific output from a first AI model of the dynamically selected subset of AI models into a second AI model of the dynamically selected subset of AI models in the sequence. For example, the system can provide the initial prompt to the first AI model in the sequence. The model processes the input data according to its specific capabilities and generates an intermediate output. For example, in an NLP task, the first model can perform tokenization and part-of-speech tagging on the input text. In an image processing task, the first model can perform initial feature extraction or object detection. Once the first model has generated its output, the system takes the model-specific output and inputs the model-specific output into the second AI model in the sequence. The second model processes the intermediate output, further refining or transforming the data. For instance, in the NLP task, the second model can perform named entity recognition or sentiment analysis on the tagged text. In the image processing task, the second model can perform more detailed analysis, such as identifying specific objects or classifying detected features. The sequential processing continues, with each model in the sequence receiving the output from the previous model and generating its own intermediate output. Once the final model in the sequence has processed its input, the system generates the final output.

In some implementations, the system generates a confidence score for a model-specific output generated by each AI model in the selected subset of AI models. The system can aggregate the model-specific outputs using the generated confidence scores. The system selects the model-specific output with a highest confidence score for transmission to the computing device. For example, in an NLP task, a model can calculate its confidence score based on the probability distribution of the generated text, the coherence of the sentences, and the alignment with known linguistic patterns. In an image recognition task, a model can calculate its confidence score based on the clarity of the detected objects, the consistency of the classification results, and the alignment with training data.

The system can receive a set of user feedback on the generated output. The feedback can be collected through various channels, such as user ratings, comments, error reports, or direct interaction with the output. The feedback data can be evaluated by the system to identify patterns, trends, and specific areas for improvement using NLP techniques and sentiment analysis to interpret and categorize the feedback. For example, the system can parse the textual feedback to extract information such as user satisfaction levels, specific issues encountered, and/or suggestions for improvement. The system can use machine learning algorithms, such as support vector machines (SVM) or neural networks, to classify the feedback into different categories, such as accuracy, relevance, performance, and usability. For example, feedback indicating that the output was inaccurate or irrelevant can be categorized under "accuracy issues," while feedback highlighting slow response times can be categorized under "performance issues."

Using the processed feedback, the system can adjust the dynamically selected subset of AI models and/or the dynamically selected subset of available system resources. For the AI models, the system can update the model selection criteria (e.g., assigning a higher weight to criticized areas such as accuracy or latency), retrain or fine-tune the models, or incorporate new models that better address the identified issues. For the system resources, the system can reallocate resources based on the feedback to improve performance and efficiency. For example, if the feedback indicates that the processing time is too slow, the system can allocate more CPU or GPU resources to the task, adjust the data pipelines, or implement more efficient algorithms. Conversely, if the feedback indicates that certain resources are being underutilized, the system can reallocate those resources to other tasks or reduce the overall resource allocation to improve cost efficiency. In some implementations, the system can use a reward-based mechanism where positive feedback leads to reinforcement of the current model and resource configurations, while negative feedback triggers further adjustments.

In some implementations, responsive to the generated output, the system generates for display at the computing device, a layout indicating the output. The layout can include a first representation of each model in the dynamically selected subset of models, a second representation of the dynamically selected subset of available system resources, and/or a third representation of the output. Further examples and methods of displaying the output are discussed with reference to FIG. 22.

Figure 22:
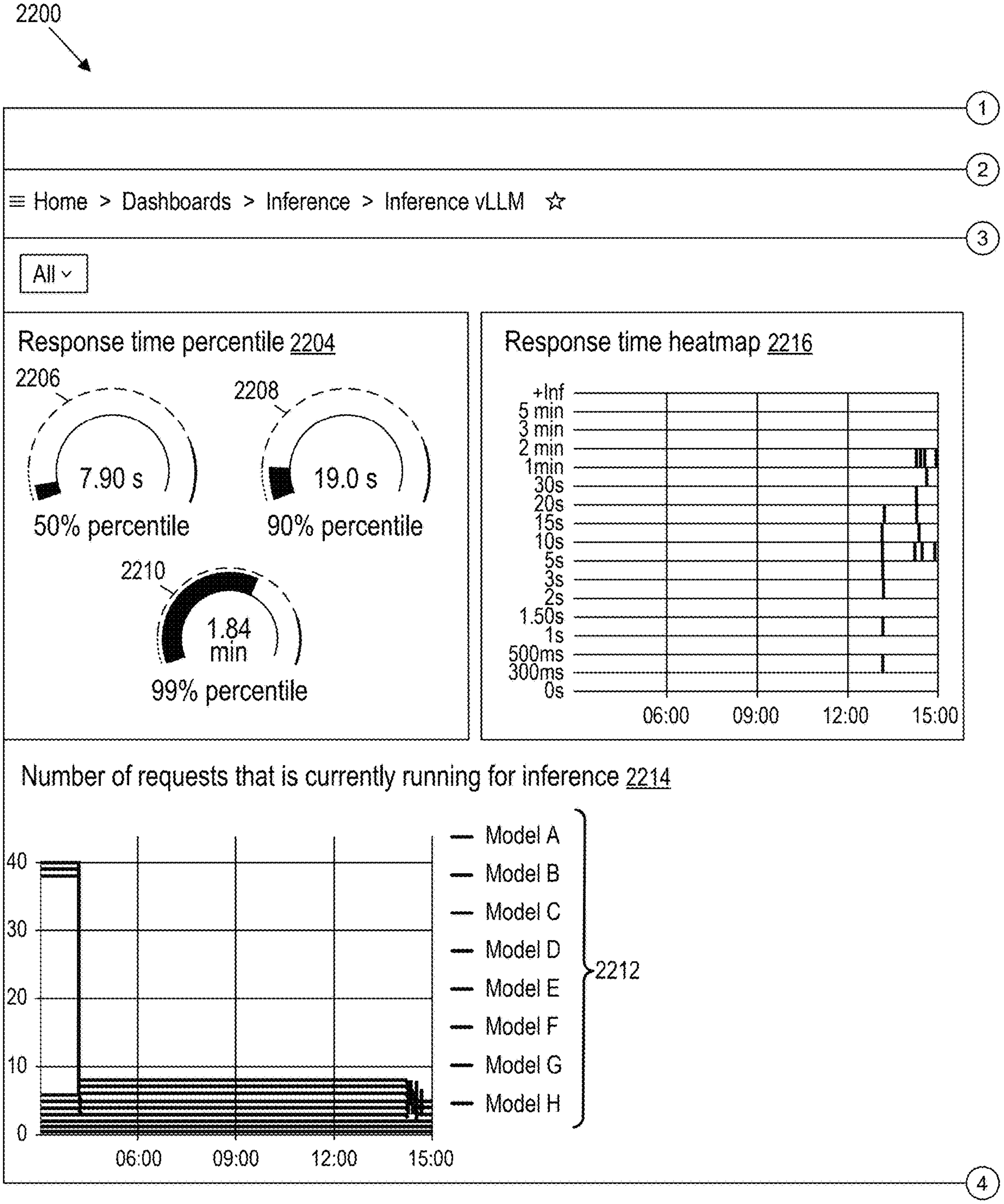
FIG. 22 is an example user interface for monitoring user activity, in accordance with some implementations of the present technology.
Figure 22:
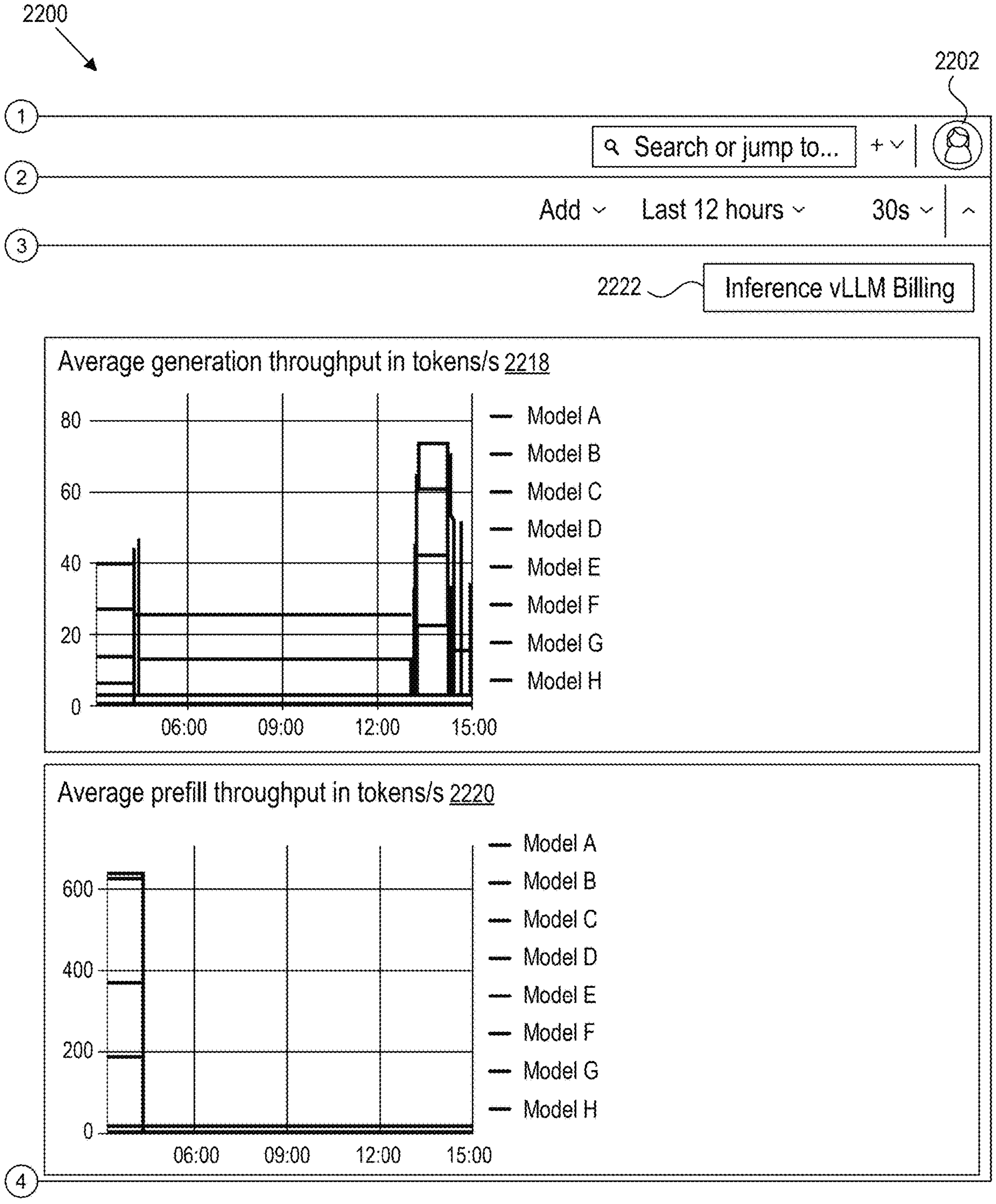

FIG. 22 is an example user interface 2200 for monitoring user activity, in accordance with some implementations of the present technology. User interface 2200 includes user 2202, response time percentile 2204, percentile graphs 2206, 2208, 2210, models 2212, request load 2214, latency representation 2216, generation throughput representation 2218, prefill throughput representation 2220, and cost representation 2222. User interface 2200 is implemented using components of example devices 200 and computing devices 302 illustrated and described in more detail with reference to FIG. 2 and FIG. 3, respectively. User 2202 can be the same as or similar to users 1902*a-d* with reference to FIG. 20. Implementations of example user interface 2200 can include different and/or additional components or can be connected in different ways.

The user interface 2200 allows users or administrators to monitor and manage the platform performance. The user 2202 refers to the individual or entity interacting with the system. The user 2202 can have a particular role and set of permissions within the system, and the output generation requests of the user 2202 can be tracked to ensure efficient resource allocation and model selection. In some implementations, the user 2202 can include automated agents or services that interact with the system on behalf of human users.

The response time percentile 2204 represents the distribution of response times for requests processed by the system. The response time percentile 2204 can be used to indicate the performance and latency of the system. The response time percentile 2204 can be displayed in a particular percentile format, such as the 50th, 90th, and 99th percentiles, indicating the response times below which a certain percentage of requests fall. In some implementations, additional percentiles or custom percentile ranges can be included to provide more granular insights into system performance. Percentile graphs 2206, 2208, 2210 visually represent the response time percentiles over a specified period. For example, in FIG. 22, percentile graph 2206 indicates the 50th percentile (e.g., 7.90 seconds), percentile graph 2208 indicates the 90th percentile (e.g., 19.0 seconds), and percentile graph 2210 indicates the 99th percentile (e.g., 1.84 seconds). Percentile graphs 2206, 2208, 2210 help users or administrators quickly identify trends and anomalies in system performance. In some implementations, the percentile graphs 2206, 2208, 2210 can be interactive, allowing users to zoom in on specific time ranges or filter data based on different criteria.

Models 2212 refer to the various machine learning models available within the system. Models 2212 can include a wide range of models, such as those for text generation, image recognition, and summarization, as depicted in FIG. 22. Each model has specific capabilities and resource requirements. In some implementations, models 2212 can also include custom or user-defined models loaded into the platform.

Request load 2214 indicates the number of requests currently being processed by the system. For example, high request loads can trigger the dynamic selection of additional models or system resources to maintain performance. In some implementations, request load 2214 can also include historical data to help predict future workloads. Latency representation 2216 visualizes the latency of requests processed by the system and helps users identify delays and bottlenecks in the system. For example, the latency representation 2216 can be displayed as a heatmap, bar chart, or line graph. In some implementations, latency representation 2216 can include breakdowns by model (e.g., Models A through H) or resource type to provide more detailed insights.

Generation throughput representation 2218 represents the average throughput of the system in terms of tokens generated per second and indicates the efficiency of the models in generating outputs. In some implementations, the generation throughput representation 2218 can be broken down by individual models or aggregated across all models to provide a comprehensive view of system performance. Prefill throughput representation 2220 indicates the average throughput of the system in terms of tokens prefilled per second. Prefill throughput representation 2220 helps users understand the efficiency of the system in preparing inputs for model processing. In some implementations, the prefill throughput representation 2220 can be displayed alongside generation throughput to provide a complete picture of system performance. Cost representation 2222 indicates the cost associated with processing requests within the system and helps users manage and adjust their resource usage to lower expenses. Cost representation 2222 can include metrics such as the cost per request, total cost over a specified period, and cost breakdown by model or resource type. In some implementations, cost representation 2222 can also include projections and recommendations generated by the platform using methods discussed in FIG. 21.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 712(f) will begin with the words "means for," but use of the term "for" in any other context is not intended to invoke treatment under 35 U.S.C. § 712(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions that when executed by at least one data processor of a system, cause the system to:

receive, from a computing device, an output generation request that comprises a query for generation of an output using one or more AI agents of a plurality of AI agents;

transmit a vector representation of the query to a first language model set that is configured to generate (a) a first classification of the query that maps the query to a first subset of the plurality of AI agents and (b) an associated first confidence score;

compare the first confidence score to a first threshold value stored in a threshold data structure accessed by the computing device, the first threshold value determined using a first historical performance metric value set of the first language model set, wherein failure of the first confidence score to satisfy the first threshold value causes escalation to a second language model set comprising a larger number of model parameters than the first language model set, thereby increasing computational resource usage, wherein the first threshold value is dynamically updated based on the first historical performance metric value set and a current system load;

in response to a determination that the first confidence score fails to satisfy the first threshold value, transmit the vector representation of the query to the second language model set, wherein the second language model set is configured to generate (a) a second classification of the query that maps the query to a second subset of the plurality of AI agents and (b) an associated second confidence score;

compare the second confidence score to a second threshold value stored in the threshold data structure accessed by the computing device, the second threshold value determined using a second historical performance metric value set of the second language model set;

in response to a determination that the second confidence score satisfies the second threshold value, aggregate the first classification and the second classification by:

assigning a weight to each of the first classification and the second classification using the first historical performance metric value set and the second historical performance metric value set, respectively, and generating a composite classification that ranks the first classification and the second classification in accordance with respective weights of the first classification and the second classification;

select a routing AI agent set from the first and second subsets of the plurality of AI agents, wherein each AI agent in the routing AI agent set is configured to autonomously execute a computer-executable task set using the vector representation of the query, wherein selecting the routing AI agent set comprises:

maintaining a routing control data structure comprising identifiers of AI agents, capabilities of AI agents, performance metric values of the AI agents, and model compliance identifiers of AI agents, using the composite classification to include, via the routing control data structure, AI agents from the first and second subsets into the routing AI agent set, and excluding, from the routing AI agent set, one or more AI agents that do not comply with one or more compliance requirements associated with the output generation request, thus preventing transmission of the vector representation of the query to an AI agent whose model compliance identifier fails to satisfy a compliance constraint associated with the output generation request; and transmit the vector representation of the query to the routing AI agent set to autonomously execute respective computer-executable task sets.

2. The non-transitory computer-readable storage medium of claim 1, wherein the instructions further cause the system to:

transmit the vector representation of the query to a third language model set, wherein the third language model set is configured to generate (a) a third classification of the query and (b) an associated third confidence score;

compare the third confidence score to a bypass threshold value; and in response to a determination that the third confidence score fails to satisfy the bypass threshold value, prevent ranking of the third classification within the composite classification.

3. The non-transitory computer-readable storage medium of claim 1, wherein the instructions further cause the system to, prior to transmitting the vector representation of the query to the routing AI agent set:

store a record in a log database configured to be accessed using the computing device, wherein the record includes a representation of the query, the composite classification, and the routing AI agent set.

4. The non-transitory computer-readable storage medium of claim 1, wherein the instructions further cause the system to:

in response to a determination that the first confidence score falls below a predefined baseline threshold value, dynamically update the first threshold value by replacing the first threshold value in the threshold data structure with a third threshold value.

5. The non-transitory computer-readable storage medium of claim 1, wherein the instructions further cause the system to, prior to transmitting the vector representation of the query to the routing AI agent set:

evaluate the query for a presence of one or more predefined terms in the query; and in response to a determination that the one or more predefined terms are absent from the query, transmit the vector representation of the query to the routing AI agent set.

6. The non-transitory computer-readable storage medium of claim 1, wherein each computer-executable task set executed by each AI agent causes the AI agent to perform one or more of: invocation of a software application, retrieval of data from a database, or a return of a response to the computing device.

7. The non-transitory computer-readable storage medium of claim 1, wherein the first historical performance metric value set includes at least one of: model accuracy, average response latency, or a model reliability score determined using previous classifications performed by the first language model set.

8. A computer-implemented method comprising:

obtaining an output generation request that comprises an input for generation of an output using one or more artificial intelligence (AI) agents of a plurality of AI agents;

transmitting a representation of the input to a first AI model set that is configured to generate (a) a first classification of the input and (b) an associated first score;

in response to a determination that the first score fails to satisfy a first threshold stored in a threshold data structure, transmitting the representation of the input to a second AI model set, wherein the second AI model set is configured to generate (a) a second classification of the input and (b) an associated second score, using a larger number of AI model parameters than the first AI model set, wherein the first threshold is dynamically updated based on a first historical performance metric value of the first AI model set;

in response to a determination that the second score satisfies a second threshold stored in the threshold data structure, aggregating the first classification and the second classification by:

associating a weight to each of the first classification and the second classification using a first historical performance metric value set and a second historical performance metric value set, respectively, and determining a composite classification output that ranks the first classification and the second classification in accordance with respective weights of the first classification and the second classification;

selecting a subset of the plurality of AI agents in accordance with the composite classification output, wherein each AI agent in the subset of the plurality of AI agents is configured to execute a computer-executable task set using the representation of the input, wherein selecting the subset of the plurality of AI agents comprises:

maintaining a routing control data structure comprising identifiers of AI agents, capabilities of AI agents, performance metric values of the AI agents, and model compliance identifiers of AI agents, using the composite classification to include, via the routing control data structure, AI agents of the plurality of AI agents into the subset of the plurality of AI agents, and excluding, from the subset of the plurality of AI agents, one or more AI agents that do not comply with one or more compliance requirements associated with the output generation request; and transmitting the representation of the input to the subset of the plurality of AI agents to execute respective computer-executable task sets.

9. The computer-implemented method of claim 8, wherein the output generation request further comprises metadata indicating one or more of: a user identifier associated with the input, a timestamp of receipt of the input, or a requested output modality.

10. The computer-implemented method of claim 8, wherein one or more AI agents in the plurality of AI agents are autonomous AI agents.

11. The computer-implemented method of claim 8, wherein one or more AI agents in the plurality of AI agents are semi-autonomous AI agents.

12. The computer-implemented method of claim 8, further comprising:

generating an input complexity score using one or more of: a number of tasks represented within the representation of the input or a size of the input; and selecting the subset of the plurality of AI agents based on the input complexity score.

13. The computer-implemented method of claim 8, further comprising:

causing training of one or more of: the first or second AI model set using a labeled corpus that identifies historical inputs, historical classifications, and historical computer-executable task sets stored over a pre-defined time window.

14. The computer-implemented method of claim 8, further comprising:

generating a cryptographic hash representing the composite classification output and the subset of the plurality of AI agents; and storing the cryptographic hash on a distributed ledger.

15. A system comprising:

at least one hardware processor; and at least one non-transitory memory storing instructions, which, when executed by the at least one hardware processor, cause the system to:

obtain an output generation request that comprises an input for generation of an output using one or more artificial intelligence (AI) agents of a plurality of AI agents;

transmit a representation of the input to a first AI model set that is configured to generate (a) a first classification of the input and (b) an associated first score;

in response to a determination that the first score fails to satisfy a first threshold stored in a threshold data structure, transmit the representation of the input to a second AI model set, wherein the second AI model set is configured to generate (a) a second classification of the input and (b) an associated second score, using a larger number of AI model parameters than the first AI model set, wherein the first threshold is dynamically updated based on a first historical performance metric value set of the first AI model set;

in response to a determination that the second score satisfies a second threshold stored in the threshold data structure, determine a composite classification output that ranks the first classification and the second classification based on the first historical performance metric value set and a second historical performance metric value set;

select a subset of the plurality of AI agents in accordance with the composite classification output, wherein each AI agent in the subset of the plurality of AI agents is configured to execute a computer-executable task set using the representation of the input, and wherein selecting the subset of the plurality of AI agents comprises:

maintaining a routing control data structure comprising identifiers of AI agents, capabilities of AI agents, performance metric values of the AI agents, and model compliance identifiers of AI agents, using the composite classification to include, via the routing control data structure, AI agents of the plurality of AI agents into the subset of the plurality of AI agents, and excluding, from the subset of the plurality of AI agents, one or more AI agents that do not comply with one or more compliance requirements associated with the output generation request; and transmit the representation of the input to the subset of the plurality of AI agents to execute respective computer-executable task sets.

16. The system of claim 15, wherein the first AI model set and the second AI model set are organized in a hierarchal multi-model architecture.

17. The system of claim 15, wherein the first AI model set is trained to generate the first classification by mapping the input to one or more predefined intents based on a degree of similarity between (a) a vector representation of the input and (b) a vector representation of each of the one or more predefined intents, and wherein the second AI model set is trained on a domain-specific training dataset associated with a predefined subject matter.

18. The system of claim 15, wherein at least one AI model within the first AI model set and the second AI model set is a language model.

19. The system of claim 15, wherein the first classification and the second classification maps the input to a particular subset of AI agents within the plurality of AI agents.

20. The system of claim 15, wherein the system is further caused to:

display a representation of the subset of the plurality of AI agents on a user interface of a computing device, wherein the representation is displayed in accordance with a display attribute set determined based on the first score and the second score.

* * * * *